United States Patent
Muraki et al.

(10) Patent No.: US 8,699,569 B2
(45) Date of Patent: Apr. 15, 2014

(54) MOTION PICTURE ENCODING DEVICE AND METHOD, MOTION PICTURE DECODING DEVICE AND METHOD, MOTION PICTURE RECORDING DEVICE, PROGRAM, AND DATA STRUCTURE

(75) Inventors: Jun Muraki, Hamura (JP); Yuji Kuriyama, Ome (JP); Kouichi Nakagomi, Tokorozawa (JP); Kimiyasu Mizuno, Akishima (JP); Kenichi Iwata, Tokyo (JP); Seiji Mochizuki, Tokyo (JP); Ren Imaoka, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 1638 days.

(21) Appl. No.: 11/820,155

(22) Filed: Jun. 18, 2007

(65) Prior Publication Data

US 2007/0291841 A1 Dec. 20, 2007

(30) Foreign Application Priority Data

Jun. 16, 2006 (JP) ................................. 2006-166778
Apr. 18, 2007 (JP) ................................. 2007-108794

(51) Int. Cl.
*H04N 7/12* (2006.01)
*H04N 7/50* (2006.01)
*H04N 7/26* (2006.01)

(52) U.S. Cl.
CPC ............ *H04N 7/50* (2013.01); *H04N 7/26244* (2013.01)
USPC ..................................... 375/240.12; 375/240

(58) Field of Classification Search
CPC .............................. H04N 7/50; H04N 7/26244
USPC .............. 375/240.15, 240.1, 240.25, 240.16, 375/240, 240.12
See application file for complete search history.

(56) References Cited

U.S. PATENT DOCUMENTS 4,307,420 A * 12/1981 Ninomiya et al. ........ 375/240.14
5,949,948 A *  9/1999 Krause et al. ................. 386/350

(Continued)

FOREIGN PATENT DOCUMENTS

EP      0 763 944 A2    3/1997
JP      2003-179931 A   6/2003

(Continued)

OTHER PUBLICATIONS

Taiwanese Office Action dated May 18, 2011 (and English translation thereof) in counterpart Taiwanese Application No. 096121964.

(Continued)

*Primary Examiner* — Saleh Najjar
*Assistant Examiner* — Oleg Korsak
(74) *Attorney, Agent, or Firm* — Holtz, Holtz, Goodman & Chick

(57) ABSTRACT

A CODEC compresses and encodes a motion picture captured at a high speed of 240 fps frame rate in MPEG format. The CODEC divides pictures in each frame into I pictures and the main frame P pictures and the other sub frame P pictures. In encoding P pictures of the main frame, the CODEC uses I pictures that are adjacent on the time axis or P pictures of other main frames as a reference picture. With a playback device, etc., of its motion picture playback performance of 60 fps, to perform an actual speed playback with the playback time being equal to the picture-capturing time, only the main frame alone is to be subjected to playback, in that case the decoding process of P pictures of the sub frames is not required.

29 Claims, 31 Drawing Sheets

(56) References Cited

U.S. PATENT DOCUMENTS

| | | | |
|---|---|---|---|
| 6,144,698 A * | 11/2000 | Poon et al. | 375/240.16 |
| 6,169,821 B1 | 1/2001 | Fukunaga et al. | |
| 6,591,014 B1 | 7/2003 | Ueda | |
| 6,804,294 B1 * | 10/2004 | Hartung et al. | 375/240 |
| 7,022,067 B2 * | 4/2006 | Glukhovsky et al. | 600/109 |
| 7,430,015 B2 | 9/2008 | Ohki | |
| 7,991,053 B2 * | 8/2011 | Raveendran | 375/240.25 |
| 2003/0112366 A1 * | 6/2003 | Baylon et al. | 348/441 |
| 2004/0179611 A1 * | 9/2004 | Sota et al. | 375/240.25 |
| 2004/0228410 A1 * | 11/2004 | Ameres et al. | 375/240.18 |
| 2006/0114334 A1 * | 6/2006 | Watanabe et al. | 348/222.1 |
| 2008/0019445 A1 | 1/2008 | Aono et al. | |

FOREIGN PATENT DOCUMENTS

| | | |
|---|---|---|
| JP | 2003-199112 A | 7/2003 |
| JP | 2004-040518 A | 2/2004 |
| JP | 2004-088244 A | 3/2004 |
| JP | 2006-033393 A | 2/2006 |
| TW | 200607352 | 2/2006 |
| WO | WO 2005/079070 A1 | 8/2005 |
| WO | WO 2006/030694 A1 | 3/2006 |

OTHER PUBLICATIONS

PCT International Search Report and Written Opinion of the International Searching Authority for PCT/JP2007062638, dated Feb. 6, 2008. 13 pages.

De Neve, Wesley., et al, "A Performance Evaluation of MPEG-21 BDSL in the Context of H.264/AVC", Applications of Digital Image Processing XXVII, Proceedings of SPIE, Nov. 2004, pp. 555-566, XP002465280.

Wang, Ye-Kul, et al, "Indication of Non-Required Pics", Geneva: ISO, CH, Jul. 19, 2005, paragraphs [0002], [0003], XP030006100.

Japanese Office Action dated Jan. 10, 2012 (and English translation thereof) in counterpart Japanese Application No. 2007-108794.

Japanese Office Action dated Jul. 10, 2012 and English translation thereof in counterpart Japanese Application No. 2007-108794.

Japanese Office Action dated Apr. 10, 2012 (and English translation thereof) in counterpart Japanese Application No. 2007-108794.

* cited by examiner

FIG. 10A

| FRAME | SLICE TYPE | nal_ref_idc | frame_num | POC | REFERENCE PICTURE |
|---|---|---|---|---|---|
| I0 | I(IDR) | 3 | 0 | 0 | |
| P1 | P | 0 | 1 | 2 | 0 |
| P2 | P | 0 | 1 | 4 | 0 |
| P3 | P | 0 | 1 | 6 | 0 |
| P4 | P | 2 | 1 | 8 | 0 |
| P5 | P | 0 | 2 | 10 | 0 |
| P6 | P | 0 | 2 | 12 | 0 |
| P7 | P | 0 | 2 | 14 | 0 |
| P8 | P | 2 | 2 | 16 | 0 |
| P9 | P | 0 | 3 | 18 | 0 |
| P10 | P | 0 | 3 | 20 | 0 |
| P11 | P | 0 | 3 | 22 | 0 |
| P12 | P | 2 | 3 | 24 | 0 |

FIG. 10B

| FRAME | SLICE TYPE | nal_ref_idc | frame_num | POC | REFERENCE PICTURE |
|---|---|---|---|---|---|
| I0 | I(IDR) | 3 | 0 | 0 | |
| P4 | P | 2 | 1 | 8 | 0 |
| P8 | P | 2 | 2 | 16 | 0 |
| P12 | P | 2 | 3 | 24 | 0 |

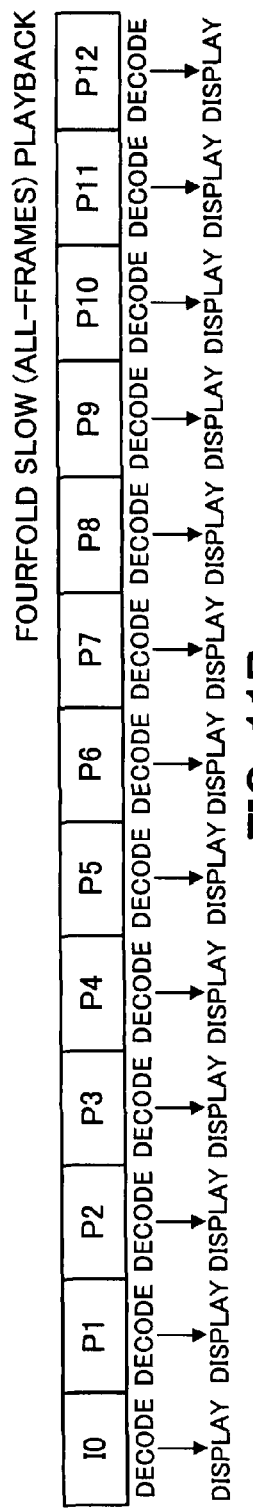
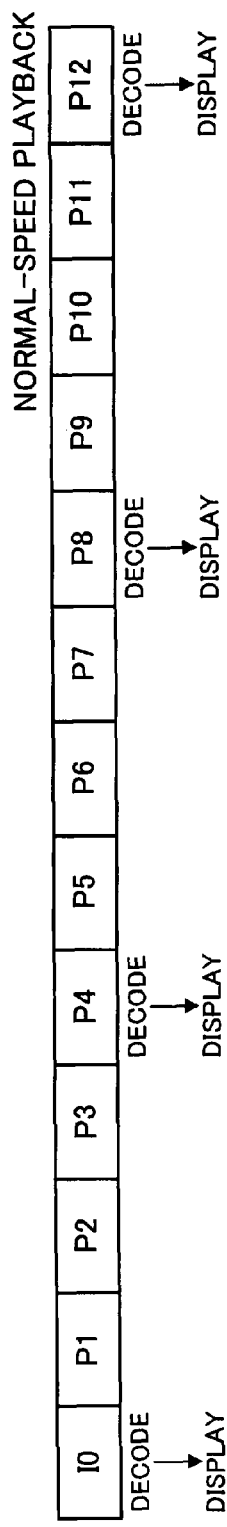
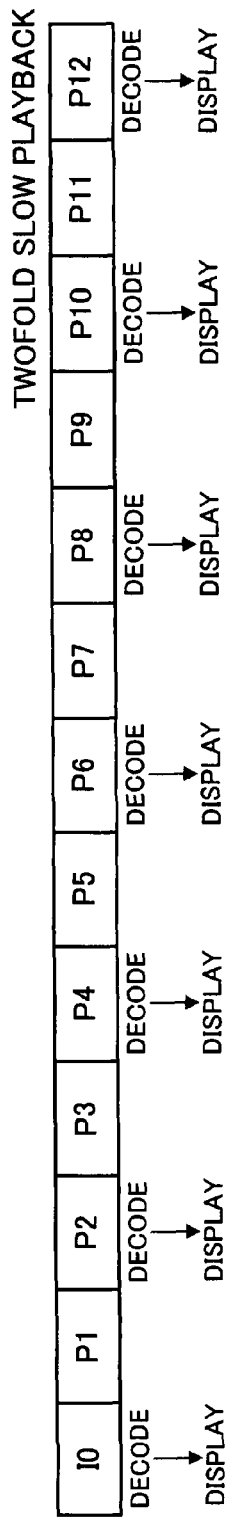

| PLAYBACK MODE | MOTION PICTURE PLAYBACK SPEED | | | REFERENCE TRAK |
|---|---|---|---|---|
| ALL-FRAMES PLAYBACK | FOURFOLD SLOW (S = 3) | TWOFOLD SLOW (S = 1) | NORMAL SPEED (S = 0) | TRAK FOR ALL-FRAMES PLAYBACK |
| 1/2 THINNED PLAYBACK | TWOFOLD SLOW (S = 3) | NORMAL SPEED (S = 1) | DOUBLE SPEED (S = 0) | |
| NORMAL-SPEED PLAYBACK | NORMAL SPEED | | | TRAK FOR NORMAL-SPEED PLAYBACK |
| DOUBLE-SPEED PLAYBACK | DOUBLE SPEED | | | |

FIG. 23

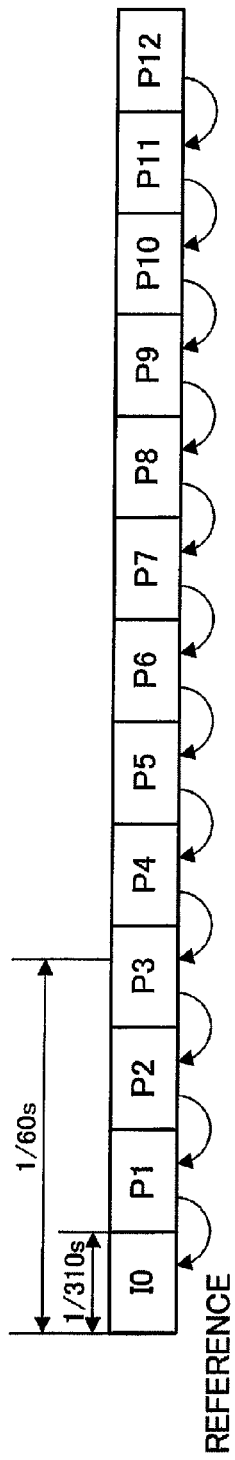
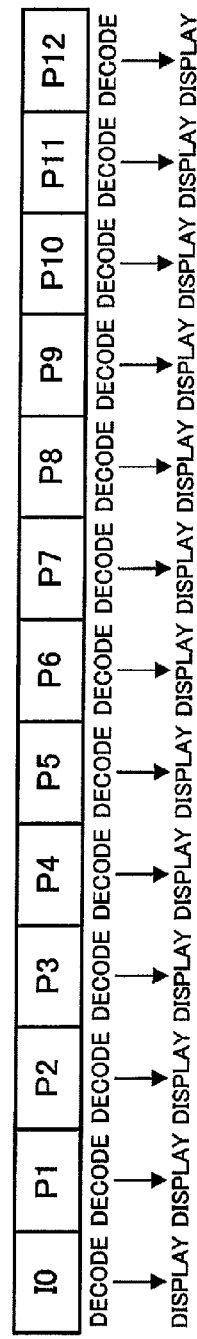
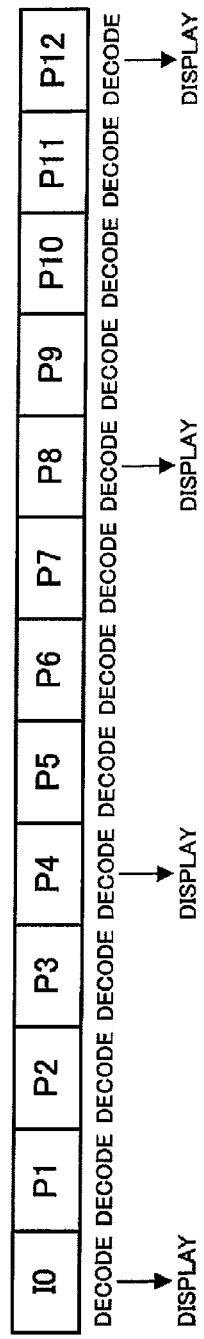
FIG. 24A
PRIOR ART
FIG. 24B
PRIOR ART
FIG. 24C
PRIOR ART

MOTION PICTURE ENCODING DEVICE AND METHOD, MOTION PICTURE DECODING DEVICE AND METHOD, MOTION PICTURE RECORDING DEVICE, PROGRAM, AND DATA STRUCTURE

BACKGROUND OF THE INVENTION

1. Field of the Invention

The present invention relates to a motion picture encoding device and method, a motion picture decoding device and method, a motion picture recording device, program, and data structure, using interframe prediction technology.

2. Description of the Related Art

Currently, the motion picture MPEG (Motion Picture Experts Group) format is used in general as technology for compression coding, and the data structure is publicly known. For example, the data structure in the MPEG format is described in Japanese Unexamined Patent Application Publication No. 2003-179931.

To describe the outline, in the MPEG format, each frame (picture) constituting a motion picture is classified into three types of pictures—an I picture (Intra-coded picture or Intra-frame coded picture), a P picture (Predictive coded picture), and a B picture (Bi-directionally predictive coded picture)— and is subsequently encoded.

The I picture is a picture of at least one sheet to be arranged within a GOP (Group Of Picture) wherein predefined sheets of picture data are collected to maintain the independence of the GOP. This I picture is encoded (Intra-frame coded) from only information of the frame without using interframe prediction. The P picture, on the other hand, is a predictive picture (Interframe predictive-coded) composed by regarding an I picture or a P picture in the past as a reference picture from which unidirectional motion is predicted for encoding. In addition, the B picture is a predictive picture (Bi-directional predictive coded) composed by regarding a previous or subsequent I picture or P picture located on a time axis as a reference picture from which bidirectional motion is predicted for encoding. More precisely, the P picture and B picture are represented by motion vectors (MV) obtained by a unit of a microblock with 16×16 pixels and by data of the encoding DCT (Discrete Cosine Transform) coefficient of a differential picture (predictive error) when the predictive picture is compared with a frame (actual picture) of the same timing.

During the playback time of a motion picture that has been compression-encoded in the MPEG format, as for the I picture, decoding is executed to be returned to the picture data on the original time axis. As for the P picture and B picture, the predictive error is obtained via decoding and reverse DCT conversion, and at the same time, a predictive picture is created regarding the previously decoded other frames (a past frame in the P picture, a past and a future frame in the B picture) as a reference picture with use of this reference picture and the motion vectors (MV). The picture data of the original time axis is to be created from the created predictive picture and the predictive error.

As described above, during the playback time of the motion picture that has been compression-encoded in the MPEG format, in order to cause the P picture and B picture to become displayable picture data, it is inevitable to perform processes such as decoding, reverse DCT conversion, and creation of a predictive picture for a series of frames starting from an I picture, which is referred directly or indirectly from these frames (pictures) as a starting point.

Therefore, in the case of display by frame thinning, a process of decoding, etc., had to be performed also for unnecessary frames (P pictures and/or B pictures) that are not actually subject to display. In other words, there was a problem of extremely low processing efficiency in the event of motion picture playback accompanying frame thinning.

FIGS. 24A to 24C are conceptual diagrams that describe these problems. FIG. 24A shows an I picture (I0), P pictures (P1, P2, P3, . . . ) that use it as a starting point, and the reference pictures to be referenced for encoding each P picture, all within the encoded data of a motion picture based on the MPEG format. FIG. 24B shows the presence/absence of the decoding process as well as the display of each frame in cases in which both frame rates at the time of recording and playback are 240 fps (when frame thinning is not performed). FIG. 24C shows the presence/absence of the decoding process as well as the display of each frame in cases in which the frame rate at the time of playback is 60 fps (when frame thinning is performed). Furthermore, FIGS. 24A to 24C are examples of frame sections without the presence of a B picture. Although not illustrated, in the event of creating a B picture, the frame of either the I picture or P picture located before and after on the time axis is referenced.

As shown in FIGS. 24B and 24C, when a motion picture is subjected to playback by performing frame thinning, because data processing that is equivalent to a case in which frame thinning is not performed requires the wasteful consumption of electrical power. Furthermore, in a constitution in which motion picture playback with frame thinning is performed by a CPU (Central Processing Unit), etc., with the use of predefined software, the processing load of the CPU, etc., is significant. Therefore, other processes that may be executed in parallel to motion picture playback are limited, leading to the necessity of maintaining excessive processing capability in the CPU, etc., to make the predefined processes executable parallel to the motion picture playback.

The present invention has been conducted in view of such conventional problems, and the purpose thereof is to provide a motion picture encoding device as well as a motion picture encoding method capable of obtaining encoded data of a motion picture that may efficiently perform motion picture playback accompanying frame thinning, a motion picture decoding device as well as a motion picture decoding method capable of decoding the above encoded data, and a motion picture recording device capable of recording the captured motion picture as encoded data as described above, and a program and data structure used for realizing these.

SUMMARY OF THE INVENTION

To solve these problems, a motion picture encoding device according to a first aspect of the present invention is a motion picture encoding device comprises:

an encoding component for inputting a motion picture comprising pictures of a series of frames captured at a predefined picture-capturing frame rate and for encoding a picture of each frame via an encoding process including interframe predictive coding using pictures of other frames as a reference picture, and an encoding control component for limiting the reference picture to other specified pictures when the specified pictures are subjected to interframe predictive coding by the encoding component, assuming that the pictures of every predefined frame interval determined by the picture-capturing frame rate and display frame rate are specified pictures, which will become the display target in the case of displaying the motion picture at a predefined display frame rate that is lower than the picture-capturing frame rate.

Furthermore, a motion picture encoding device according to a second aspect of the present invention comprises:

an encoding component for encoding pictures of a series of frames to be respectively input in a motion picture captured at a predefined frame rate via an encoding process including interframe predictive coding using pictures of other frames as a reference picture, and an encoding control component for limiting the reference picture to other specified pictures when the specified pictures are subjected to interframe predictive coding by the encoding component regarding pictures with every predefined frame interval as specified pictures which are to be the display target in the event when the display is made by matching the playback time and the picture-capturing time at a frame rate under which the motion picture after the encoding is lower than the frame rate at the time of picture-capturing.

Furthermore, a motion picture encoding method according to a third aspect of the present invention is characterized in that:

a picture of each frame of a motion picture comprising pictures of a series of frames captured at a predefined picture-capturing frame rate is encoded via an encoding process including interframe predictive coding using pictures of other frames as a reference picture, and other specified pictures are used as a reference picture in the event of the interframe predictive coding of the specified pictures, assuming that the pictures of every predefined frame interval determined by the picture-capturing frame rate and display frame rate are specified pictures, which will become the display target in the case of displaying the motion picture at a predefined display frame rate that is lower than the picture-capturing frame rate.

Furthermore, a recording medium according to a fourth aspect of the present invention stores computer program causing a computer contained in a motion picture encoding device to function as:

an encoding component for encoding a motion picture comprising pictures of a series of frames captured at a predefined picture-capturing frame rate via an encoding process including interframe predictive coding using pictures of other frames as a reference picture, and an encoding control component for limiting the reference picture to other specified pictures when the specified pictures are subjected to interframe predictive coding by the encoding component, assuming that the pictures of every predefined frame interval determined by the picture-capturing frame rate and display frame rate are specified pictures, which will become the display target in the case of displaying the motion picture at a predefined display frame rate that is lower than the picture-capturing frame rate.

Furthermore, a motion picture recording device according to a fifth aspect of the present invention comprises:

a picture-capturing component for taking a motion picture, an encoding component for inputting a motion picture comprising pictures of a series of frames captured by the picture-capturing component at a predefined picture-capturing frame rate and encoding a picture of each frame via an encoding process including interframe predictive coding using pictures of other frames as a reference picture, a recording component for recording motion picture data comprising the motion picture that has been encoded by the encoding component, and an encoding control component for limiting the reference picture to other specified pictures when the specified pictures are subjected to interframe predictive coding by the encoding component, assuming that the pictures of every predefined frame interval determined by the picture-capturing frame rate and display frame rate are specified pictures, which will become the display target in the case of displaying the motion picture based on the motion picture data recorded in the recording component at a predefined display frame rate that is lower than the picture-capturing frame rate.

Furthermore, a motion picture decoding device according to a sixth aspect of the present invention is a motion picture decoding device for decoding motion picture data in which a motion picture comprising pictures of a series of frames captured at a predefined picture-capturing frame rate has been encoded characterized as comprising:

a decoding component for inputting and decoding the encoded motion picture via a decoding process including interframe predictive decoding using pictures of other frames as a reference picture, and a decoding control component for limiting the decoding target of the motion picture data by the decoding component only to specified pictures with every predefined frame interval determined by the picture-capturing frame rate and a predefined display frame rate, which are to become the display target in the case of displaying a motion picture at the display frame rate that is lower than the picture-capturing frame rate, and for causing the decoding component to use other specified pictures different from the decoding target as a reference picture in the event of interframe predictive decoding.

Furthermore, a motion picture decoding device according to a seventh aspect of the present invention is a motion picture decoding device for decoding motion picture data in which a motion picture captured at a predefined picture-capturing frame rate has been encoded characterized as comprising:

a decoding component for decoding the motion picture data via a decoding process including interframe predictive decoding using pictures of other frames as a reference picture, and a decoding control component for limiting the decoding target of the motion picture data by the decoding component only to specified pictures with every predefined frame interval that is to become the display target in the case of displaying a motion picture after encoding at a frame rate lower than the frame rate at the time of capturing pictures while matching the playback time to the picture-capturing time, and for causing the decoding component to use other specified pictures different from the decoding target as a reference picture in the event of interframe predictive decoding.

Furthermore, a motion picture decoding method according to a eighth aspect of the present invention is a motion picture decoding method for decoding a motion picture in which a motion picture comprising pictures of a series of frames captured at a predefined picture-capturing frame rate has been encoded characterized in that:

a picture of each frame of the encoded motion picture comprised in the motion picture data is decoded via a decoding process including interframe predictive decoding using pictures of other frames as a reference picture, and the decoding target subjected to the decoding process is limited only to specified pictures with every predefined frame interval determined by the picture-capturing frame rate and a predefined display frame rate, which are to become the display target in the case of displaying a motion picture at the display frame rate that is lower than the picture-capturing frame rate, and other specified pictures different from the decoding target are used as a reference picture in the event of interframe predictive decoding of the specified pictures.

Furthermore, the program according to a ninth aspect of the present invention is characterized as causing a computer contained in a motion picture decoding device for decoding a motion picture data in which a motion picture comprising a picture of a series of frames captured at a predefined picture-capturing frame rate has been encoded to function as:

a decoding component for inputting the motion picture data and decoding a picture of each frame via a decoding process including interframe predictive decoding using pictures of other frames as a reference picture, and a decoding control component for limiting the decoding target by the decoding component only to specified pictures with every predefined frame interval determined by the picture-capturing frame rate and a predefined display frame rate, which are to become the display target in the case of displaying a motion picture at the display frame rate that is lower than the picture-capturing frame rate, and also for causing the decoding component to use other specified pictures different from the decoding target as a reference picture in the event of interframe predictive decoding.

Furthermore, a data structure according to a tenth aspect of the present invention is a data structure of motion picture data in which a motion picture comprising a picture of a series of frames captured at a predefined picture-capturing frame rate has been encoded and is also to be decoded by a motion picture decoding device characterized as including:

encoded data subjected to interframe predictive coding regarding other specified pictures as a reference picture, wherein the encoded data of specified pictures with every predefined frame interval determined by a picture-capturing frame rate and a display frame rate, which are to become the display target in the case of displaying a motion picture at the display frame rate that is lower than the picture-capturing frame rate by decoding with the motion picture decoding device;

and reference picture indication information indicating the other specified pictures that are to be reference pictures at the time of decoding the specified pictures.

BRIEF DESCRIPTION OF THE DRAWINGS

These objects and other objects and advantages of the present invention will become more apparent upon reading of the following detailed description and the accompanying drawings in which:

FIG. 10A is a conceptual diagram that shows the outlined configuration of an H.264 stream.

FIG. 10B is a conceptual diagram that shows the outlined configuration of an H.264 stream.

FIG. 11B is a conceptual diagram that shows the presence and absence of decoding and display of each frame during playback in fourfold slow playback mode.

FIG. 11C is a conceptual diagram that shows the presence and absence of decoding and display of each frame during playback in normal-speed playback mode.

FIG. 11D is a conceptual diagram that shows the presence and absence of decoding and display of each frame during playback in twofold slow playback mode.

FIG. 23 is a figure that shows the relationship between the playback mode, the playback speed, and the reference trak.

FIG. 24A is a conceptual diagram to describe problems of the prior art.

FIG. 24B is a conceptual diagram to describe problems of the prior art.

FIG. 24C is a conceptual diagram to describe problems of the prior art.

DETAILED DESCRIPTION OF THE PREFERRED EMBODIMENTS

Favorable embodiments of the present invention are described below according to the figures.

(Embodiment 1)

Figure 1:
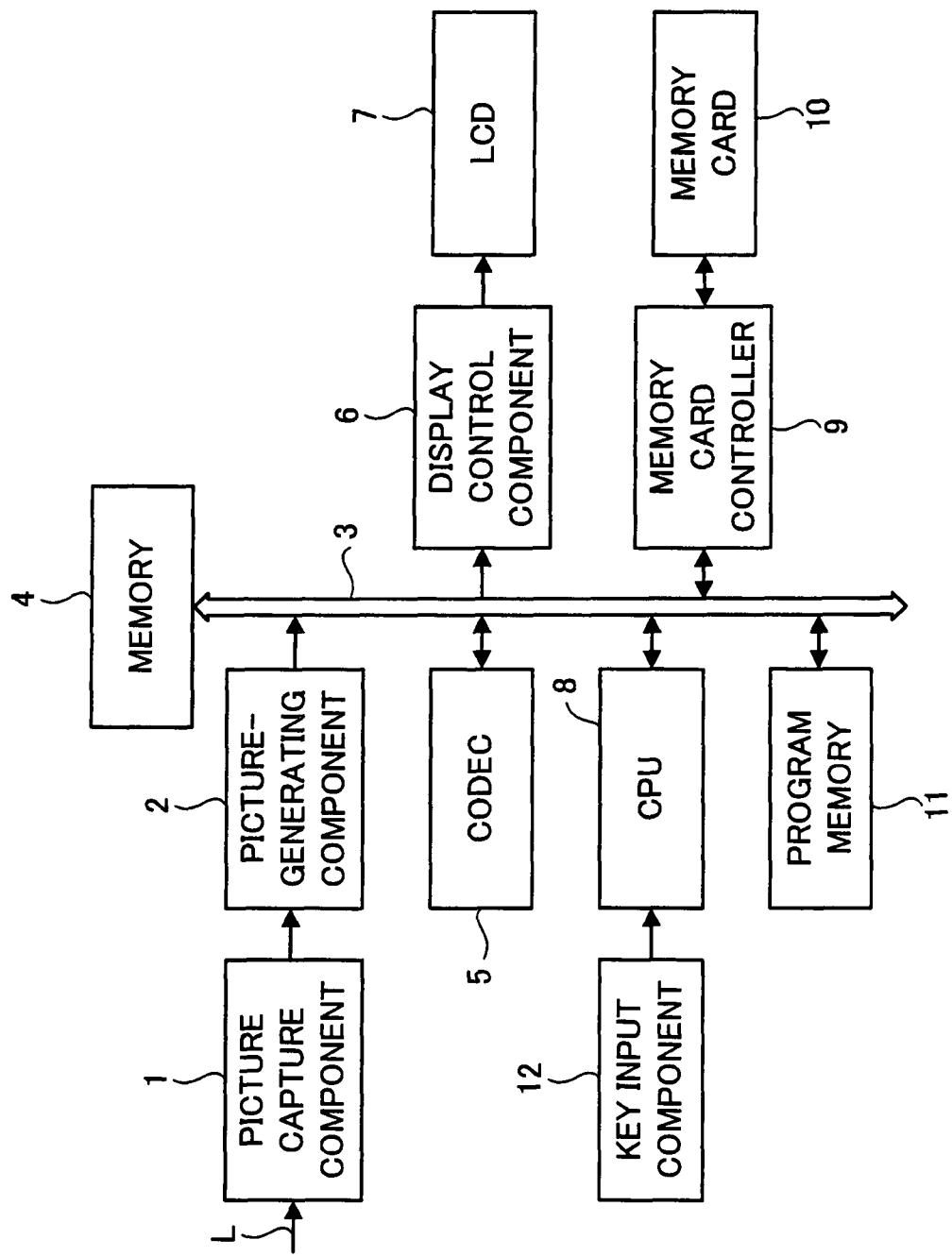
FIG. 1 is a block diagram that is common to each embodiment showing the motion picture recording device regarding this invention.

First, the first embodiment is described. FIG. 1 is a block diagram showing the outline of an electrical configuration of a motion picture recording device (digital camera) related to the present embodiment. The motion picture recording device comprises a recording function and a playback function of a motion picture and is provided with the following constitution.

In other words, the motion picture recording device has a picture-capturing component (device) 1 for capturing a motion picture. The picture-capturing component 1 is a picture-capturing part composed of image sensors such as CCD, CMOS, and the like for converting optical images through object light L entering from an optical system to electrical signals and of an A/D converter, etc., for converting the output signals from the image sensors to digital signals. The picture-capturing component 1 outputs the digital signals after the conversion, i.e., picture-capturing signals to a picture-generating component 2.

The picture-generating component (device) 2 successively generates picture data from the picture-capturing signals output from the picture-capturing component 1 at a predefined frame rate. The picture data generated herein is composed of a brightness component Y as well as color difference components Cb and Cr. The picture data is successively stored in memory 4 via a memory bus 3 as a series of frame data constituting a motion picture. The picture data once stored in the memory 4 is sequentially input to CODEC 5 at the time of recording. Furthermore, picture data equivalent to a plurality of frames is stored in the memory 4.

The CODEC 5 is an encoding component as well as a decoding component for encoding motion picture data by an encoding system using interframe prediction technology through motion compensation and for decoding the encoded data. More specifically, the CODEC 5 is comprised of an orthogonal conversion circuit, a quantization circuit, a motion detection circuit, a forward direction prediction circuit, an encoding circuit, a decoding circuit, an inverse orthogonal conversion circuit, a frame memory, etc., for encoding a series of frames (picture data) constituting the motion picture as an I picture (intra-frame coded picture) in the MPEG format (MPEG-1, MPEG-2, MPEG-4, H.264, etc.) as well as a P picture (interframe predictive-coded picture) and for decoding the encoded data.

At the time of recording, the CODEC 5 encodes the picture data (a series of frame data) serially entered from the memory 4. When the CODEC 5 encodes the I picture, it performs an encoding (intra-frame encoding) process using only the information of the frame and outputs it to the memory 4. Therein, the CODEC 5 stores the picture data in the memory 4 as picture data (reference picture) to be used in encoding the P picture of the following frame.

Furthermore, when the CODEC 5 encodes the P picture, it reads out the picture data (reference picture) stored in the memory 4 for the purpose of reference in encoding previous frames and performs an encoding (interframe predictive coding) process using the reference picture as well as the picture of the relevant frame to output it to the memory 4. Furthermore, the encoded data output herein includes the motion vectors (MV). In addition, as mentioned later, to relevant encoded data, attribute information such as picture type information that shows which picture such as whether the encoded data is an I picture or a P picture and the reference frame information that shows reference frame at the time of decoding is added.

Furthermore, when the CODEC 5 encodes a P picture, the picture data of the frame is stored in the memory 4 as data of a reference picture to be used in encoding a P picture of the following frame. More specifically, the CODEC 5 performs local decoding for the encoded P picture and stores the locally decoded picture data in the memory 4 as data of the reference picture. Moreover, the previously described I picture and P picture (encoded data) and the reference picture (picture data) are each separately stored in predefined regions to be secured in the memory 4.

As in the above, the encoded data generated by the CODEC 5 and stored in the memory 4 becomes a motion picture file when the attribute information is added by a CPU 8 and is recorded in a memory card 10 by a memory card control component (controller) 9.

Furthermore, the picture data generated by the picture-generating component 2 and stored in the memory 4 at the time of recording is read out by a display control component 6 and is also sent out to an LCD (Liquid Crystal Display) 7 to be screen displayed in the LCD.

On the other hand, the motion picture file recorded in a memory card 10 is read out by a memory card control component 9 at the time of playback and transmitted to the CODEC 5 after the encoded data portion is taken out by the CPU 8. The encoded data (motion picture data) that has been transmitted is decoded by the previously described CODEC 5 through an action in accordance with three types of playback mode (normal speed playback mode, slow playback mode, and variable speed playback mode) to be described later. The decoded motion picture is stored in the memory 4, while being serially read out for every frame by the display control component 6, and is also sent out to the LCD 7 to be screen-displayed as a motion picture.

The CPU 8 controls each component described above according to a predefined program stored in a program memory 11 while successively detecting the key operation status in a key input component 12 comprising various types of operation keys arranged for a user to operate the motion picture recording device and controls, in accordance with the predefined key operation.

The CPU 8 causes the picture-capturing component 1, the picture-generating component 2, and the CODEC 5 to act at a frame rate of 240 fps in recording, and to perform high-speed picture capturing as well as cause the display control component 6 to act at a constant frame rate (hereinafter, referred to as display frame rate) of 60 fps. Furthermore, in a motion picture recording device at the playback time of a motion picture recorded in the memory card 10, the CPU 8 functions as a decoding control component by causing the CODEC 5 to act at a frame rate of 60 fps, which is the same as the display frame rate, and by controlling in accordance with the three types of playback mode (normal speed playback mode, slow playback mode, and variable speed playback mode) to be described later.

The program memory 11 is a non-volatile memory such as EEPROM or Flush memory, etc., that allows rewriting, wherein other than the previously described predefined program, other specified data related to each function of the device set up or changed by the user has been stored.

Arranged in the key input component 12 are a mode-switching key for the user to switch the action mode of the motion picture recording device between the recording mode and playback mode, and operation keys, etc., for instructing recording start and recording stop in the recording mode and playback start as well as playback stop in the playback mode.

Moreover, as playback mode in the present embodiment, the previously described three types—normal speed playback mode, slow playback mode, and variable speed playback mode—have been provided. Normal speed playback mode is a mode in which the moving speed of a motion picture (hereinafter referred to as playback speed) is a speed that is the same as an actual moving speed of the recording target (hereinafter referred to as normal speed), and the slow playback mode is a mode in which the playback speed is a speed of ¼, which is slower than the normal speed. Both playback modes are used in the event of motion picture playback in a state in which the playback speed is fixed at the abovementioned speed. Unlike normal speed playback mode and slow playback mode, variable speed playback mode is a mode in which, during playback, the playback speed of the motion picture may appropriately be changed to normal speed or to a speed of ¼ of the normal speed. Furthermore, each playback mode may be set prior to playback of a motion picture, allowing the user to selectively set any playback mode prior to the motion picture playback by operating the mode switching key.

Furthermore, in the key input component 12, a speed-switching key is provided to allow the user to switch the playback speed of the motion picture between normal speed and a speed of ¼ during motion picture playback in variable speed playback mode, and the operation component is realized by the key input component 12.

Hereinafter, actions (operation or process) of the motion picture recording device of the present embodiment is described.

(Recording Action)

Figure 2:
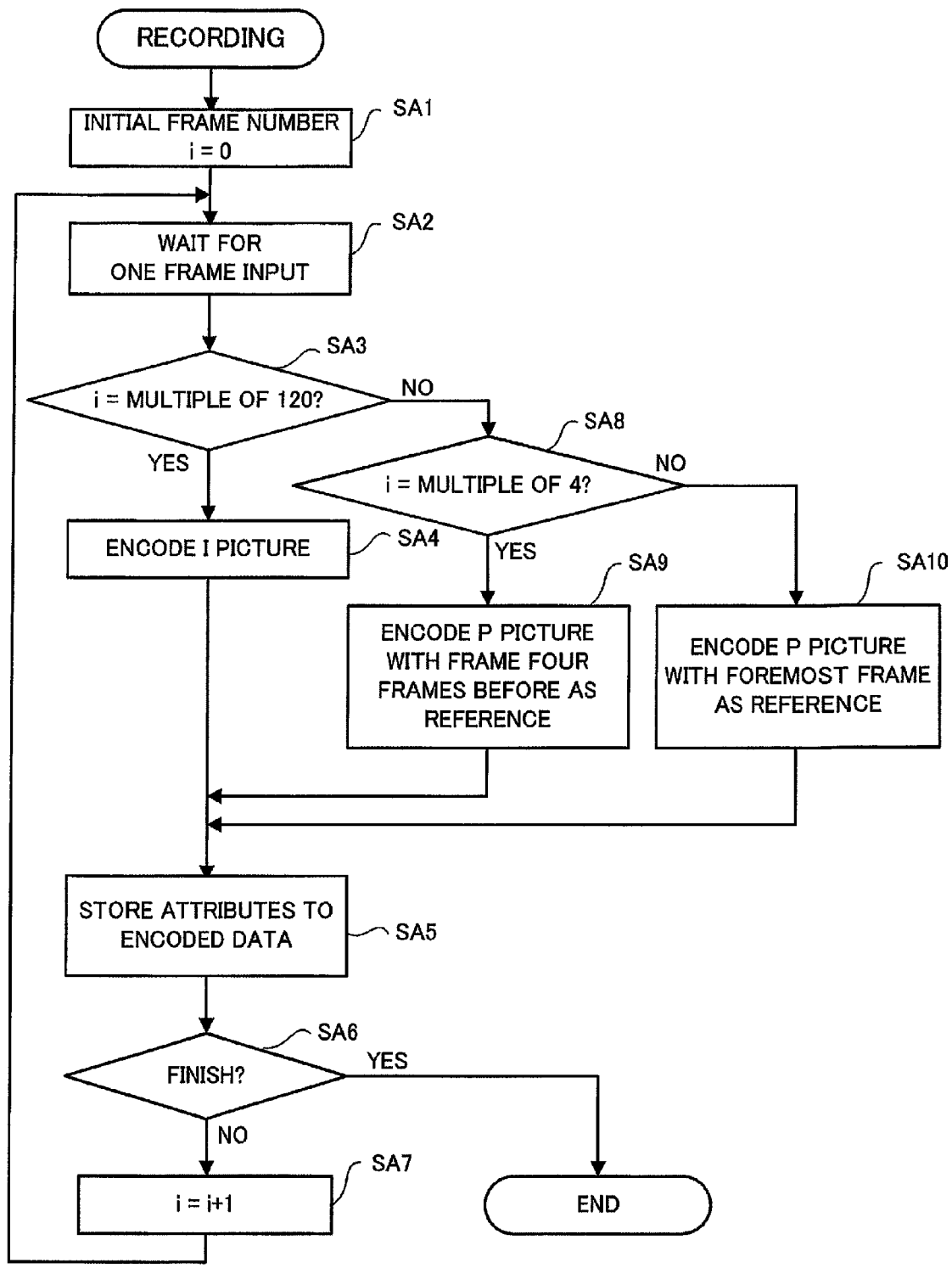
FIG. 2 is a flow chart that shows the action (operation) of the motion picture recording device in the recording mode.

First, action at the time when a motion picture is being taken and recorded in recording mode is described. FIG. 2 is a flow chart showing the control content of the CODEC 5 through the CPU 8. At the time when the motion picture is being taken and recorded, the CPU 8 causes the picture-capturing component 1, the picture-generating component 2, and the CODEC 5 to act at a frame rate of 240 fps, and also synchronizes each component according to units of frames.

Then, upon starting the picture taking and recording, the CPU 8 first initializes the frame number (i) (step SA1). The default (the number of the first frame) of the frame number is "0". Thereafter, the CPU 8 waits the input (storing) of the picture data equivalent of one frame to the memory 4 (Step SA2) and causes the CODEC 5 to execute an encoding process to be described below while incrementing the frame number (i) by one for every frame.

First, if the CPU 8 determines that the frame number (i) is a multiple of 120 (YES in Step SA3) including the first frame (i=0) immediately after the action start, the picture data of this time stored in the memory 4 is read out and entered in the CODEC 5 causing the CODEC 5 to encode an I picture. In other words, the CODEC 5 executes an intra-frame encoding based only on the entered picture data and outputs the encoded data to the memory 4 (Step SA4). Furthermore, then the CODEC 5 stores the locally decoded picture data in which the encoded data has been decoded separately from the encoded data in the memory 4 as picture data (reference picture) to be used at the time of encoding the P picture of the following frame. Furthermore, the CPU 8 adds attribute information previously described to the encoded data (step SA5).

Then, when the CPU 8 determines that the picture-capturing is not finished (NO in Step SA6), after incrementing the frame number (i) by one (Step SA7), the above process is repeated by returning to the Step SA2. In other words, every time that a frame number (i) becomes a multiple of "120", the CPU 8 causes the CODEC 5 to encode the picture data entered every 0.5 seconds as an I picture, because the frame rate is 240 fps.

Furthermore, while repeating the above process, if the CPU 8 determines that the frame number (i) of the picture data entered in the memory 4 is other than a multiple of 120, and at the same time, a multiple of 4 (No in step SA3 and YES in step SA8), reference pictures stored in the memory 4 in the event of an encoding process of a frame that is four frames before and picture data of this time stored in the same memory 4 are read out and entered into the CODEC 5, which is used by the CODEC 5 when executing the encoding of the P picture (Step SA9). In other words, the CPU 8 causes the CODEC 5 to perform encoding through forward intra-frame prediction encoding with motion compensation is performed, in which after three frames, a picture of a frame that is four frames before is used as a reference picture, and to output the encoded data to the memory 4. Then, the CODEC 5 performs the previously described local decoding for the encoded P picture, and stores the locally decoded picture data in the memory 4 separately from the encoded data as data of a reference picture to be used at the time of encoding the next frame (to note, P picture). Furthermore, the CPU 8 adds the attribute information previously described to the encoded data (step SA5).

On the other hand, if the CPU 8 determines that the frame number (i) of the picture data entered into the memory 4 is not a multiple of 4 (NO in both steps SA3 and SA8), the reference picture stored in the memory 4 in the event of an encoding process of an immediately preceding frame and the picture data of this time stored in the same memory 4 are read out and entered into the CODEC 5, which is used by the CODEC 5 when executing the encoding of the P picture, and then the encoded data is output to the memory 4 (step SA10). In other words, encoding through intra-frame prediction encoding with motion compensation is performed. Furthermore, also on this occasion, the CODEC 5 performs the previously described local decoding for the encoded P picture, and the locally decoded picture data is stored in the memory 4 separately from the encoded data as data of a reference picture to be used at the time of encoding the next frame (to note, P picture). Moreover, the CPU 8 adds the attribute information previously described to the encoded data, is added (step SA5)

Hereinafter, when the CPU 8 determines that the picture-taking has not finished (NO in step SA6), all processes described above are repeated, and the recording action ends when it determines that the picture taking is finished (YES in step SA6). Furthermore, a series of encoded data stored in the memory 4 as well as the attribute information added for every frame are transmitted to the memory card 10 by the memory card control component 9 so as to be recorded as a motion picture file. The above process is synchronized by a unit of frames between the picture-capturing component 1 and the picture-generating component 2.

Figure 6A:
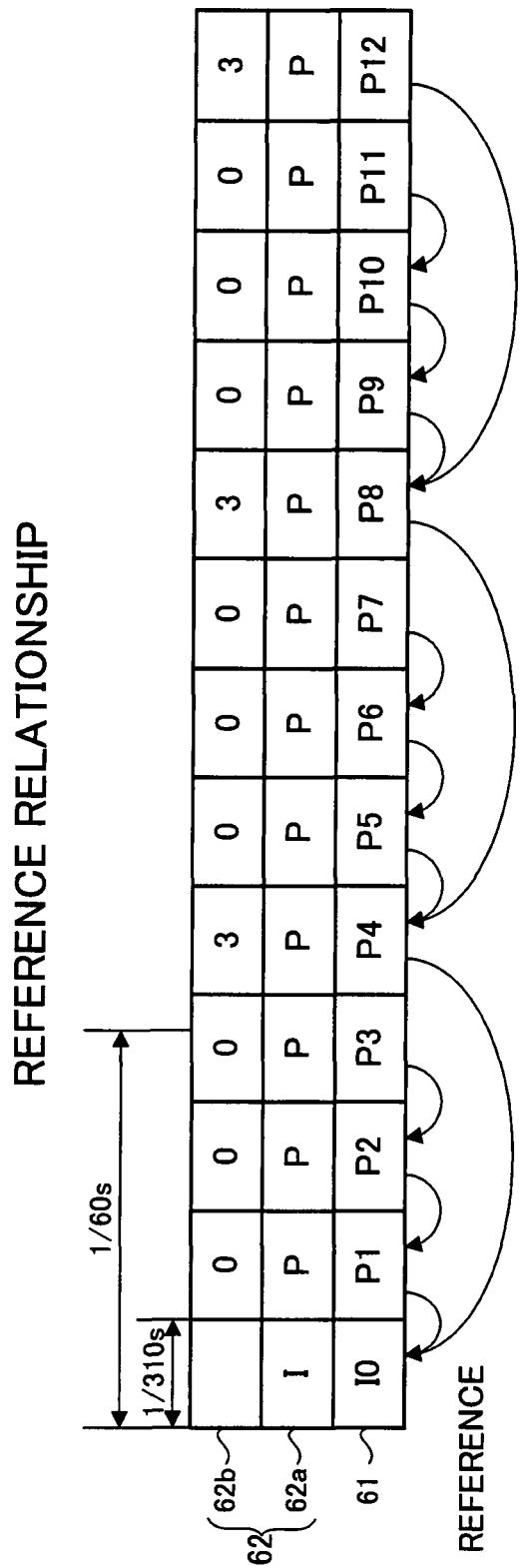
FIG. 6A is a conceptual diagram that shows the configuration of motion picture data recorded in the recording mode.

FIG. 6A is a figure conceptually describing the encoded data 61 generated by the process that has been described above and the attribute information 62 to be added thereto, that is, picture type information 62a and reference frame information 62*b*. Furthermore, in H.264, the above encoded data 61 is stored in a motion picture file as a sliced data body. On the other hand, the picture type information 62*a* is stored in a slice header as a slice type indicating the type of each picture, while the reference frame information 62*b* is stored in the sliced data body along with the encoded data 61 as reference picture-designating information indicating a reference picture at the time of decoding each picture. Moreover, as reference picture-designating information (reference frame information 62*b*), values that are incremental as moving away from the frame have been provided. For example, if the reference picture is an immediately preceding reference picture (picture to be referenced), it is "0". In the case of a reference picture that is one picture before, it is "1", and if it is a reference picture that is one further before, it is "2", and so on.

Furthermore, in the encoded data 61 shown in the figure, the "I" is an I picture, the "P" is a P picture of frames for which a frame number (i) other than the I pictures is a multiple of 4, and the "p" is a P picture of frames for which the frame number (i) is anything other than a multiple of 4. In the present embodiment, the "I" and "P" are specified pictures with a predefined frame interval. Moreover, the frame indicated by the arrow is a reference frame (reference picture) at the time of encoding each P picture. Additionally, in the following description, the "I" and "P" frames are referred to as the main frame, and the "p" as a sub frame.

Furthermore, in the above encoded data 61, a value is added for every frame as picture type information 62*a* such as "I" for an I picture and "P" for a P picture. Moreover, to the frames of the P picture, a predefined value described earlier is to be added as reference frame information 62*b*. In other words, as reference frame information 62*b*, to all sub frames (p1, p2, p3, etc.) a "0" indicating an immediately preceding reference picture (picture to be referenced) is respectively added, and to the main frame (P4, P8, P12) a "3" indicating a reference picture (picture to be referenced) that is four frames before in frame order is each added.

(Playback Action)

Next, actions during playback in accordance with each playback mode (normal speed playback mode, slow playback mode, and variable speed playback mode) mentioned above are described following FIGS. 3 through 5.

Herein, a motion picture (motion picture file) recorded in the memory card 10 through the recording actions described above is presumed to be played back. Furthermore, in each playback mode, first the CPU 8 reads out a motion picture file recorded in the memory card 10 and has been optionally selected by a user through the memory card control component 9. The CPU 8 then takes out the encoded data portion of the motion picture file that has been read out and by starting the transfer of the encoded data portion to the CODEC 5 at a frame rate of 60 fps, the playback of the motion picture is started.

(Playback Action, Slow Playback)

Figure 3:
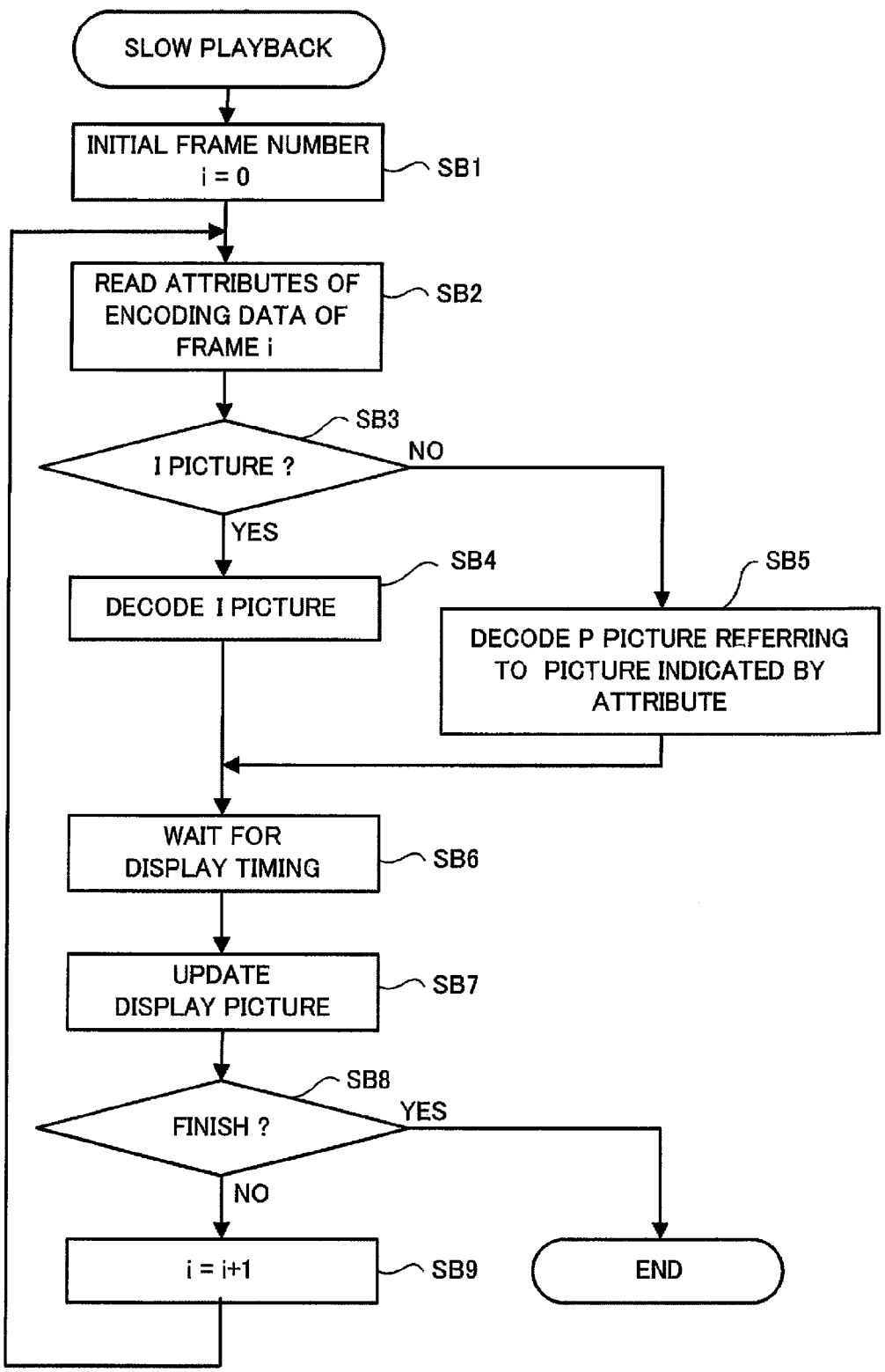
FIG. 3 is a flow chart that shows the action of the motion picture recording device in slow playback mode.

First, actions in the slow playback mode are described following the flow chart in FIG. 3. When the slow playback mode has been set by the user, the CPU 8 causes the CODEC 5 and the display control component 6 to act at a frame rate of 60 fps.

Then, upon starting playback, the CPU 8 first initializes the frame number (i) (step SB1). Furthermore, the initial value of the frame number is "0" as was in recording.

Next, the CPU 8 reads out the attribute information 62 (picture type information 62*a*, reference frame information 62*b*) added to the encoded data of the frame number (i) (step SB2) to determine whether the picture type indicated by the picture type information 62*a* is an I picture (step SB3).

Herein, like in the beginning of the playback, if the CPU 8 determines that it is an I picture (YES in step SB3), the I picture is decoded by the CODEC 5. In other words, the CPU 8 causes the CODEC 5 to decode the picture data through intra-frame decoding to output the picture data to the memory 4 (step SB4).

In addition, if the CPU 8 determines that the encoded data of the frame number (i) is not an I picture (NO in Step SB3), it causes the CODEC 5 to decode a P picture (encoded data of the main frame or the sub frame). In other words, the CPU 8 decodes the picture data through interframe predictive decoding in which a picture of a reference frame indicated in the reference frame information 62*b* that has been read out in Step SB2, that is, in the case of P picture of the main frame, a picture that is four frames before, stored in the memory 4, and in the case of P picture of the sub frame, a picture that is one frame before, stored in the memory 4, is respectively used as a reference picture. Then, the CPU 8 causes the CODEC 5 to output the picture data to the memory 4 (step SB5).

After the CPU 8 waits for next display timing at a display frame rate of 1/60 sec (step SB6), the decoded picture data is read out from the memory 4 and the picture data is transmitted to the display control component 6. Thus, the CPU 8 causes the display control component 6 to update a display picture on the LCD 7 in a display timing according to the display frame rate (step SB7).

From thereon, when the CPU 8 determines that processing of the last frame has not completed (NO in Step SB8), after incrementing the frame number (i) by one (step SB9), the previously described process is repeated by returning to Step SB2. When the CPU 8 determines that decoding of the entire encoded data (display of the entire frames) is finished (YES in step SB8), playback is finished.

Figure 6B:
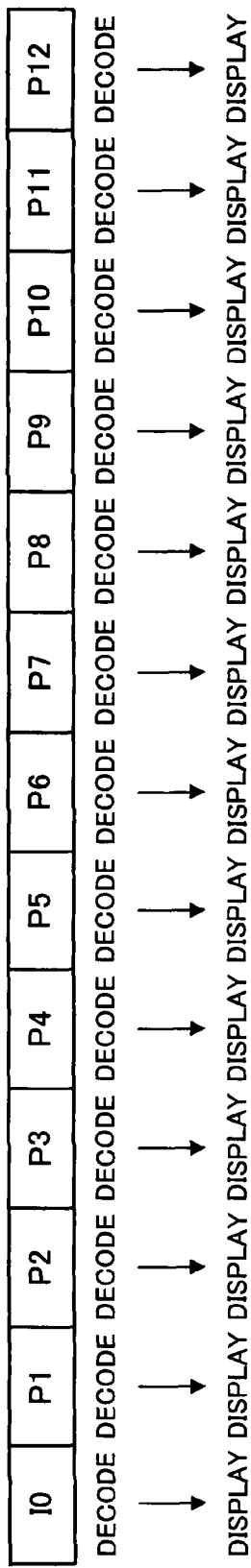
FIG. 6B is a conceptual diagram that shows the presence and absence of decoding and display of each frame during playback in slow playback mode.

Thereby, as shown in FIG. 6B, the CPU 8 causes the CODEC 5 to decode all of the frames that have been taken and recorded at 240 fps in order, and by displaying the picture data of all the frames that have been recorded on the LCD 7 at 60 fps, the motion picture is played slow at a speed of ¼ of the normal speed.

(Playback Action, Normal Speed Playback)

Figure 4:
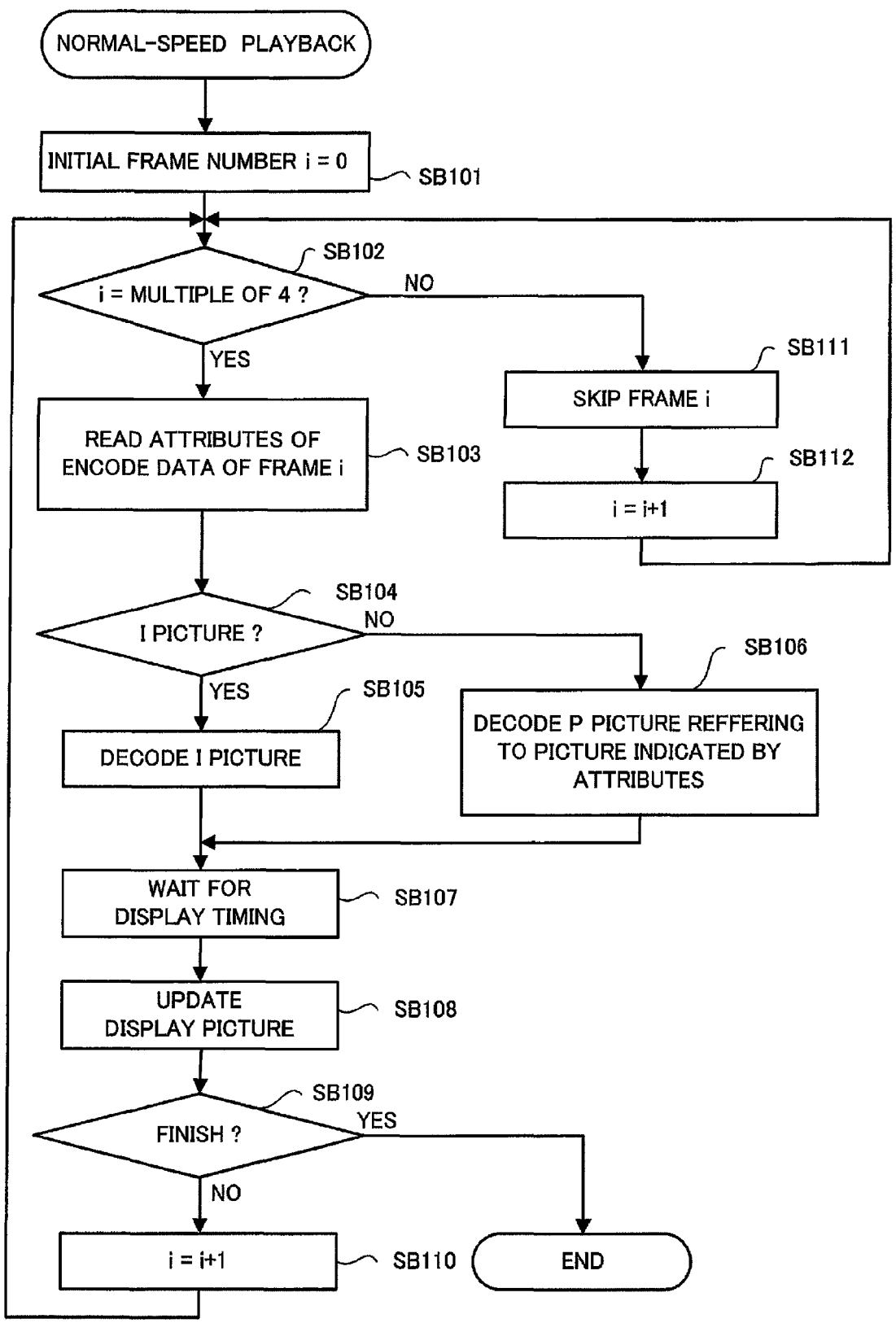
FIG. 4 is a flow chart that shows the action of the motion picture recording device in normal-speed playback mode.

Next, actions in normal playback mode are described following the flow chart of FIG. 4. Even when normal playback mode has been set by the user, the CPU 8 causes the CODEC 5 and the display control component 6 to act at a frame rate of 60 fps.

Then, upon starting playback, the CPU 8 first initializes the frame number (i) (step SB101). Furthermore, the initial value of the frame number is "0" as with recording.

Next, the CPU 8 determines whether the frame number (i) is a multiple of 4 (including the initial value "0"), that is, whether the main frame mentioned above (step SB102). Herein, similar to immediately after starting playback, when the CPU 8 determines that the frame number (i) is a multiple of 4 (YES in step SB102), the attribute information is subsequently read out from the encoded data (step SB103) to determine whether the picture type indicated by the attribute information is an I picture (step SB104).

Then, as in step SB4 through SB9 in the slow playback mode mentioned above, when the CPU 8 determines that it is an I similar to the initial frame at the start of playback, in the case of an I picture (YES in step SB104), an I picture is decoded by the CODEC 5. In other words, the CPU 8 causes the CODEC 5 to decode the picture data through intra-frame decoding and the picture data is output to the memory 4 (step SB105). In addition, when the CPU 8 determines that it is not an I picture, (NO in step SB104), a P picture is decoded by the CODEC 5. In other words, the CPU 8 causes the CODEC 5 to decode the picture data through interframe predictive decoding using a picture of a reference frame (a picture that is four frames before and had been stored in the memory 4=picture of the immediately preceding main frame) indicated by the attribute information that has been read out in step SB103 as a reference picture and the picture data is output to the memory 4 (step SB106). However, unlike in the slow playback mode, the P pictures to be decoded herein are limited to P pictures of the main frame.

After the CPU 8 waits for the timing at a display frame rate of 1/60 sec (step SB107), the decoded picture data is read out from the memory 4 and the picture data is transmitted to the display control component 6. Thus, the CPU 8 causes the display control component 6 to update a display picture on the LCD 7 in a display timing according to the display frame rate (step SB108).

When the CPU 8 determines that processing of the last frame has not completed (NO in step SB109), after incrementing the frame number (i) (Step SB110) by one, the previously described process is repeated by returning to step SB102.

Meanwhile, when the CPU 8 determines that the discrimination result in step SB102 is NO and the new frame number (i) is not a multiple of 4—that is, when it determines that the encoded data that is to be the next processing target is a P picture of the previously described sub frame—the encoded data of the frame number (i) is skipped. In other words, the CPU 8 skips the transfer action of the encoded data that has been taken out from the motion picture file to the CODEC 5 (step SB111), incrementing the frame number (i) by one as it is (step SB112) and returning to step SB102, the processes of steps SB111 and SB112 are repeated until the frame number (i) becomes a multiple of 4.

At the moment when the frame number (i) becomes a multiple of 4 again, the CPU 8 performs the previously described processes of steps SB103 through SB108, causing the CODEC 5 to decode the encoded data (I picture or P picture) of the next main frame and display the decoded picture data on the LCD 7.

Figure 6C:
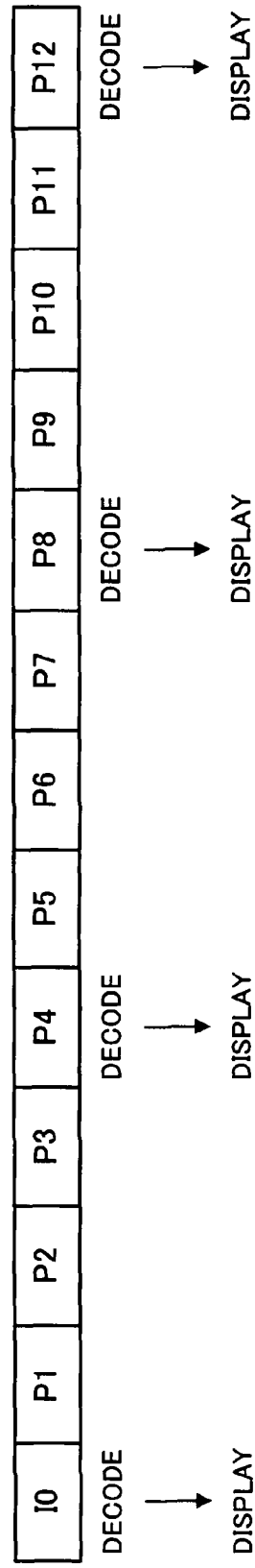
FIG. 6C is a conceptual diagram that shows the presence and absence of decoding and display of each frame during playback in normal-speed playback mode.

From thereon, when the CPU 8 determines that processing of the last frame has not completed (NO in step SB109), after incrementing the frame number (i) (step SB110) by one, the previously described process is repeated by returning to step SB102. In other words, as shown in FIG. 6C, the CPU 8 causes the CODEC 5 to display (decode) the motion picture for every four frames (after three frames). In other words, the CPU 8 plays the motion picture at the normal speed by thinning the frames to be displayed (decoded) to ¼. When the CPU 8 determines that processing of the final frame has completed (YES in step SB109), the playback is finished. Furthermore, when the CPU 8 increments the frame number (i) by one in the previously described step SB112, if it is determined to be exceeding the frame number (i) of the last frame, the playback is obviously finished at that point.

Herein, during playback of a motion picture in normal playback mode described above, among the encoded data of the main frame to be actually displayed, the I picture is an intra-frame coded picture and the P picture is an interframe predictive-coded picture. However, this P picture is encoded regarding the I picture or the P picture of the foremost main frame as a reference picture. Therefore, as described earlier, the CPU 8 can display each main frame with no problems without decoding the encoded data (P pictures) of the sub frames not to be displayed. In other words, the CPU 8 can effectively performs motion picture playback in normal playback mode accompanying frame thinning. Consequently, compared to the past, the entire data-processing volume and power consumption may be reduced.

(Playback Action, Variable Speed Playback)

Figure 5A:
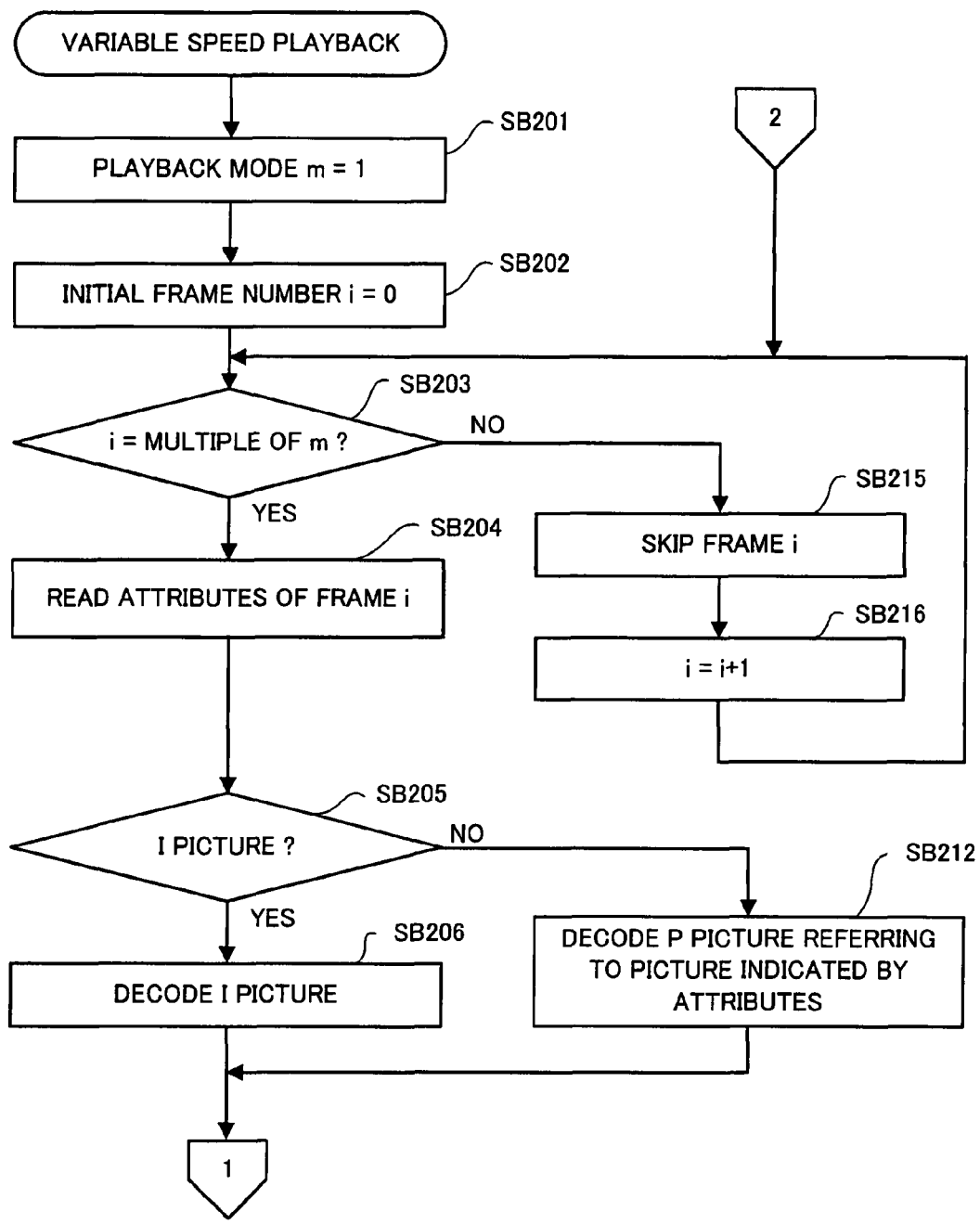
FIGS. 5A and 5B are flow charts that show the action of the motion picture recording device in variable speed playback mode.
Figure 5B:
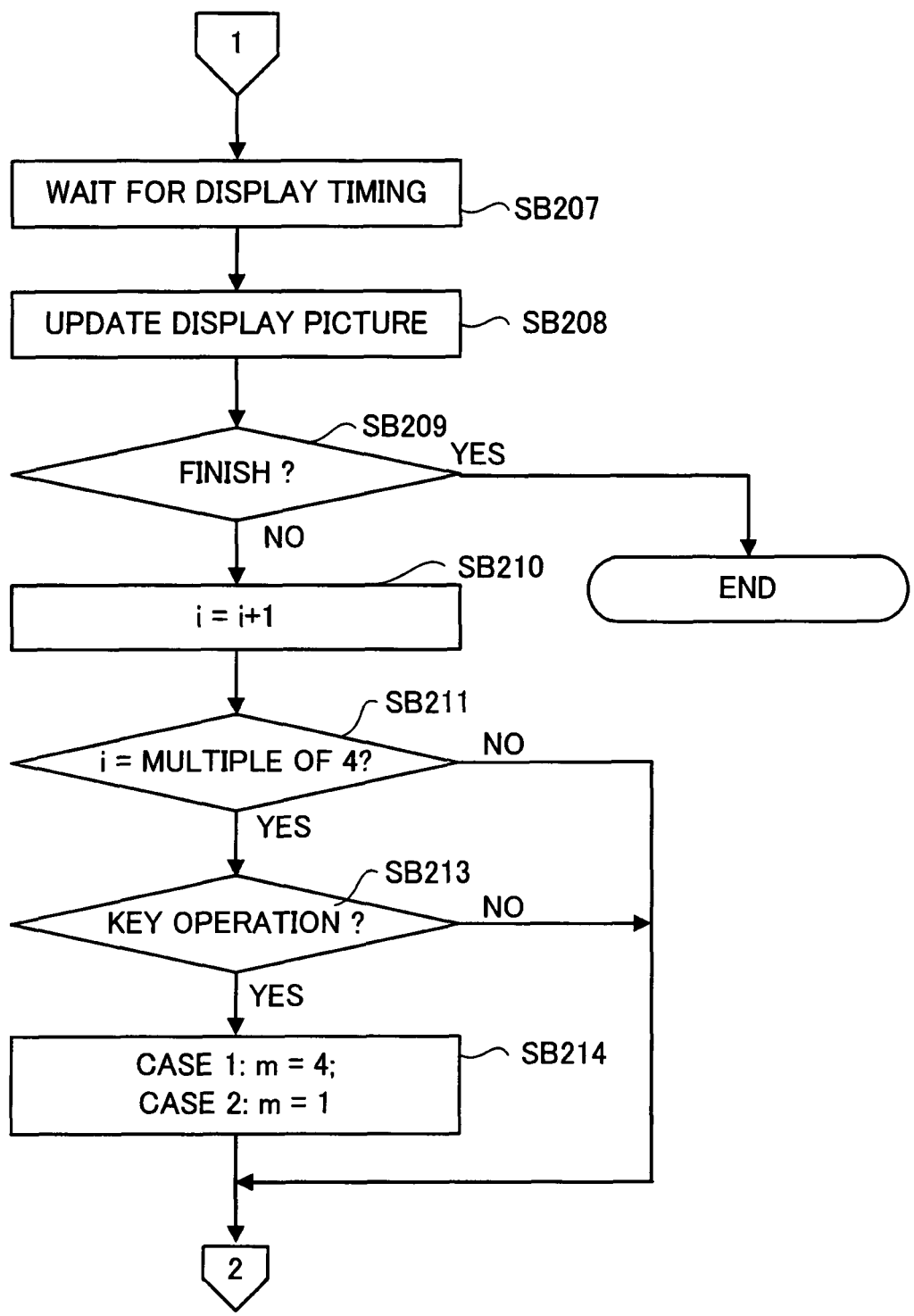

Next, actions in variable speed playback mode are described according to the flow chart of FIG. 5. Even when variable speed playback mode has been set by the user, the CPU 8 causes the CODEC 5 and display control component 6 to act at a frame rate of 60 fps.

Then, upon starting playback, the CPU 8 first initializes the playback mode value (m), which is a parameter for regulating the playback action of the CODEC 5 (step SB201). In other words, the CPU 8 determines the playback mode types. Herein, the playback mode value (m) has two types, i.e., "1" or "4". The "1" is slow playback mode and the "4" is normal speed playback mode, and the CPU 8 sets "1" (slow playback mode) for the playback mode value (m) in the event of initialization. Furthermore, the CPU 8 initializes the frame number (i) (step SB202). In addition, the initial value of the frame number is "0" as with recording.

Thereafter, the CPU 8 determines whether the frame number (i) is a multiple (presuming that "i=0" also is included) of the playback mode value (m) (step SB203). Because i=0 and m=1 immediately after starting playback, the CPU 8 determines YES and reads out the attribute information 62 (picture type information 62a, reference frame information 62b) added to the encoded (step SB204) to determine whether the picture type indicated by the picture type information 62a is an I picture (step SB205). Immediately after starting playback (the first frame), the CPU 8 determines that the encoded data is an I picture (YES in Step205) and causes the CODEC 5 to decode (intra-frame decoding) the I picture and output the decoded picture data to the memory 4 (step SB206).

After the CPU 8 waits for the timing at a display frame rate of 1/60 sec (Step SB207), the decoded picture data is read out from the memory 4 and the picture data is transmitted to the display control component 6. Thus, the CPU 8 causes the display control component 6 to update a display picture on the LCD 7 in a display timing according to the display frame rate (step SB208).

When the CPU 8 determines that processing of the last frame has not completed (NO in step SB209), after incrementing the frame number (i) by one (step SB210), it determines whether the frame number (i) is a multiple of 4 (step SB211). Because i=1 immediately after starting playback, the CPU 8 determines NO herein, the previously described process is repeated by returning to step SB203 as it is.

Because i=1 and m=1 therein, the CPU 8 determines YES in step SB203 and reads out the attribute information 62 added to the encoded data (step SB204) to determine whether it is an I picture (step SB205). The second frame (i=1) is a sub frame and the encoded data of the decoding target is a P picture (NO in Step SB205). Therefore, the CPU 8 reads out a reference picture indicated in the reference frame information 62b accompanying the encoded data of the frame number (i), i.e., a picture that is one frame before from the memory 4, and causes the CODEC 5 to decode a P picture regarding it as a reference picture and output it to the memory 4 (step SB212). After the CPU 8 waits for the timing at a display frame rate of 1/60 sec., it reads out the decoded picture data from the memory 4. The CPU 8 transfers the picture data to the display control component 6, causing the display control component 6 to update a display picture on the LCD 7 in a display timing according to the display frame rate (steps SB207 and SB208). Furthermore, as for the encoded data of the third frame as well as the fourth frame, as in the second frame, the CPU 8 performs a decoding process using a picture that is one frame before and causes the decoded picture data to be displayed on the LCD 7.

Herein, immediately after the picture of the fourth frame is displayed, the CPU 8 determines that the frame number (i) after being incremented by one in step SB210 is "4" (YES in step SB211) and verifies at once whether the speed-changing key has been operated by a user, and if the speed-changing key has not been operated (NO in step SB213), it returns to step SB203. The fifth frame (i=4) is a main frame, and the encoded data of the decoding target is a P picture (NO in step SB205). Therefore, the CPU 8 reads out a reference picture indicated in the attribute information added to the encoded data of the frame number (i), i.e., a picture that is four frames before (picture of the foremost main frame) from the memory 4, and causes the CODEC 5 to decode the P picture (interframe predictive decoding) and output it to the memory 4 (step SB212) by using it. The CPU 8 then causes the picture data to be displayed on the LCD 7 (steps SB207 and SB208).

Thereafter, the CPU 8 repeats the processes in steps SB203 through SB213, and as shown in FIG. 6B, by decoding all the frames to display, as in the case in which the slow playback mode is set by a user at the start of playback, the motion picture played slow at a speed of ¼ of the normal speed. Moreover, in the meanwhile, the CPU 8 verifies the presence and absence of the operation of the speed-changing key for every four frames, i.e., just before processing the encoded data of the main frame.

If the CPU 8 determines that there was any operation of the speed-changing key at any verifying timing during the period (YES in step SB213), after switching the playback mode value (m) from "1" to "4" (step SB214) at that point, the transition to normal playback mode is made by returning to step SB203.

Immediately after the transition is made to normal playback mode, the CPU 8 determines YES in step SB203, and reads the attribute added to the encoded data of the frame i in step SB204. If the CPU 8 determines NO in step SB205, it reads out a picture that is four frames before (a picture of the foremost main frame) from the memory 4 and causes the CODEC 5 to decode (interframe predictive decoding) by regarding it as a reference picture followed by displaying the decoded picture data on the LCD 7. In addition, if the CPU 8 determines YES in step SB205, it causes the CODEC 5 to decode an I picture (intra-frame decoding) followed by displaying the decoded data on the LCD 7.

Afterward, when the CPU 8 determines that the frame number (i) is not a multiple of 4 (NO in step SB203), it skips encoded data (P picture) of the frame at that point—i.e., the sub frame. In other words, the CPU 8 skips transfer action of encoded data obtained from a motion picture file to the CODEC 5 (step SB215)—returns to step SB203 after incrementing frame number (i) (step SB216) by one, which is a procedure that is repeated. On the other hand, when the CPU 8 determines that the frame number (i) is a multiple of 4 (YES in step SB203), the procedure after step SB204 is performed. In other words, if the CPU 8 determines NO in step SB205, the picture four preceding frames (a picture of the foremost main frame) is read out from the memory 4, and after encoded data (P picture) of the main frame is decoded (interframe predictive decoding) with that as a reference picture by the CODEC 5, decoded picture data is displayed on the LCD 7. In addition, if the CPU 8 determines YES in step SB205, decoded picture data is displayed on the LCD 7 after the I picture is decoded (interframe decoding) by the CODEC 5.

Next, in repeating the same steps, similar to the case in which normal-speed playback mode is set, as shown in FIG. 6C, by displaying (decoding) a motion picture every four frames (every fourth frame) (thinning the frames to ¼ to be displayed), the CPU 8 plays the motion picture at normal speed. In addition, in the meantime, every four frames—that is, at the timing just before processing encoded data of the next main frame—the CPU 8 checks whether the speed-changing key was operated (step SB213).

Afterward, if the CPU 8 determines that the speed-changing key had been operated at any designated timing (YES in step SB2 13), after it switches the playback mode value (m) from "4" to "1" (step SB214), it is shifted to slow playback mode at that point by returning to step SB203 and the playback action is continued. Playback is finished when the CPU 8 determines processing of the final frame is complete (YES in step SB209). In addition, when frame number (i) is incremented by one in step SB216 mentioned above, playback should finish at that point if it is determined to exceed the frame number (i) of the final frame.

As mentioned above, in variable speed playback mode, even during playback of the motion picture, when a user operates the speed-changing key at a desired point, the playback mode, i.e., playback speed (moving speed), of the motion picture can be switched to normal speed as well as the speed ¼ of normal speed in real-time.

Moreover, when playback speed is set to normal speed, the main frame in every four frames can be displayed effectively without decoding encoded data (P picture) of the sub frame not to be displayed as mentioned above. Consequently, the entire data processing volume and power consumption can be reduced compared to conventional approaches.

In addition, because motion data comprising only I pictures and P pictures as in this embodiment are accepted in H.264, which is the international standard for motion picture compression, it can be played by an arbitrary motion picture playback device if the configuration enables playback of motion picture data complying with H.264.

(Embodiment 2)

The second embodiment of this invention is described as follows. Similar to the first embodiment, this embodiment relates to a motion picture recording device comprising a recording function that compresses and records a motion picture that was captured at a high-speed frame rate of 240 fps and a playback function that decodes the recorded motion picture data and plays it at a display frame rate of 60 fps.

Figure 7:
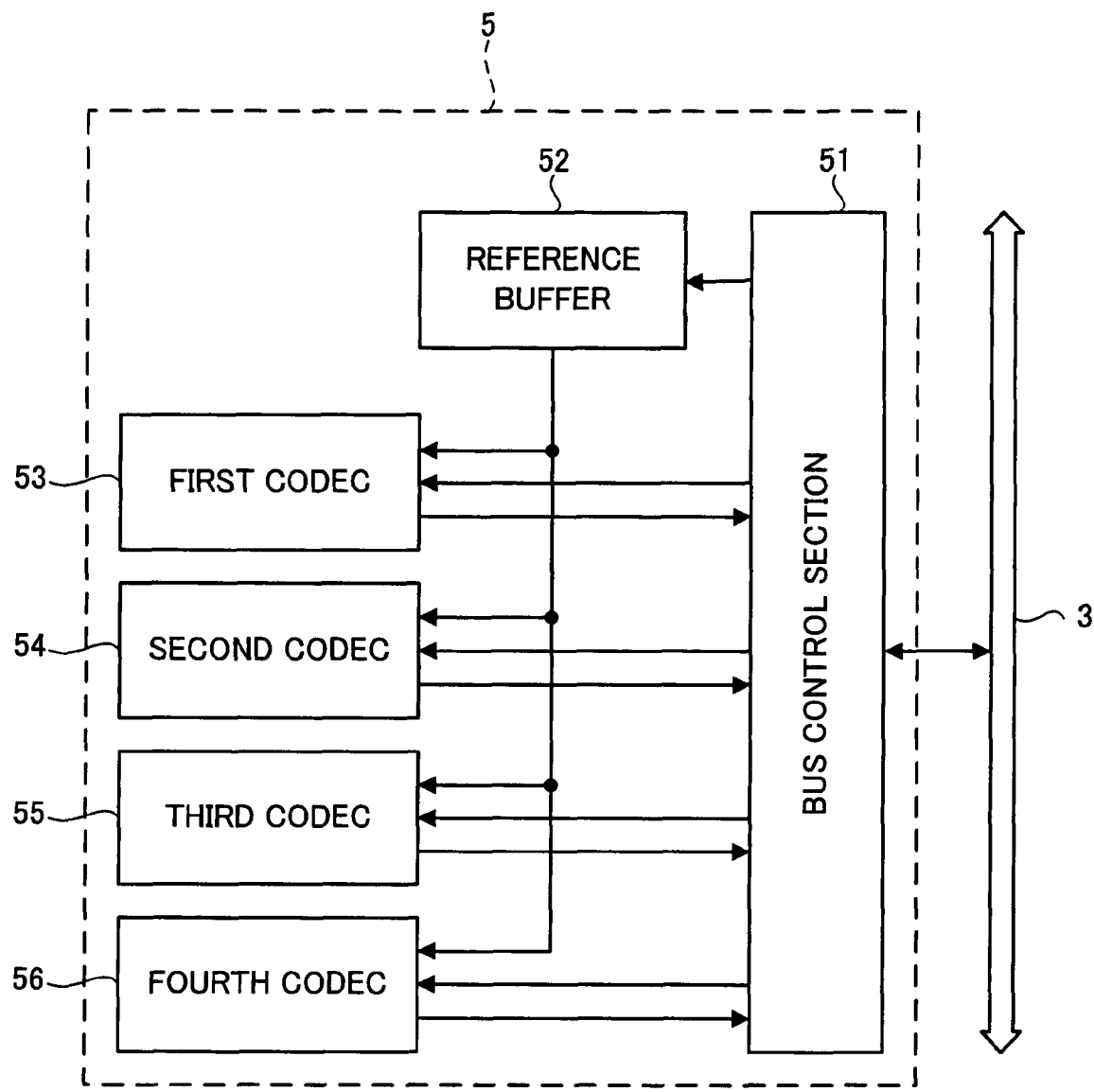
FIG. 7 is a block diagram that shows the configuration of the CODEC in the second embodiment.

The basic configuration of this embodiment is the same as that of the motion picture recording device (FIG. 1) shown in the first embodiment, but the CODEC 5 is configured as described in FIG. 7.

FIG. 7 is a block diagram showing the configuration of a CODEC 5 in this embodiment. As shown in FIG. 7, CODEC 5 is mainly composed of a bus control component 51, a reference buffer 52, and a first CODEC 53 to fourth CODEC 56 placed in parallel.

The first CODEC 53 to the fourth CODEC 56 are parts comprising the main process component for encoding and decoding motion picture data, and each has an identical specification as well as processing capacity that enables encoding and decoding of picture data in VGA (640×480 pixels) size at a processing speed 60 of fps. In other words, the first CODEC 53 to the fourth CODEC 56 are composed of an orthogonal transform circuit, a quantization circuit, a motion detection circuit, a forward prediction circuit, an encoding circuit, a decoding circuit, and a reverse orthogonal transform circuit, each of, which is described as the configuration of the CODEC 5 in the first embodiment.

Herein, the method for encoding motion pictures with CODEC 5 in this embodiment is compliant with H.264, which is the international standard mentioned in the first embodiment. In addition, H.264 is a method for the compression encoding of images that was standardized in 2003 with JVT (Joint Video Team), which is a joint standardization committee of ITU-T (International Telecommunication Union-Telecommunication Standardization Sector) and MPEG (Moving Picture Experts Group). H.264 is standardized as H.264 by ITU-T and MPEG-4 Part 10 Advanced Video Coding (AVC) by MPEG and is also referred to as H.264/MPEG-4Avc.

The reference buffer 52 corresponds to the frame memory described in the first embodiment. The reference buffer 52 reads out part of a reference picture required when the first CODEC 53 to the fourth CODEC 56 encode and decode picture data of every frame from the memory 4 (FIG. 1) as required by the process and subsequently stores it, delivering common picture data to the first CODEC 53 to the fourth CODEC 56. Specifically, a macro block in the same position as a macro block for each process, and picture data of a part required for motion exploration and motion prediction are temporarily stored.

The bus control component 51 controls input and output of picture data and encoding data for the memory 4 as required by the first CODEC 53 to the fourth CODEC 56. In this embodiment, control by the bus control component 51 based on instructions from the CPU 8 causes the first CODEC 53 to the fourth CODEC 56 to independently encode and decode different types of pictures, such as the first CODEC 53 for I pictures and others for P pictures.

In addition, picture data of a reference frame must be delivered to the first CODEC 53 to the fourth CODEC 56 via the reference buffer 52. Therefore, all P pictures that are encoded at the same time always become pictures with the identical frame as a reference frame (reference picture).

There are differences in configuration of the CODEC 5 in this embodiment from that described in the first embodiment.

Actions and operation of the motion picture recording device of this embodiment are described as follows.

(Recording Action)

Figure 8A:
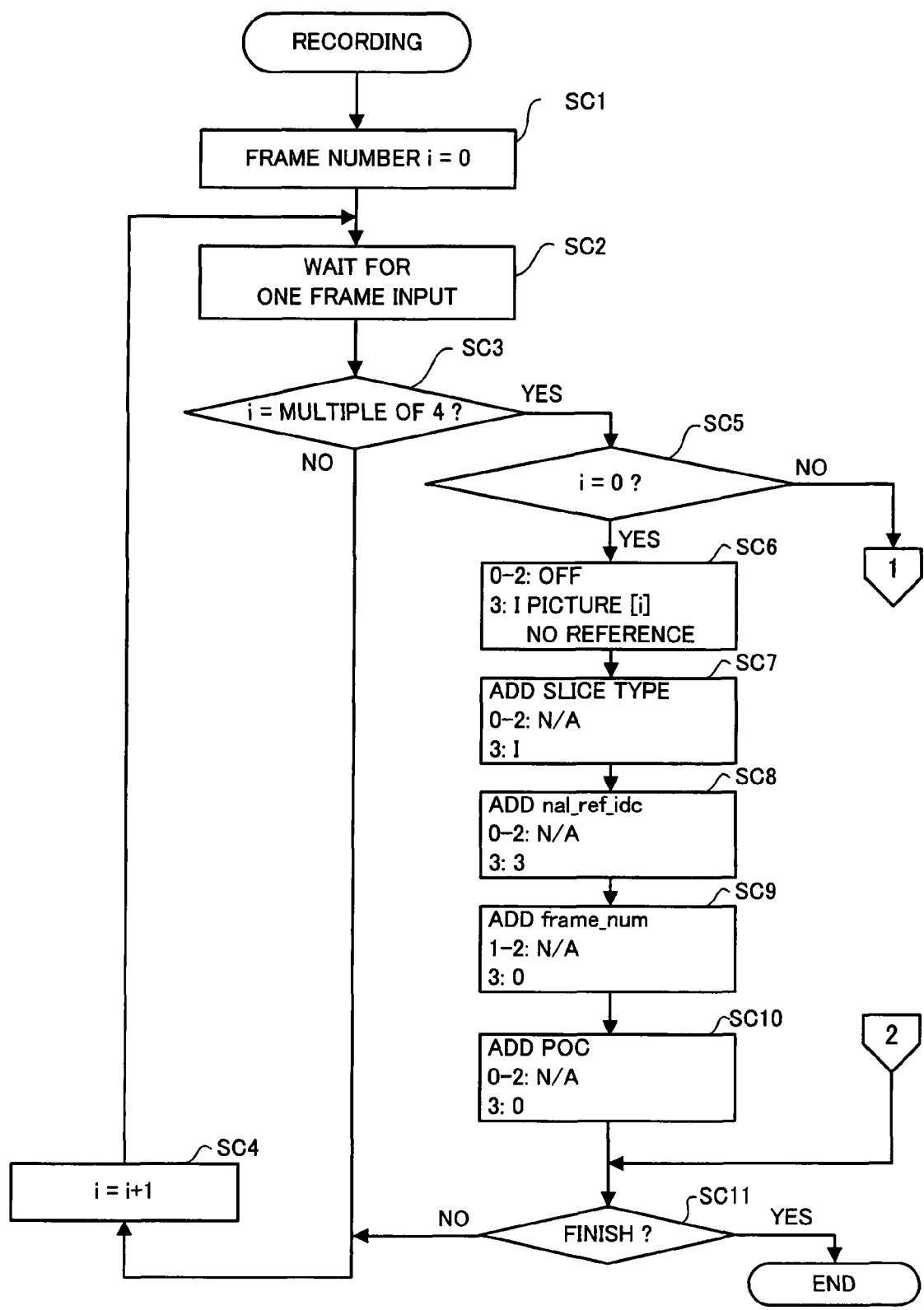
FIGS. 8A and 8B are flow charts that show the action of the motion picture recording device of the second embodiment in the recording mode.
Figure 8B:
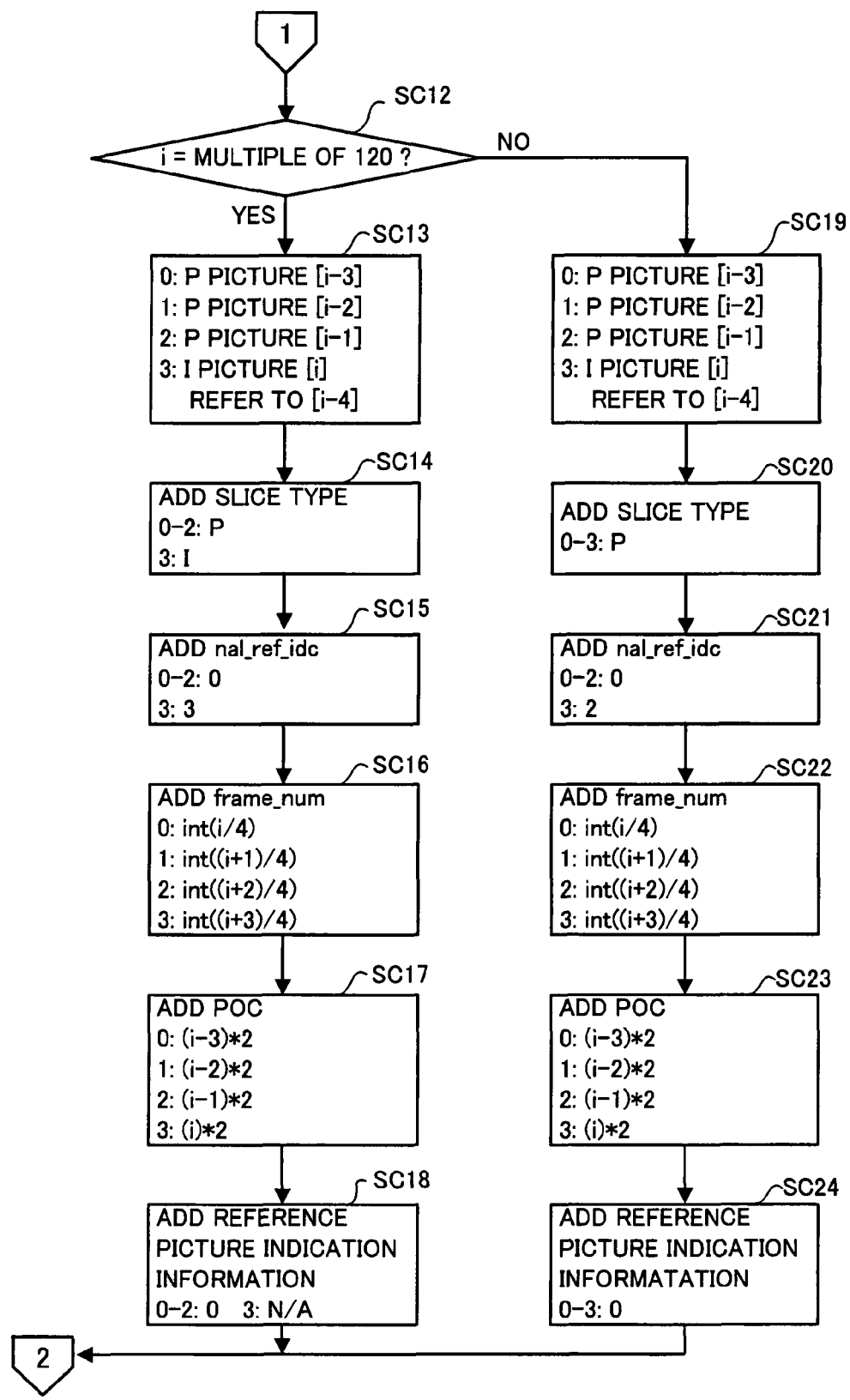
Figure 9:
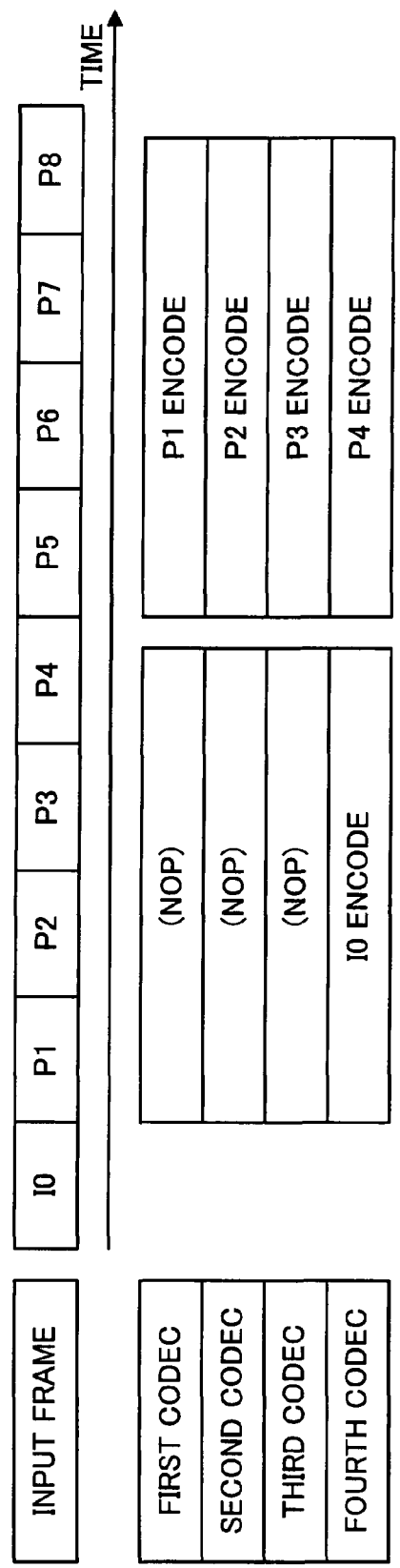
FIG. 9 is a timing diagram that shows the encoding process by a CODEC.
Figure 11A:
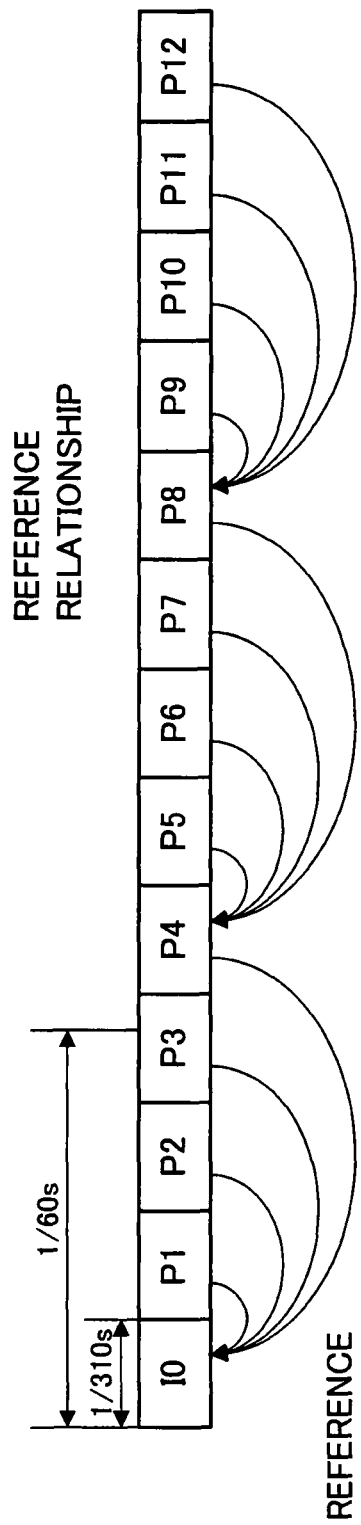
FIG. 11A is a conceptual diagram that shows the configuration of motion picture data recorded in the recording mode.

The action in motion picture taking and recording in a recording mode is described as follows. FIG. 8 is a flow chart showing the content of control of the CODEC 5 by the CPU 8 in motion picture taking and recording. FIG. 9 is a timing diagram in the encoding process of motion picture data in the first CODEC 53 to the fourth CODEC 56. FIG. 10A and FIG. 10B are a series of motion picture data generated during motion picture taking and recording, i.e., conceptual diagrams showing an outlined configuration of an H.264 stream. FIG. 11A to 11C are figures corresponding to FIGS. 6A to 6C shown in the first embodiment. FIG. 11D is a conceptual diagram showing the presence and absence of decoding and display of each frame during playback in the twofold slow playback mode.

First, before specifically describing the action, differences from the first embodiment are described in FIGS. 11A to 11D. FIG. 11A is a conceptual diagram showing the configuration of motion picture data generated in the motion picture recording in this embodiment. Similar to FIG. 6A, in FIG. 11A, "I" is an I picture, "P" is a P picture other than the I picture with a frame number that is a multiple of 4, and "p" is a P picture with a frame number other than a multiple of 4, and each frame is represented in combination with the encoding type (I picture/P picture) and the frame number (the initial frame is "0"). In addition, the arrow indicates the destination to, which each P picture is referenced. Moreover, the interval of the inserted I picture is 0.5 seconds (every 120 frames) in this embodiment, as well.

In motion picture recording, similar to the first embodiment, the CPU 8 encodes the initial frame 0 as an I picture (I0), a P picture of the frame 4 (P4), which is a main frame, with the I picture (I0) of the foremost main frame as a reference picture, and similarly, P pictures (P8, P12) of the frames 8, 12 with P pictures (P4, P8) of the respective foremost main frames as reference pictures.

In the meantime, in this embodiment, the CPU 8 also encodes P pictures (p1, p2, p3) of frames 1 to 3, which are sub frames, with the I picture (I0) of the foremost main frame as a reference picture. Similarly, the CPU 8 also encodes P pictures (p5, p6, p7) of frames 5 to 7, which are other sub frames, and P pictures (p9, p10, p11) and frames 9 to 11 with P pictures (P4, P8) of the foremost main frames as reference pictures. In other words, the CPU 8 encodes P pictures (p1, p2, p3) of all of the sub frames with the I picture or the P picture of the foremost main frame as a reference picture.

Specific content of the action in motion picture taking mainly regarding the encoding process mentioned above in this embodiment is described as follows in accordance with FIG. 8. Herein, the size of the motion picture is recorded in VGA size. In addition, in recording, the CPU 8 operates a picture-capturing component 1 and a picture-generating component 2 at a frame rate of 240 fps and synchronizes each component by frame. However, the CODEC 5 is synchronized at a frame rate of 60 fps by four frames.

As shown in FIG. 8, the CPU 8 first initializes frame number (i) at the beginning of recording (step SC1). The default of frame number (i) (the number of the initial frame) is "0". Next, the CPU 8 waits for picture data for one frame to be input (accumulated) in the memory 4 (step SC2) and determines whether frame number (i) is a multiple of 4 (step SC3). When the CPU 8 determines frame number (i) is not a multiple of 4 (NO in step SC3), it repeats increments of frame number (i) (step SC4) only. On the other hand, when the CPU 8 determines frame number (i) is a multiple of 4 (YES in step SC3), it causes the CODEC 5 to perform the encoding process described below. However, the first frame (i=0) immediately after the action begins is exceptionally determined to have a frame number (i) that is a multiple of 4.

First, when the CPU 8 determines picture data of the first frame is input to the memory 4 (YES in steps SC3 and SC5), it reads out picture data of the first frame stored in the memory 4 and inputs it to the fourth CODEC 56 of the CODEC 5, and picture data input to CODEC 56 is output to the memory 4 as I pictures by interframe encoding (step SC6). At that time, because the first frame is a non-reference frame, the CPU 8 causes the fourth CODEC 56 to perform local decoding for the encoded I picture and output the locally decoded picture data to a predefined region in the memory 4 as data of a reference picture.

Continuing, to encoded data stored in the memory 4 in step SC6 mentioned above, the CPU 8 adds "I" as a slice type, "3" as nal_ref_idc, "0" as frame_num, and "0" as POC (steps SC7 to SC10).

Herein, the slice type added (written in the H.264 stream) to encoded data is the picture parameter described as picture identification information 62a in the first embodiment, and nal_ref_idc, frame_num, and POC are the picture parameters regulated by the H.264 standard (specifically, "ITU-T Recommendation H.264 Advanced video coding for generic audiovisual services").

Specifically, nal_ref_idc is a parameter that can take values ranging from 0 to 3, which is regulated to define a picture to be referenced as not "0" and a picture not to be referenced as "0". In addition, nal_ref_idc is regulated to show the "relative priority" of packets as a standard technical specification, for example, when data encoded by H.264 is transmitted via RTP (Real-Time Transport Protocol) in "RFC3984: RTP Payload Format for H.264 Video" published by IETF (Internet Engineering Task Force). In other words, it is regulated that 0 is the lowest priority in order of decreasing priority, such as 3, 2, and 1.

frame_num is a parameter regulated to take values other than 0 for a frame referring to other frames, and it is regulated by H.264:
to count up every reference picture (a picture next to a reference picture).
to increase basically by 1
in which only the order has meaning, regardless time.

POC (Picture Order Count) is a parameter that shows the output order of pictures, which is regulated by H.264:
to take a value proportional to sampling time of a picture with an IDR (Instantaneous Decoder Refresh) picture as the basis (0) (*NOTE 2 in 8.2.1).
to require size as the output order (* C.4.5.3)
to use a value proportional to the actual time (*8.4.1.2.3).
In addition, digits following * in brackets above are the chapter numbers in the H.264 standard. Moreover, the IDR picture is regulated to be "an I picture and a picture that can decode all pictures subsequent to it in a decoding order without referring to its preceding pictures in the decoding order".

To continue, when the CPU 8 determines frame number (i) of picture data input to the memory 4 is a multiple of 4 (YES in step SC3 and NO in step SC5), it first checks whether frame number (i) is a multiple of 120. When the CPU 8 determines that the frame number (i) is not a multiple of 120, such as 4, 8, 16, . . . 116 (NO in step SC12), frame pictures with frame numbers (i−3) to (i−1) stored in the memory are read out and input to the first CODEC 53 to third CODEC 55 via the bus control component 51. Using picture data of the reference picture with frame number (i−4) that is stored in the memory 4 and will be stored in the reference buffer 52 by a macro block according to the process, the CPU 8 causes the first CODEC 53 to third CODEC 55 to encode each as a P picture in parallel with the frame pictures with frame numbers (i−3) to (i−1), which are sub frames, and each set of encoded data is output to the memory 4.

At the same time, the CPU 8 reads out the frame picture with frame number (i) stored in the memory 4 and input it to the fourth CODEC 56 via the bus control component 51. The CPU 8 causes the fourth CODEC 56 to encode a new main frame picture with frame number (i) as a P picture and output encoded data to the memory 4, using a reference picture with frame number (i−4)—i.e., picture data of the foremost main frame. Moreover, the CPU 8 causes the fourth CODEC 56 to perform local decoding for the encoded P picture and output the locally decoded picture data to a predefined region in the memory 4 as data of a reference picture (step SC19).

In other words, the CPU 8 causes sub frames for three frames with serial frame numbers and four frame pictures of subsequent main frames collectively (in parallel) to be encoded by the CODCEC 5 by four frames. For example, when the fourth frame picture is input in the memory 4 as shown in FIG. 9, the CPU 8 collectively encodes P pictures (p1, p2, p3) with frame numbers 1 to 3 and a P picture (P4) with frame number 4.

Next, the CPU 8 adds "P" as a slice type to all encoded data output by the first CODEC 53 to the fourth CODEC 56 and is stored in the memory 4 (step SC20), "0" as nal_ref_idc to each set of encoded data output by the first CODEC 53 to the third CODEC 55 and is stored in the memory 4, and "2" as nal_ref_idc to encoded data output by the fourth CODEC 56 and is stored in the memory 4 (step SC21).

In addition, the CPU 8 adds values obtained from int (i/4), int ((i+1)/4), int ((i+2)/4), int ((i+3)/4) as frame_num in order of increasing corresponding frame numbers to each set of encoded data output by the first CODEC 53 to the fourth CODEC 56 and each stored in the memory 4 (Furthermore, int (n) is a function that obtains the maximum integer less than the argument n). For example, the CPU 8 adds 1, 1, 1, 1 to pictures with frame numbers 1 to 4 respectively, and 2, 2, 2, 2 to pictures with frame numbers 5 to 8 respectively. In other words, the CPU 8 adds a value, which is 0 for the initial frame and incrementally increased by 1 for every four frames throughout all of the frames, with 1 as default (identical value) to each set of encoded data (step SC22).

Furthermore, to each set of encoded data, as POC, in order of increasing corresponding frame numbers, the CPU 8 adds values obtained from (i−3)×2, (i−2)×2, (i−1)×2, and (i)×2 (values twofold of the frame number corresponding to each set of encoded data) respectively. For example, the CPU 8 adds 2, 4, 6, 8 respectively when frame number is 1 to 4. In other words, to each set of encoded data, the CPU 8 adds a value that increases by 2 every other frame throughout all of the frames, with 0 as default, is added (step SC23).

Moreover, to each set of encoded data, as a value of reference picture information (reference picture indication information) that indicates a picture to be referenced when each set of encoded data is decoded, the CPU 8 adds "0", which is a value that indicates the foremost reference picture (pictures that are referenced) of each picture (frame) (step SC24). Here, the foremost reference picture of each picture is a picture whose frame number is the closest to a frame number of each picture (i.e. an I picture or a P picture, four pictures earlier), of the pictures preceding to each picture and each being added with a value other than "0" as the nal_ref_idc. The value of reference indication information is a value regulated by H.264 as mentioned in the first embodiment. In H.264, this value is regulated to increase independently from the frame wherein the value that indicates the foremost reference picture is "0" as mentioned above, the value that indicates a reference picture one picture before that is "1", and the value that indicates a reference picture one picture further before that is "2".

On the other hand, when the CPU 8 determines that the picture data input in the memory 4 has frame number (i), which is a multiple of 120 (YES in Step SC12), it reads out the frame pictures with frame numbers (i−3) to (i−1) stored in the memory and inputs them to the first CODEC 53 to the third CODEC 55 via the bus control component 51. Similar to step SC19 mentioned above, using picture data of the reference picture with frame number (i−4) that is stored in the memory 4 and will be stored in the reference buffer 52 via micro block as the process requires, first CODEC 53 to the third CODEC 55 encode the frame pictures with frame numbers (i−3) to (i−1), which are each sub frames, as P pictures of sub frames in parallel and output each set of encoded data to the memory 4.

In addition, the CPU 8 reads out the frame picture with frame number (i) stored in the memory 4 and inputs it to the fourth CODEC 56 via the bus control component 51. To make the frame with frame number (i) an I picture, similar to step SC6 mentioned above, the CPU 8 causes the fourth CODEC 56 to perform intraframe encoding for the input picture data and output the encoded data to the memory 4. Moreover, the CPU 8 causes the fourth CODEC 56 to perform local decoding for the encoded I picture and output the locally decoded picture data to a predefined region in the memory 4 as data of a reference picture (step SC13).

Next, the CPU 8 adds "P" as a slice type to each set of encoded data output by the first CODEC 53 to the fourth CODEC 56 and is stored in the memory 4, and adds "I" as a slice type to the encoded data output by the fourth CODEC 56 and is stored in the memory 4 (step SC14).

Additionally, the CPU 8 adds "0" as nal_ref_idc to each set of encoded data which is output by the first CODEC 53 to the third CODEC 55 and stored in the memory 4, and "3" as nal_ref_idc to the encoded data which is output by the fourth CODEC 56 and stored in the memory 4 (step SC15).

In the same process as SC22 and SC23 mentioned above, for each set of encoded data output by the first CODEC 53 to the fourth CODEC 56 and stored in the memory 4, the CPU 8 calculates values as frame_num and POC in turn and adds the calculated values to each set of encoded data (steps SC16 and SC17).

Moreover, the CPU 8 adds "0", which is a value showing the foremost reference picture (picture that is referenced) as reference picture indication information, to each set of encoded data output by the first CODEC 53 to the third CODEC 55 and is stored in the memory 4 only (step SC18).

In addition, after being sequentially output from the CODEC 5 to the memory 4 as mentioned above, encoded data added with various types of picture parameters is output to the memory card 10 by a memory card control component 9 and is recorded as a motion picture file.

Afterward, all of the processes mentioned above are repeated during motion picture taking and recording. Thereby, in the memory card 10, P pictures of all of the sub frames are encoded with I pictures or P pictures of the foremost main frame as reference pictures as mentioned above, and as the picture parameter (slice types, nal_ref_idc, frame_num, POC and reference picture indication information), H.264 streams added with the values shown in FIG. 10A are output to each frame.

The recording action is finished when the CPU 8 determines that there is an instruction via a predefined key operation to finish recording (YES in step SC11). With this action, a motion picture file complying with H.264 can be recorded in the memory card 10.

In addition, the increment of POC mentioned above is 2 in this embodiment, but it can be 1 in the H.264 standard, because a motion picture decoded by the playback action described below is assumed to be displayed via the interlace method with 60 fields and 30 frames.

Herein, in this embodiment, as shown in FIG. 7, the CODEC 5 is composed of the reference buffer 52 and first CODEC 53 to fourth CODEC 56 placed in parallel. During recording as mentioned above, with multiple picture data of a sub frame and the following main frame as a pair, the relevant pair of picture data is collectively encoded with a picture from the same frame stored in the reference buffer 52 as a reference picture.

Therefore, the bandwidth of a memory bus 3 in the motion picture recording device can be reduced, because picture data read out as reference frames can be decreased by a parallel number.

(Playback Action)

The action in playing a motion picture (a motion picture file) recorded in the memory card 10 by the recording action mentioned above in this embodiment is described as follows.

Herein, in this embodiment, the performance of the display control component 6 is 60 fps, and during motion picture playback, the CPU 8 reads out arbitrary motion picture file data stored in the memory card 10 and selected by a user at a frame rate of 60 fps via the memory card control component 9, and sequentially transfers the encoded data part to the CODEC 5.

Moreover, in this embodiment, a fourfold slow playback mode (a mode with playback speed ¼ of normal speed), a normal-speed playback mode (a mode with a playback speed that is the same normal speed as of picture-taking) and twofold slow playback mode (a mode with a playback speed that is ½ of normal speed) are set up as playback mode. The actions by mode are described as follows. In addition, FIG. 11B to FIG. 11D are conceptual diagrams showing the implementation or lack thereof of decoding and the display of encoded data for each frame during playback in each playback mode.

(Playback Action: Fourfold Slow Playback)

The fourfold slow playback mode is the same mode as the playback mode for slow playback mode in the first embodiment. In the fourfold slow playback, among the first CODEC 53 to the fourth CODEC 56 shown in FIG. 7, the first CODEC 53 only is used. By the same action of the first embodiment shown and outlined in FIG. 3, as shown in FIG. 11B, all of the frames recorded at 240 fps are sequentially decoded at 60 fps, and the picture data is subsequently displayed. In other words, a motion picture is played in slow motion at ¼ speed.

However, in this embodiment, as shown in FIG. 11A, unlike the first embodiment, not only in the decoding process for P pictures of the main frames (P4, P8, . . . ) but also for P pictures (p1, p2, p3, . . . ) for sub frames, pictures (I0, P4, . . . ) of the foremost main frames are used as reference pictures. In addition, in the decoding process for encoded data, not only the first CODEC 53 but also one of the second CODEC 54 to the fourth CODEC 56 can be used.

(Playback Action: Normal-speed Playback)

Figure 12:
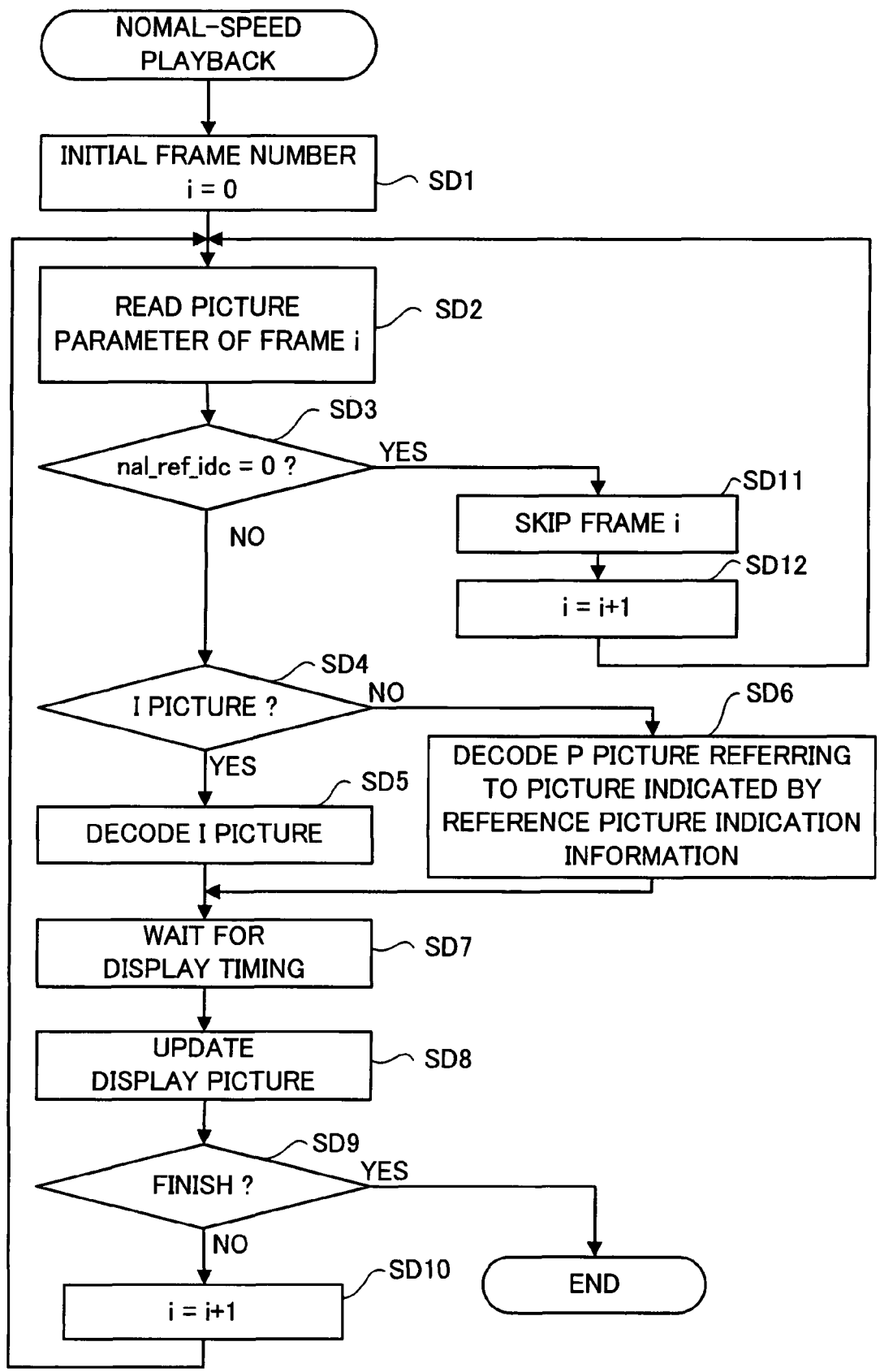
FIG. 12 is a flow chart that shows the action of the motion picture recording device of the second embodiment in normal-speed playback mode.

FIG. 12 is a flow chart showing action with normal-speed playback mode in this embodiment.

Furthermore, in normal-speed playback mode, encoded data is decoded using only the first CODEC 53 of the first CODEC 53 to the fourth CODEC 56. In normal-speed playback mode, an action with almost the same content as shown in FIG. 4 in the first embodiment is performed (steps SD1 to SD12).

Therein, unlike the first embodiment, the CPU 8 reads picture parameters mentioned in step SD2, and in the following step SD3, it determines whether each frame should be a decoding target based on the value of nal_ref_idc among the picture parameters. When the value is not "0"—which indicates a non-reference frame (a picture that is not referenced), i.e., only when the CPU 8 determines it is a main frame—the frame may be a decoding target. In addition, in step SD6, referring to the reference picture indication information, for P pictures of main frames, similar to the first embodiment, a decoding process with I pictures or P pictures of the foremost main frames as reference pictures is performed. Herein in this embodiment, also for P pictures of all sub frames, a decoding process with I pictures or P pictures of foremost main frames as reference pictures is performed.

Thereby, in normal-speed playback mode, as shown in FIG. 11C, among all of the frames recorded at 240 fps, only the main frames (I pictures or P pictures) of every fourth frames (every fourth frame) are decoded at 60 fps and displayed. In other words, by ¼ thinning of the display frame, a motion picture is played at normal speed.

Thus, in the normal-speed playback mode, similar to the first embodiment, all P pictures as main frames can be displayed without decoding the encoded data of sub frames not to be displayed, so the amount of data processing and power consumption can be reduced.

(Playback Action: Twofold Slow Playback)

Figure 13:
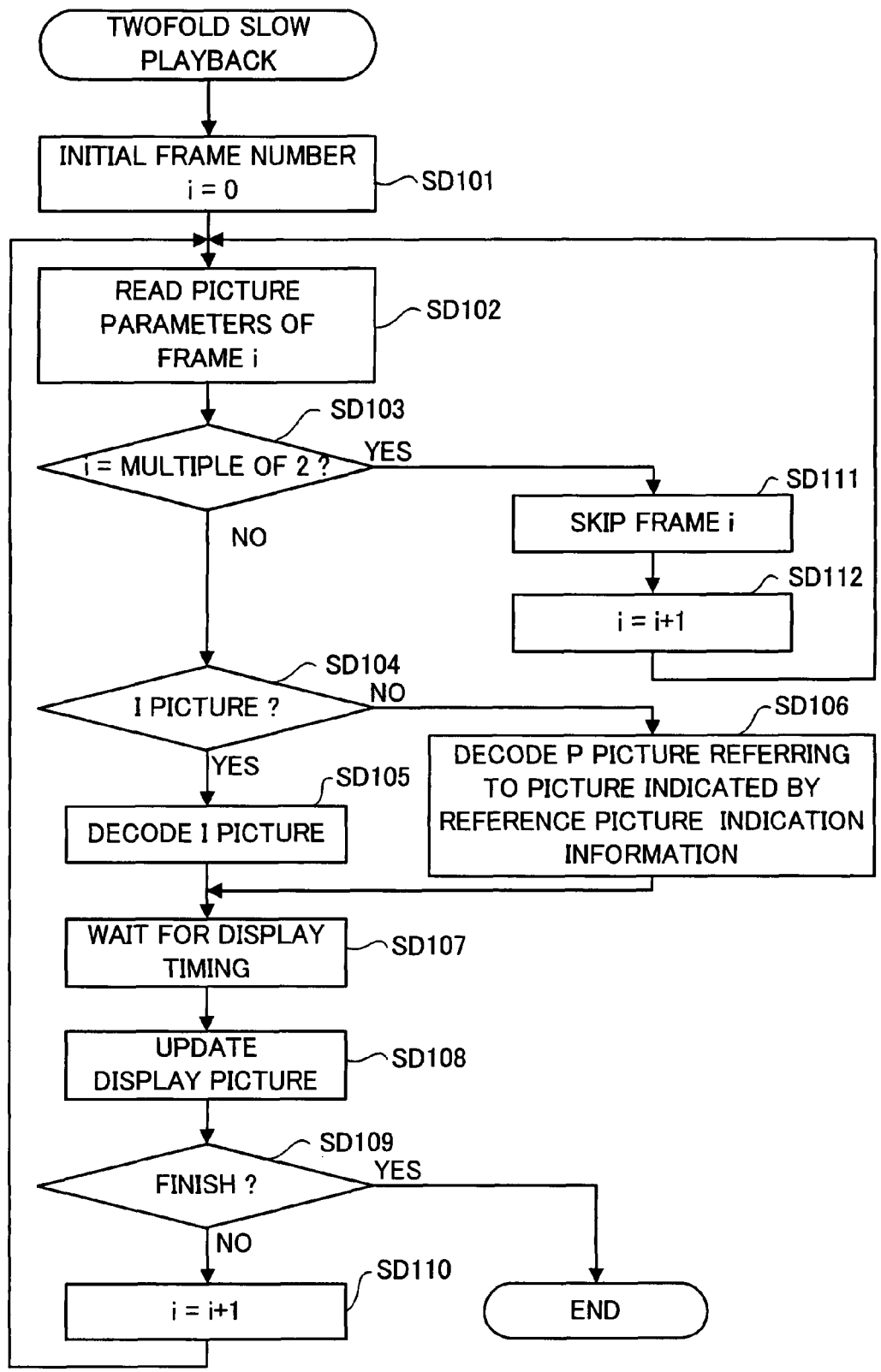
FIG. 13 is a flow chart that shows the action of the motion picture recording device of the second embodiment in twofold slow playback mode.

FIG. 13 is a flow chart showing the action with the twofold slow playback mode in this embodiment. Also in the twofold slow playback mode, the motion picture recording device related to this embodiment decodes encoded data using only the first CODEC 53 among the first CODEC 53 to the fourth CODEC 56. As is clear from FIG. 13, the only difference from the action in normal-speed playback mode shown in FIG. 12 is that, in step SD103, only frames with frame number (i) which is a multiple of 2 (however, 0 is exceptionally processed as a multiple of 2) may be decoding targets.

Thereby, in twofold slow playback mode, as shown in FIG. 11D, every two frames (every second frame) of all of the frames recorded at 240 fps are decoded at 60 fps and displayed. In other words, a motion picture can be played slow at ½ of normal speed by ½ thinning of the display frame.

In this embodiment, not only P pictures of the main frames but also P pictures of the sub frames are encoded with I pictures or P pictures of the foremost main frames as reference pictures in motion picture recording. Therefore, also when a motion picture is played slow at ½ of normal speed as mentioned above, encoded data of the sub frame to be displayed can be decoded without decoding encoding data of sub frames not to be displayed. Thus, it can be performed effectively in relevant cases, and the amount of data processing and power consumption can be reduced in such cases.

(Normal-speed Extraction Editing Action)

On the other hand, in the motion picture recording device of this embodiment, in addition to the recording mode and playback modes (fourfold slow playback mode, normal-speed playback mode, and twofold slow playback mode), a normal-speed extraction editing mode is equipped as an action mode. The normal-speed extraction editing mode is a mode wherein stream parts of main frames (normal-speed playback frames) only displayed in normal-speed playback mode as shown in FIG. 10B are extracted from motion picture data recorded as a motion picture file in the memory card 10 by the recording action—i.e., high-speed captured motion picture stream with VGA size at 240 fps—and a new motion picture stream is generated composed of the extracted part in VGA size at 60 fps and recorded in the memory card 10.

Figure 14:
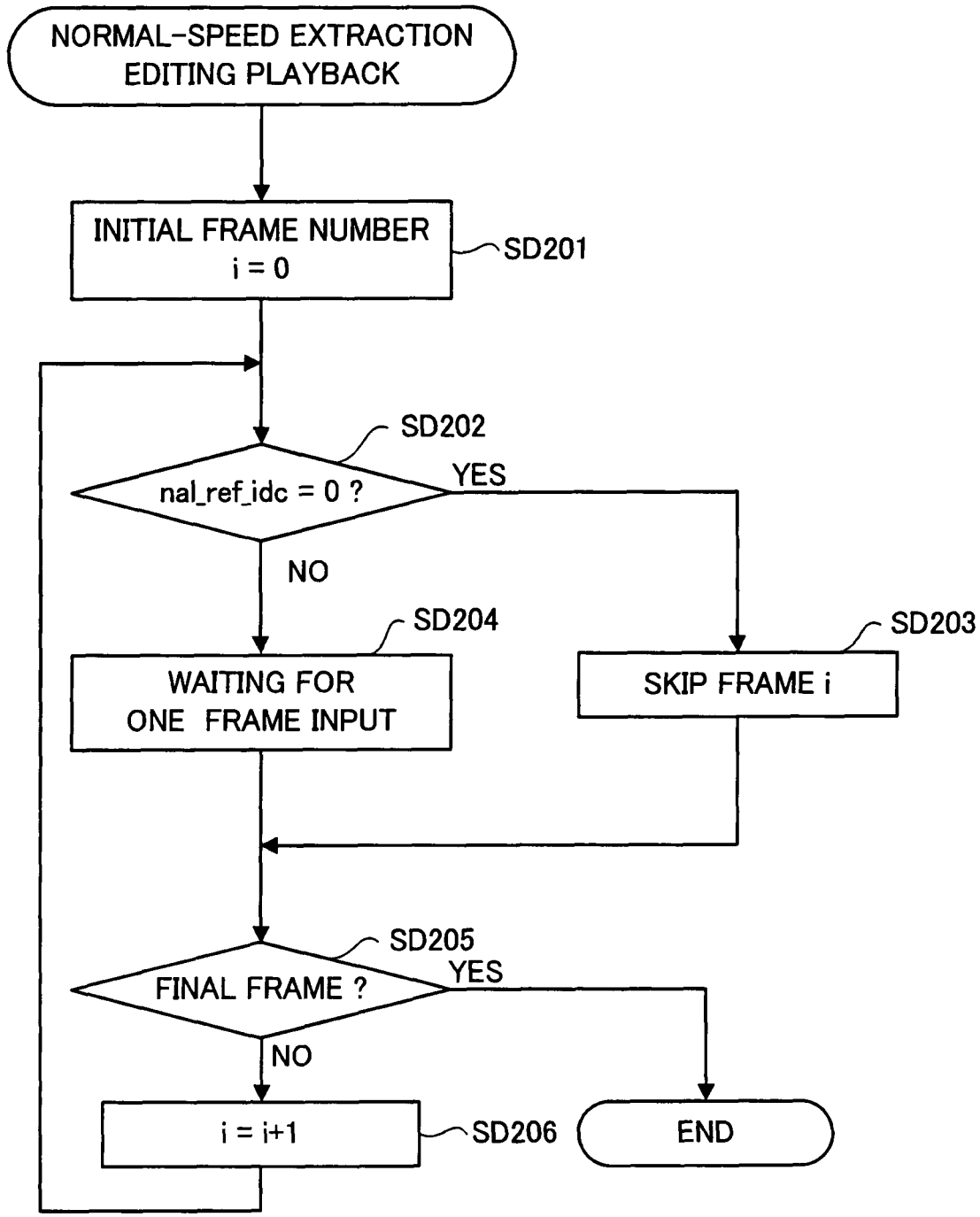
FIG. 14 is a flow chart that shows the action of the motion picture recording device of the second embodiment in normal-speed extraction editing mode.

FIG. 14 is a flow chart showing the process of the CPU 8 when editing arbitrary motion picture data recorded in the memory card 10 in the normal-speed extraction editing mode.

At the start of editing, the CPU 8 first initializes the processing frame number (i) and starts reading out a high-speed captured motion picture stream, which is an editing target from the memory card 10 (step SD201). In addition, the default of the processing frame number (i) is "0".

Afterward, for a high-speed captured stream, the CPU 8 determines the value of nal_ref_idc written in the stream in every frame (step SD202). When the CPU 8 determines value of nal_ref_idc is "0" (YES in step SD202), it skips the stream with frame number (i) at that time (step SD203). Only when the CPU 8 determines that the value of nal_ref_idc is other than "0" (NO in step SD202), it writes the stream for the frame with frame number (i) in the memory card 10 (step SD204).

Afterward, when the CPU 8 determines that the frame to be processed is not the final frame (NO in step SD205), after incrementing frame number (i) by one (step SD206), the processes mentioned above (steps SD202 to SD204) are repeated. All of the processes are completed when the CPU 8 determines that the process for the stream of the final frame (skipping or writing) is finished (YES in Step SD205).

Thus, by using the normal-speed extraction editing mode, the motion picture recording device related to this embodiment can automatically generate a new motion picture comprising the motion picture stream structure shown in FIG. 10B, wherein motion pictures have 60 fps of playback performance and can be displayed in other devices at normal speed.

(Embodiment 3)

The third embodiment of this invention is described as follows. Similar to the first and second embodiments described earlier, this embodiment relates to a motion picture recording device comprising a recording function that compresses and records a motion picture that was captured at a high-speed frame rate of 240 fps, and playback function that decodes recorded motion picture data and plays it at a display frame rate of 60 fps.

The basic configuration of the motion picture recording device in this embodiment is similar to that of the motion picture recording device described in the first embodiment and shown in FIG. 1, and the CODEC 5 has a processing capacity that can encode and decode picture data with VGA (640 dots×480 dots) size at 240 fps of processing speed. In addition, the method of encoding motion pictures (motion picture stream configuration) by CODEC 5 complies with H.264, similar to the second embodiment.

The motion picture recording device in this embodiment records motion picture data encoded by the CODEC 5 in the memory card 10 as a motion picture file in MP4 format (hereafter referenced to as MP4 file), which is standardized by ISO (International Organization for Standardization) as a standard format to record MPEG4 pictures and audio data. In addition, the specific configuration of motion picture files is the configuration regulated by ISO/IEC 14496-12, "Information technology coding of audio-visual objects—Part 12: ISO base media file format".

Figure 15:
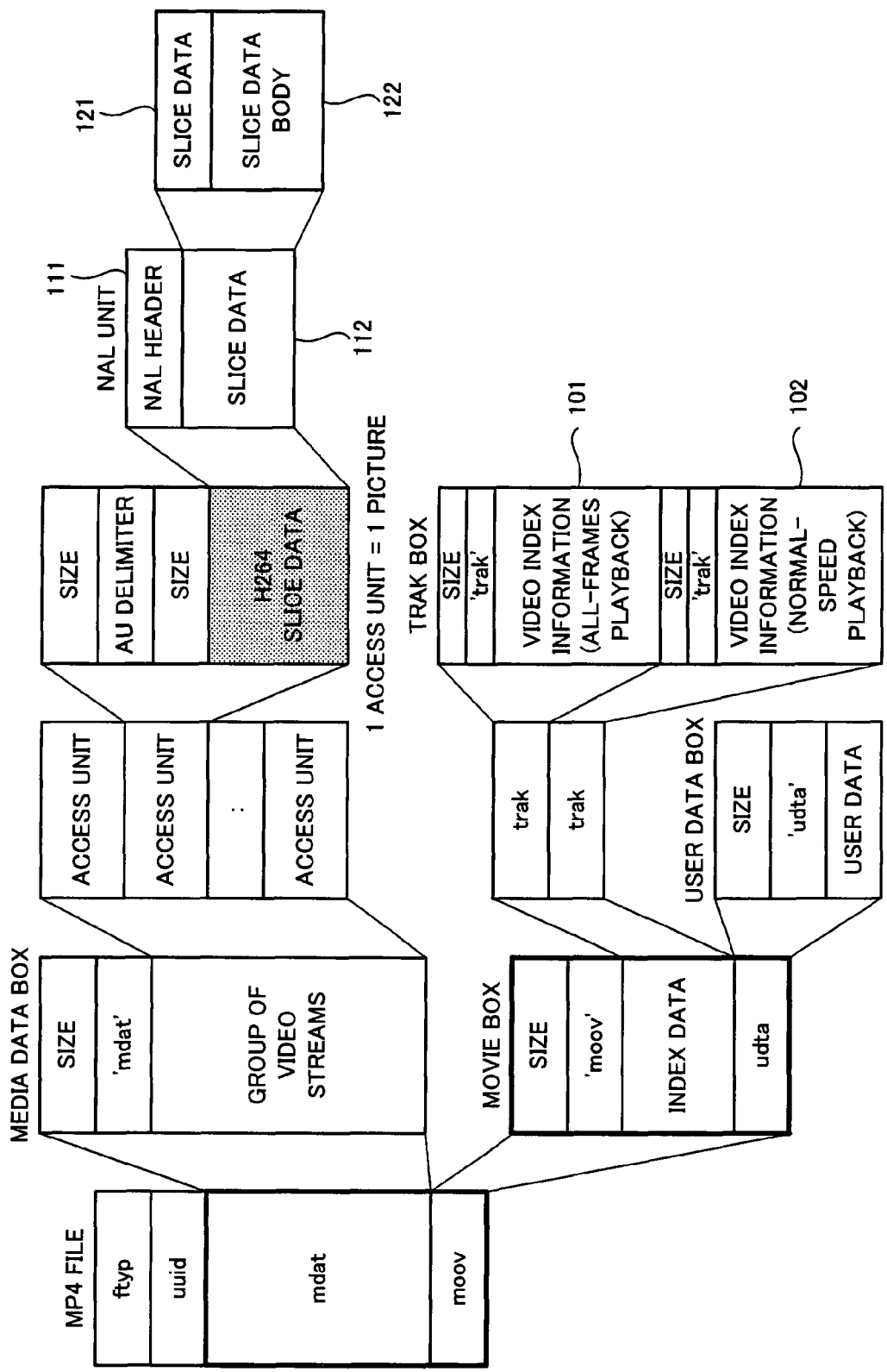
FIG. 15 is an outlined configuration diagram of a MP4 file recorded in the third embodiment.

FIG. 15 is a figure showing the outlined composition of a MP4 file recorded in the memory card 10 in this embodiment. As showed in FIG. 15, the MP4 file is a collection of a number of box information and composed of respective boxes such as "ftyp", wherein information that indicates compatibility of relevant file is stored, and "uuid", "mdat", and "moov" wherein encoder specific extended information is stored.

"mdat" is a "Media Data Box" wherein encoded picture data is stored, and the data size of relevant box, identification code ('mdat'), and groups of video streams are stored. Groups of video streams are composed of a plurality of access units by frame, and each access unit is composed of respective data such as data size of the relevant access unit, an AU delimiter (a border code of the access unit), H.264 slice data (encoded data), and size of the relevant H.264 slice data.

H.264 slice data is an NAL (Network Abstraction Layer) unit composed of an NAL header 111 and slice data 112, and the slice data 112 in this NAL unit is further composed of a slice header 121 and a slice data body 122. In the NAL header 111, attribute information such as type of NAL unit is stored, and herein, nal_ref_idc described in the second embodiment is stored. In addition, as for picture parameters other than nal_ref_idc, slice types (picture indication information 62a in the first embodiment), frame_num, and POC are stored in the slice header 121, and reference picture indication information (reference frame information 62b) are stored in the slice data body 122 together with encoded data for I pictures output from CODEC 5 in motion picture recording.

In addition, the encoded data for I pictures stored in the slice data body 122 are a collection of macro blocks, and the reference picture indication information is actually stored by macro block, and information of pictures to be referenced is referenced by the macro block. However, herein to simplify the description, it is described here as reference picture indication information being stored with slice data (pictures) as a unit.

Moreover, "moov" is a "Movie Box" and is composed of the data size of the relevant box, identification code of the box ('moov'), index data, and udta, wherein information necessary for decoding H.264 slice data is stored.

Index data is composed of two types of traks. Each trak is a "trax box" that stores index information in playback, and each is composed of the data size of the relevant box, identification code ('trak'), and video index information 101, 102 that indicates the access unit to be decoded.

Figure 16:
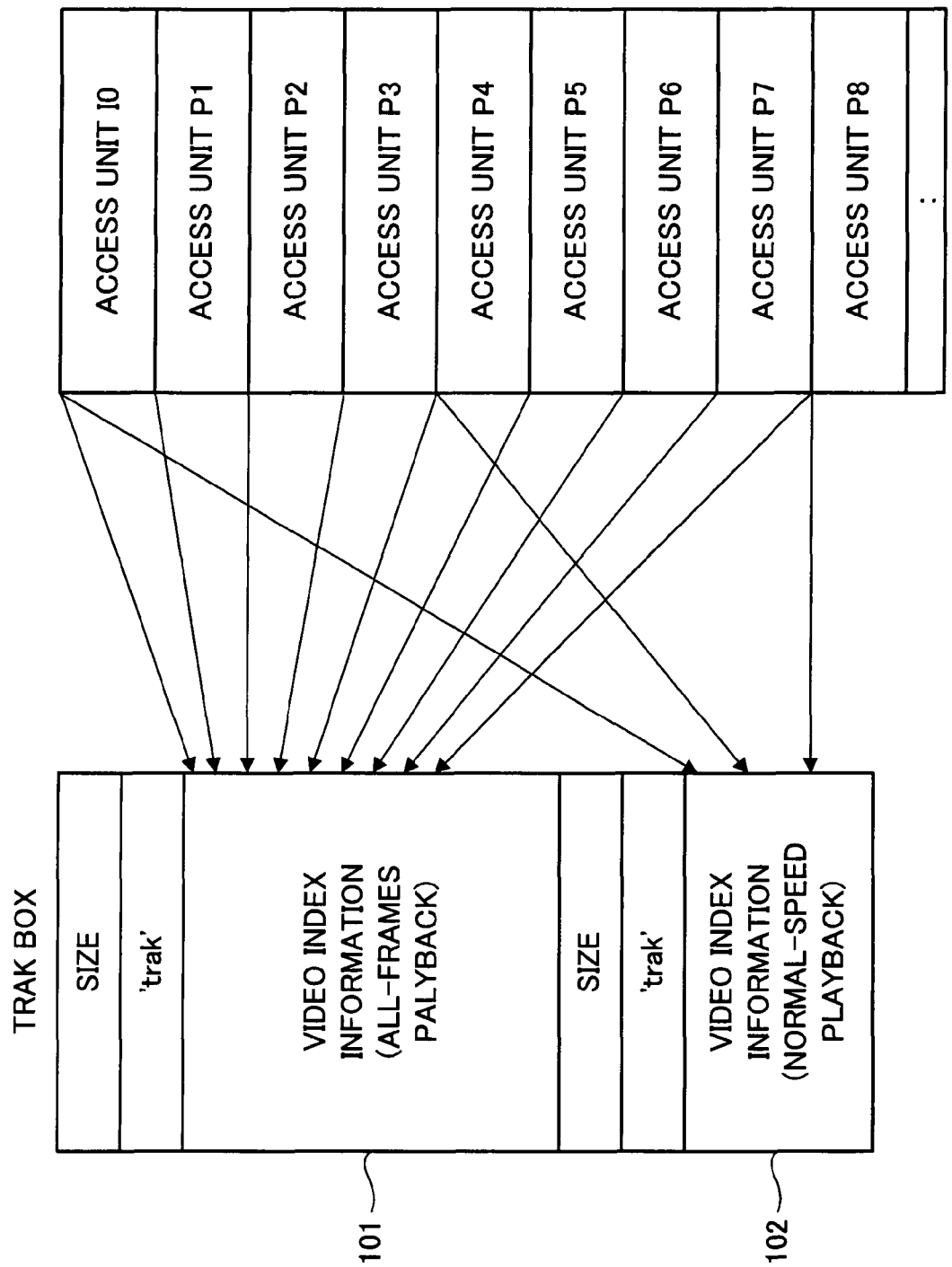
FIG. 16 is a figure that shows the relationship between index information for all-frames playback and index information for normal-speed playback and the access unit in the MP4 file shown in FIG. 15.

In one of two types of traks, index information about all of the frames of motion pictures are stored as video index information 101, and in another trak, only index information of the main frames of motion pictures from the initial frame to the fourth frame are stored as video index information. In the following description, one trak is called a trak for all-frames playback, and the video index information 101 stored therein is index information for all-frames playback, and another trak is called a trak for normal-speed playback, and the video index information 102 stored therein is index information for normal-speed playback, whereby both are distinguished. FIG. 16 is a figure showing the relationship between the index information for all-frames playback 101 and index information for normal-speed playback 102 and the access unit.

In addition, udta comprising a "Movie Box" is a "User Data Box" wherein various types of user information are stored.

The action and operation regarding this embodiment are described as follows.

(Recording Action)

Figure 17A:
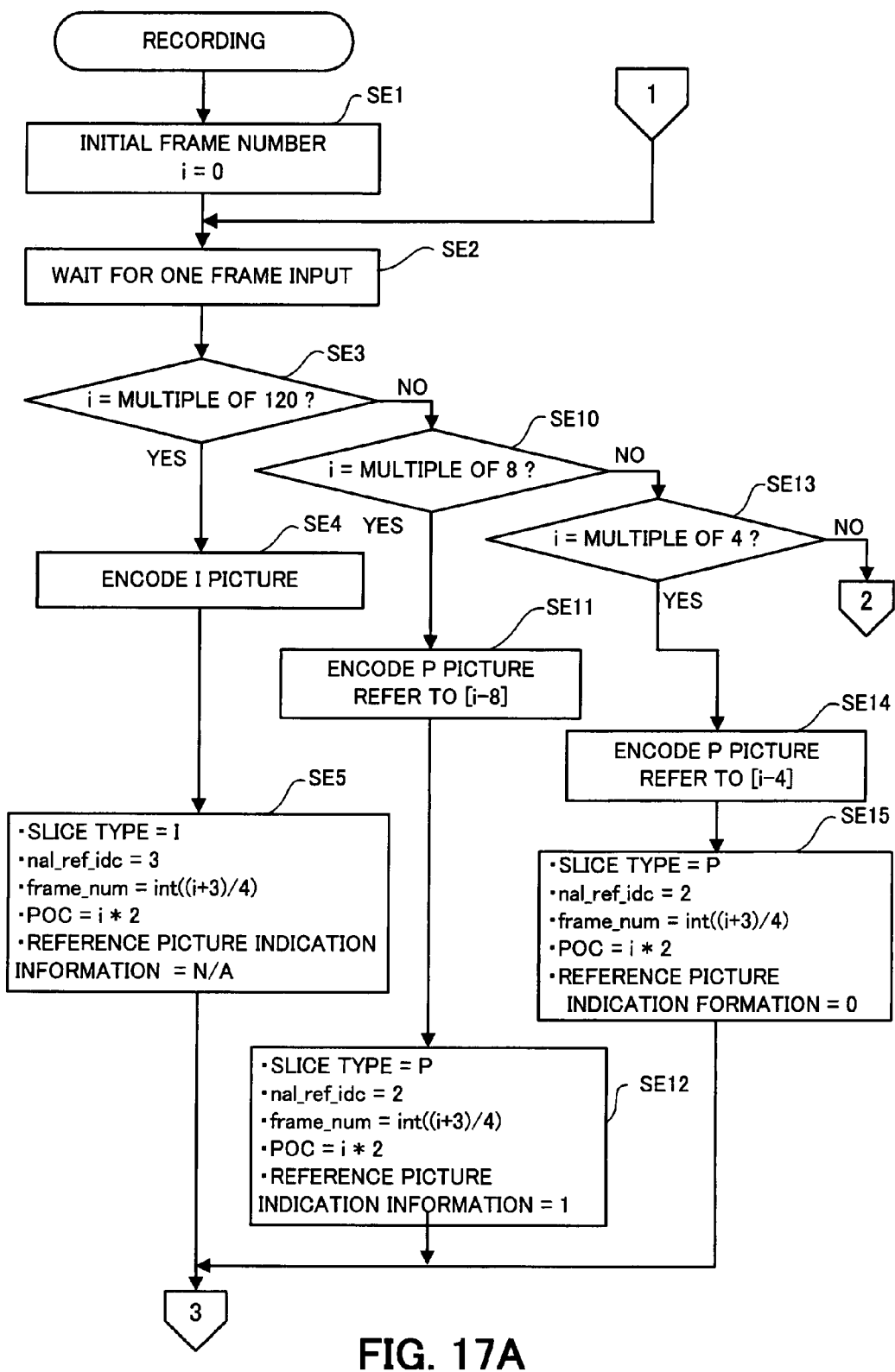
FIGS. 17A and 17B are flow charts that show the action of the motion picture recording device of the second embodiment in the recording mode.
Figure 17B:
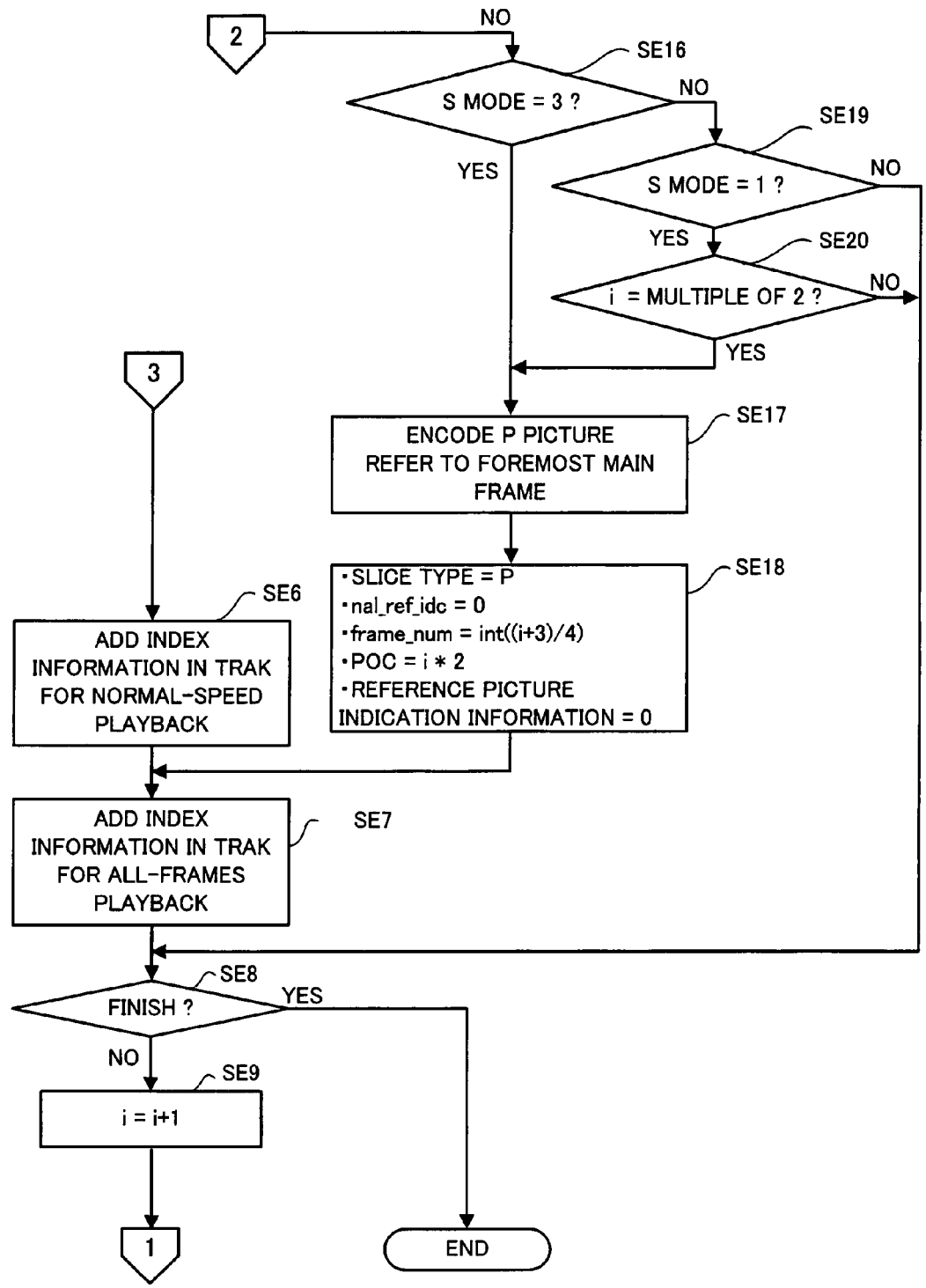
Figure 18A:
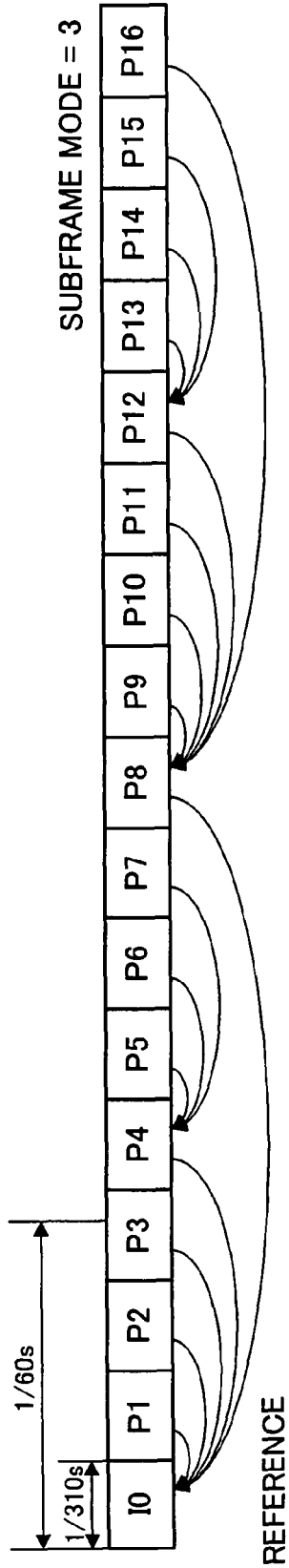
FIG. 18A is a conceptual diagram that shows the configuration of motion picture data recorded in the recording mode when the sub frame mode is 3.
Figure 18B:
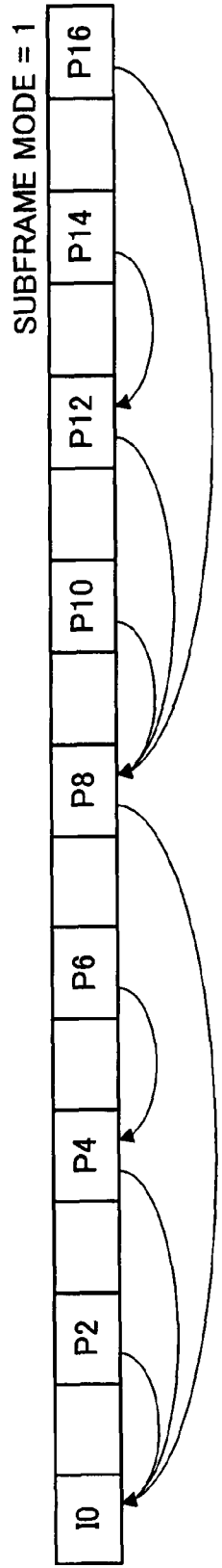
FIG. 18B is a conceptual diagram that shows the configuration of motion picture data recorded in the recording mode when the sub frame mode is 1.
Figure 18C:
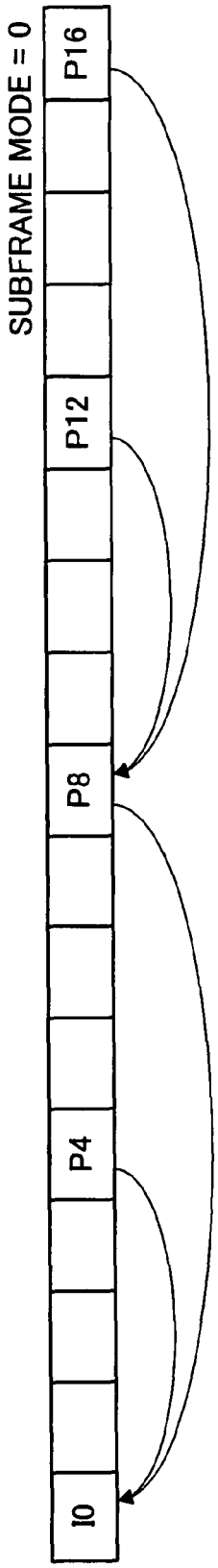
FIG. 18C is a conceptual diagram that shows the configuration of motion picture data recorded in the recording mode when the sub frame mode is 0.

The action in motion picture taking and recording in the recording mode is described as follows. FIG. 17 is a flow chart showing content of control of CODEC 5 by the CPU 8 in motion picture taking and recording. FIG. 18A to 18C are conceptual diagrams showing the configuration of motion picture data recorded in the recording mode corresponding to FIG. 6A shown in the first embodiment and FIG. 11A in the second embodiment.

First, before a specific description of the action, differences from the first and second embodiments are described in FIG. 18A to 18C. FIG. 18A to 18C are conceptual diagrams showing the configuration of motion picture data recorded in the recording mode.

In this embodiment, the number of sub frames existing between main frames in recording can be set as the sub frame mode. The number of sub frames that can be set is either one of 3, 1, or 0, and each sub frame number is stored in the "User Data Box" as a value showing the type of sub frame mode in recording.

In addition, the sub frame mode may be comprised so that it can be set automatically via user key operation at an arbitrary point before or after recording the motion pictures and based on predefined conditions, but herein for convenience, it is comprised to be set in advance by a user with a key operation before starting recording.

When the sub frame mode is set to 3 as shown in FIG. 18A, the initial frame is encoded as an I picture (I0) and afterward, the frame with frame number (i), which is a multiple of 4 is encoded with an I picture or a P picture of the foremost main frame as a reference picture. However, in this embodiment, the frame with frame number (i), which is a multiple of 8, is pre-encoded with an I picture or a P picture of the main frame eight frames as a reference picture. Moreover, similar to the second embodiment, P pictures of all sub frames are encoded with I pictures or P pictures of the foremost main frames as reference pictures.

In addition, when the sub frame mode is set to 1 as shown in FIG. 18B, without having P pictures of all sub frame as encoding targets, only sub frames with frame number (i), which become multiples of 2, are encoding targets. Moreover, when the sub frame mode is set to 0, as shown in FIG. 18C, all sub frames are excluded as encoding targets.

More specific content of the action in recording the motion pictures in this embodiment is described as follows in accordance with FIG. 17. In addition, also in this embodiment, the size of motion pictures to be recorded is VGA size, and in recording, the CPU 8 operates a picture-capturing component 1, a picture-generating component 2, and the CODEC 5 at a frame rate of 240 fps and synchronizes each component by frame.

As shown in FIG. 17, at the beginning of recording, the CUP 8 first initializes frame number (i) (step SE1). The default of frame number (i) (the number of the initial frame) is "0". Afterward, the CPU 8 waits for picture data for one frame to be input (accumulated) in the memory 4 (step SE2) and then reads out the picture data stored in the memory 4 to be input in CODEC 5 when it determines frame number (i) is a multiple of 120 (YES in step SE3) including 0. The CPU 8 outputs picture data of the relevant frame input in the CODEC 5 as an I picture to the memory 4 by intraframe encoding (step SE4). In addition, herein, the CODEC 5 stores a local decoding picture in which encoded data is decoded in the memory 4 separate from encoded data as picture data (reference picture) used in encoding subsequent P pictures.

Next, to the encoded data, the CPU 8 adds "I" as a slice type as well as "3" as nal_ref_idc. Moreover, as frame_num, the CPU 8 adds the value that can be obtained from "int((i+3)/4)" and increases by 1 for every four frames throughout all of the frames with the initial frame as 0 and 1 as default and furthermore, as POC, the value that can be obtained from "i×2" and increases by 2 for every frame throughout all of the frames with 0 as default (step SE5). In addition, reference picture indication information is not added therein.

After that, the CPU 8 adds the index information regarding the main frame of frame number (i) at that time in the trak for normal-speed playback (step SE6) and furthermore in the trak for all-frames playback (step SE7). Afterward, when the CPU 8 determines that there is no instruction to finish recording via a predefined key operation (NO in step SE8), it increments frame number (i) by one (Step SE9) to return to step SE2 and wait for picture data for the next frame to be input.

In addition, the CPU 8 reads out picture data for this time stored in the memory 4 and inputs in the CODEC 5, when it determines frame number (i) is other than a multiple of 120 but is a multiple of 8 (NO in step SE3 and YES in step SE10). The CPU 8 causes the CODEC 5 to encode picture data of the relevant frame input as a P picture, using picture data of the reference picture with frame number (i−8) eight frames before being stored in the memory and output to the memory 4 (step SE11). Moreover, in encoding relevant P pictures, the CODEC 5 stores a local decoding picture in which encoded data is decoded at that time in the memory 4 separate from encoded data as picture data (reference picture) used in encoding P pictures of following four frames and P pictures eight frames later.

Next, to the encoded data output to the memory 4, the CPU 8 adds "P" as a slice type, "2" as nal_ref_idc, the value that can be obtained from "int((i+3)/4)" (a value that increases by 2 per frame) as frame_num, and the value that can be obtained from "i×2" (a value that increases by 2 per frame) as POC. In addition, as reference picture indication information, the CPU 8 adds "1", which is a value indicating a reference picture that is two pictures before, i.e., the picture with frame number (i–8) eight frames before is added (step SE12).

In addition, when the CPU 8 determines frame number (i) is a multiple of 4 but not a multiple of 8 (NO in step SE10 and YES in step SE13), it reads out picture data at this time stored in the memory 4 and inputs it in CODEC 5. The CPU 8 causes the CODEC 5 to encode picture data of relevant frame input as a P picture, using the picture of the frame with frame number (i–4) stored in the memory, i.e., a picture four frames before as a reference picture, and output it to the memory 4 (step SE16). Moreover, in encoding relevant P pictures, the CODEC 5 stores a local decoding picture in which encoded data is decoded at that time in the memory 4 separate from encoded data as picture data (reference picture) used in encoding P pictures of the following three frames.

Next, to encoded data output to the memory 4, as a slice type, nal_ref_idc, frame_num and POC, the CPU 8 adds the same value as when frame number (i) is a multiple of 8. Moreover, as reference picture indication information, the CPU 8 adds "0"—which is a value indicating the foremost reference picture, i.e., a picture four frames before(step SE15).

After that, when frame number (i) is a multiple of either 8 or 4, the CPU 8 adds index information regarding the main frame with frame number (i) at that time to the traks for normal-speed playback and for all-frames playback (step SE6 and SE7). Afterward, if the CPU 8 determines that there is no instruction to finish recording via a predefined key operation (NO in step SE8), it increments frame number (i) (step SE9) by one to return to step SE2 and wait for picture data for the next frame to be input.

In addition, when the CPU 8 determines that the discrimination result in step SE13 is NO and frame number (i) is other than a multiple of 4, the following process is performed according to the type of sub frame mode.

First, when the CPU 8 determines that the sub frame mode (S) is set to 3 (YES in step SE16), it reads out the picture data for this time stored in the memory 4 and inputs it to CODEC 5. The CPU 8 causes the CODEC 5 to encode the input picture data of relevant frame as a P picture with the foremost main frame stored in the memory as a reference picture and output it to the memory 4 (step SE17). Next, to the encoded data output to the memory 4, the CPU 8 adds "P" as a slice type, and "0" as nal_ref_idc, frame_num and POC respectively by the same process as to the main frame mentioned above, and moreover, as reference picture indication information, it adds "0", which is a value indicating the foremost reference picture (step SE18). After that, the CPU 8 adds index information regarding the sub frame with frame number (i) at that time to the trak for all-frames playback only (step SE7).

In addition, when the CPU 8 determines that the sub frame mode (S) is set to 1 (NO in step SE16 and YES in step SE19), if it determines that frame number (i) is a multiple of 2 (YES in step SE20), the process mentioned above, which is common to when the sub frame mode is 3 (steps SE17, SE18 and SE7), is performed.

Furthermore, when the CPU 8 determines that the sub frame mode (S) is not set to 1 (NO in step SE19) and when it determines that it is set to 1, but frame number (i) is not a multiple of 2 (NO in step SE20), it immediately determines whether there has been a predefined key operation. If the CPU 8 determines that there is no indication of recording via a predefined key operation (NO in step SE8) being finished, it increments the frame number (i) by one (step SE9), returning to step SE2 to wait for picture data for the next frame to be input.

In addition, after being sequentially output from the CODEC 5 to the memory 4 as mentioned above, encoded data added with picture parameters, index information for all-frames playback 101 and index information for normal-speed playback 102 are sequentially output to the memory card 10 by the memory card control component 9 to be recorded as a motion picture file (MP4 file).

Afterward, during motion picture recording, the CPU 8 repeats all of the processes mentioned above, and when it determines that there is an instruction to finish recording via a predefined key operation (YES in step SE8), the recording action is finished. Thereby, in the MP4 file that is recorded in the memory card 10, as a group of video streams mentioned above, a series of encoded data of the frames corresponding to the set value of the sub frame mode is stored. In addition, as sown in FIGS. 15 and 16, in the trak for all-frames playback, index information for all-frames playback 101 regarding all of the encoded frames is stored, and in the trak for normal-speed playback, index information for normal-speed playback 102 regarding main frames only is stored.

(Playback Action)

The action in playing a motion picture (MP4 file) recorded in the memory card 10 by the recording action mentioned above in this embodiment is described as follows.

Also in this embodiment, the performance of the display control component 6 is 60 fps, and in motion picture playback, the CPU 8 reads out arbitrary MP4 file data recorded in the memory card 10 and selected by a user at a frame rate of 60 fps via the memory card control component 9 and sequentially transfers the encoded data part to the CODEC 5.

In addition, in this embodiment, as playback modes, four types of modes—an all-frames playback mode, a normal-speed playback mode, a ½ thinned playback mode, and a double-speed playback mode—are designed. The playback modes are described referring to FIG. 23 as follows. FIG. 23 is a figure that shows the relationship between the playback mode, the playback speed, and the reference trak.

All-frames playback mode is a mode wherein all frames recorded as motion picture data are basically played, and the playback speed of motion pictures with the sub frame mode set to 3 when recorded is ¼ of normal speed. In addition, the ½ thinned playback mode is a mode wherein every other frame of all of the frames recorded as motion picture data is basically played, and the playback speed of motion pictures with the sub frame mode set to 3 when recorded is ½ of normal speed. Moreover, normal-speed playback mode is a mode wherein playback speed is the same normal speed as when recorded, regardless of the type of sub frame mode set when recorded, and double-speed playback mode is a mode wherein the playback speed is twofold of when recorded (normal speed), regardless of the type of sub frame mode set when recorded. Hereinafter, playback action in the embodiment is described by mode mentioned above.

(Playback Action: All-frames Playback)

Figure 19:
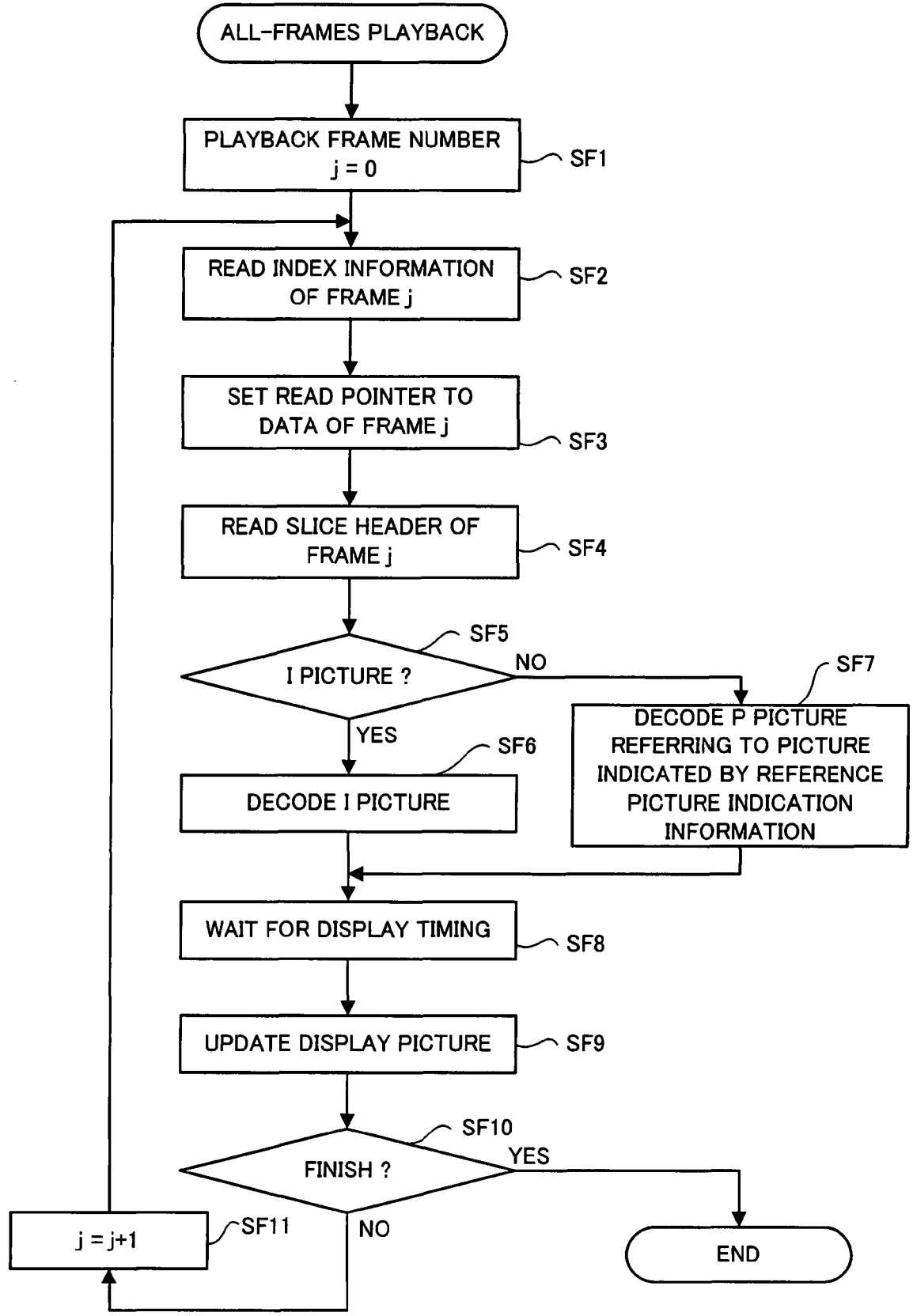
FIG. 19 is a flow chart that shows the action of the motion picture recording device of the second embodiment in all-frames playback mode.
Figure 21A:
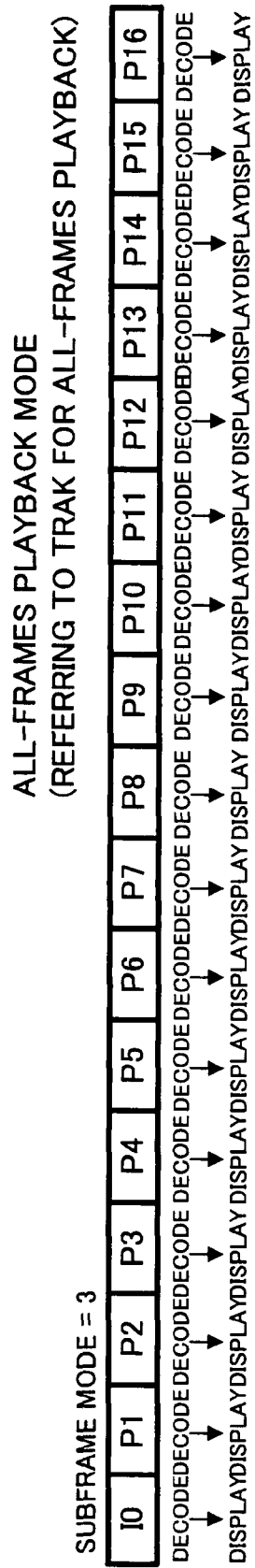
FIG. 21A is a conceptual diagram that shows the presence and absence of decoding and display of each frame during playback in all-frames playback mode by sub frame mode.
Figure 21A:
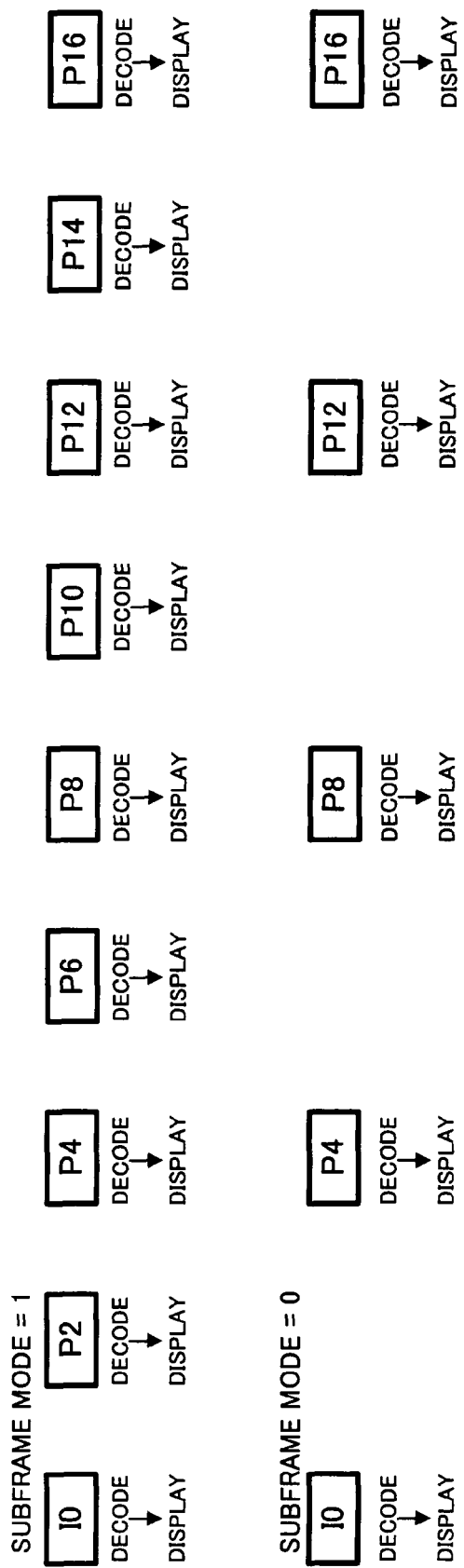

FIG. 19 is a flow chart showing the action in all-frames playback mode. FIG. 21A is a conceptual diagram showing the presence and absence of decoding and display of each frame in all-frames playback mode by sub frame mode set in motion picture recording.

As shown in FIG. 19, in all-frames playback mode, at the start of recording, the CPU 8 first initializes a playback frame number (j) (step SF1). Default of the playback frame number (j) is "0". Next, from the trak for all-frames playback where index information for all-frames playback 101 is stored, the CPU 8 reads out index information f of the frame number (j) (step SF2), and according to the index information read out, a reading pointer for a group of video streams is set to the access unit (encoded data) of the frame number (j) (step SF3).

Next, after the CPU 8 reads information in a slice header 121 of encoded data of the frame number (j) (step SF4), if it determines that the picture type shown by the slice type among the slice header information is an I picture (YES in step SF5), it causes the CODEC 5 to decode the I picture with interframe decoding, and the picture data is output to the memory 4 (step SF6).

Moreover, if the CPU 8 determines that the picture type shown by the slice type of encoded data of the frame number (j) is not an I picture (NO in step SF5), it causes the CODEC 5 to decode a P picture with interframe predictive coding using a picture of the frame to be referenced that is shown by the reference picture indication information stored together with encoded data in a slice data body 122 as a reference picture, and the picture data is output to the memory 4 (step SF7).

Herein P pictures that are subject to decoding are all P pictures recorded, but as shown in FIG. 21A, the content of individual P pictures varies depending on the sub frame mode that was set when the motion pictures were recorded. In other words, if the sub frame mode in recording the motion pictures is 3, similar to slow playback in the first embodiment and the fourfold slow playback mode in the second embodiment, P pictures of all of the main frames and sub frames that were captured in recording the motion pictures are subject to decoding. Moreover if the sub frame mode is 1, P pictures of all of the main frames that were captured when the motion pictures were recorded and the sub frames with frame number (i), which is an even number when the motion pictures were recorded, are subject to decoding. Furthermore, if the sub frame mode is 0, P pictures of all of the main frames that were captured when the motion pictures were recorded are subject to decoding.

In addition, as shown in FIG. 18, as for the frame to be referenced when each P picture is decoded, regardless of the sub frame mode when recording the motion pictures, it is always the foremost main frame when the frame with the frame number (j) is a sub frame. Moreover, when the frame is the main frame and the main frame eight frames before for P picture with frame number (i), which is a multiple of 8 when recording the motion pictures, and as for P picture with frame number (i), which is a multiple of 4 other than a multiple of 8 when recording the motion pictures, it is always the foremost main frame.

After waiting for timing at a display frame rate of 1/60 seconds (step SF8), the CPU 8 reads out decoded picture data from the memory 4 and transfers the picture data to the display control component 6. Thereby, the CPU 8 causes the display control component 6 to update the displaying picture on the LCD 7 while displaying timing by display frame rate (step SF9).

Afterward, when the CPU 8 determines that the process for the final frame is not finished (NO in step SF10), after incrementing the playback frame number (j) by one (step SF11), return to step SF2 to repeat the process mentioned above. When the CPU 8 determines that decoding and displaying all of the encoded data is finished (YES in step SF10), playback is finished.

Thereby, as shown in 21A, the motion picture recording device decodes frames and display picture data. In other words, as for the motion picture that had sub frame mode 3 when recorded, the motion picture recording device decodes all of the frames recorded at 240 fps in turn, and by displaying picture data of all of the frames recorded at 60 fps, motion picture is played slow at a speed ¼ of normal speed. In addition, for the motion picture that had sub frame mode 1, the motion picture recording device displays all of the picture data recorded with every other frame thinned at 60 fps, and thereby the motion picture is played slow at a speed ½ of normal speed. Furthermore, as for the motion picture that had sub frame mode 0 when recorded, the motion picture recording device displays all of the picture data recorded with every three frames thinned at 60 fps, and thereby the motion picture is played at normal speed.

In addition, in FIG. 21A, only for frames for which encoded data is recorded (recorded frame), picture types (I, P, p) and the frame number when the motion picture was recorded are shown. Moreover, the frame shown with a bold outline is the frame wherein index information for all-frames playback 101 is stored in the trak for all-frames playback used in playback.

Thus, in all-frames playback mode, the motion picture recording device performs the decoding process using index information for all-frames playback 101, and thereby as shown in FIG. 23, the recorded motion picture is played at either fourfold slow, twofold slow (speed ½ of normal speed), or normal, according to the sub frame mode type that was set when recorded.

(Playback Action: Normal-speed Playback)

Figure 20:
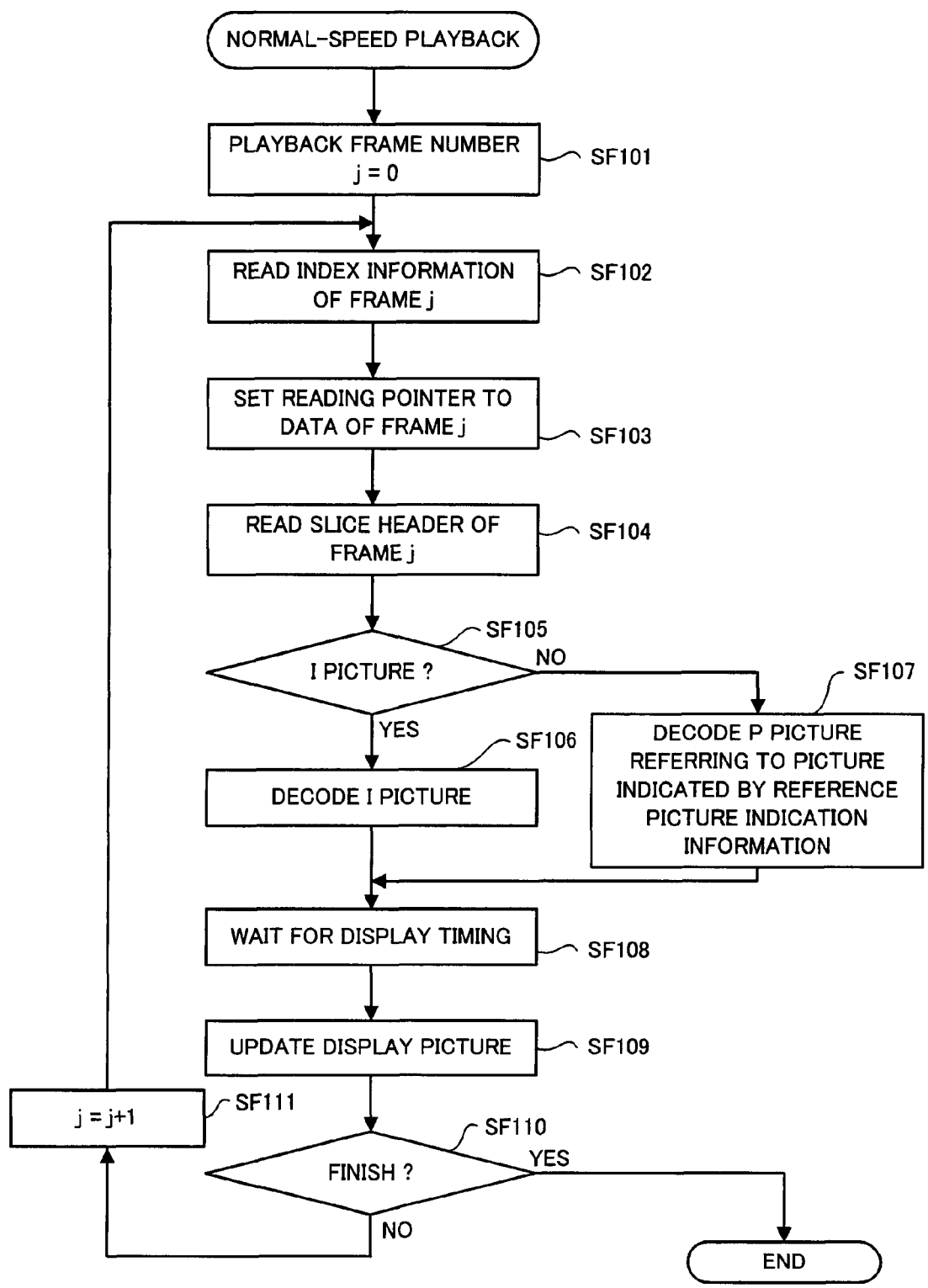
FIG. 20 is a flow chart that shows the action of the motion picture recording device of the second embodiment in normal-speed playback mode.
Figure 21B:
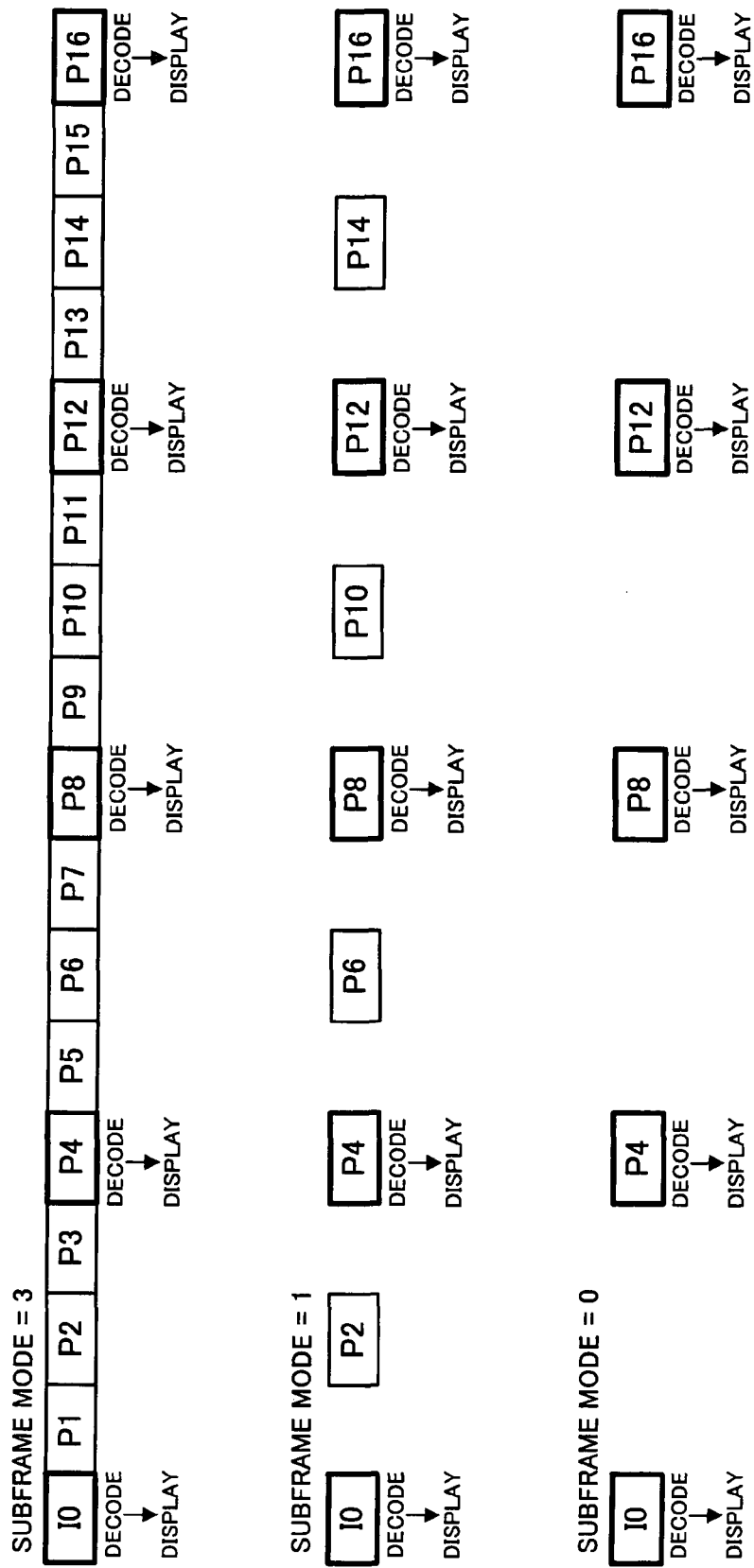
FIG. 21B is a conceptual diagram that shows the presence and absence of decoding and display of each frame during playback in normal-speed playback mode by sub frame mode.

FIG. 20 is a flow chart showing the action in normal-speed playback mode in this embodiment. FIG. 21B is a conceptual diagram showing the presence and absence of decoding and display of each frame in normal-speed playback mode by sub frame mode set when the motion picture was recorded.

As shown in FIG. 20, in normal-speed playback mode, at the start of recording, after the CPU 8 first initializes the playback frame number (j) (step SF101), unlike all-frames playback mode, it reads out index information of the frame number (j) from the trak for normal-speed playback where index information for normal-speed playback regarding main frames only is stored (step SF102). Afterward, the CPU 8 performs the same processes as step SF3 to step SF11 in FIG. 19 described in all-frames playback mode (step SF3 to step SF11).

Thereby, as shown in FIG. 21B, regardless of the type of sub frame mode that was set when recorded, by displaying the main frames every four frames including the initial frame only at 60 fps, the motion picture is played at normal speed. In addition, the frame shown in FIG. 21B with a bold outline is the frame wherein index information for normal-speed playback 102 is stored in the trak for normal-speed playback used in playback.

(Playback Action: ½ Thinned Playback)

Figure 22A:
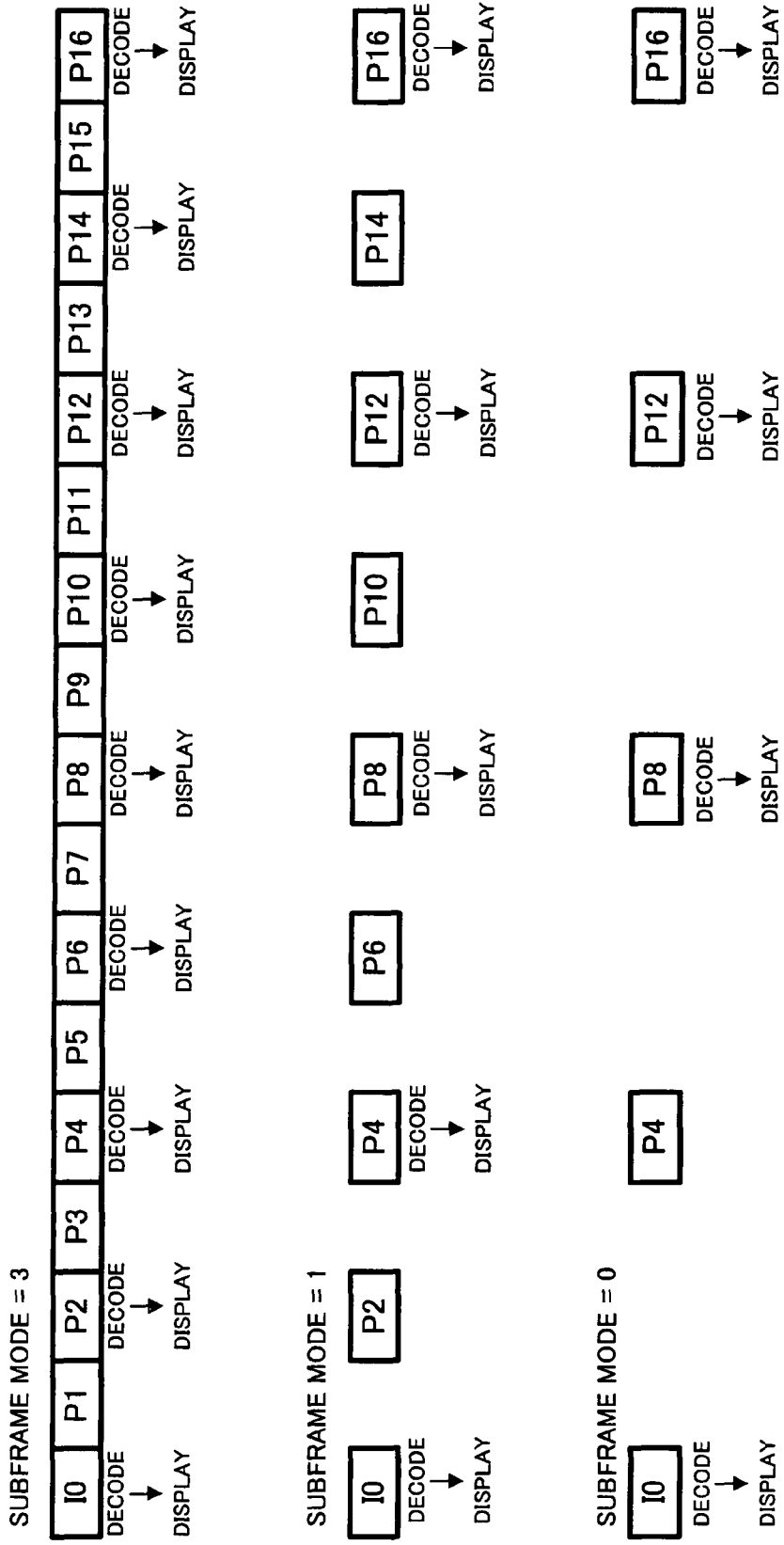
FIG. 22A is a conceptual diagram that shows the presence and absence of decoding and display of each frame during playback in ½ thinned playback mode by sub frame mode.

FIG. 22A is a conceptual diagram showing the presence and absence of decoding and display of each frame in the ½ thinned playback mode by sub frame mode set when the motion picture was recorded.

In the ½ thinned playback mode, the CPU 8 performs almost the same process as all-frames playback mode. In other words, (not illustrated in the figures) the procedure of step SF11 shown in FIG. 19 is changed to a process to increment the playback frame number (j) twice.

Thereby, as shown in FIG. 22A, the motion picture recording device decodes frames and display picture data. In other words, as for the motion picture that had sub frame mode 3 when recorded, the motion picture recording device decodes all of the frames recorded at 240 fps are thinned every other frame in turn, and by displaying it at 60 fps, the motion picture is played slow at a speed ½ of normal speed. In addition, as for the motion picture that had sub frame mode 1 when recorded, encoded data thinned every other frame is further thinned every other frame and decoded in turn, and the motion picture recording device displays it at 60 fps, thereby the motion picture is played at normal speed. Moreover, as for the motion picture that had the sub frame mode 0 when recorded, encoded data thinned every fourth frame is further thinned every other frame and decoded in turn, and the motion picture recording device displays it at 60 fps, thereby the motion picture is played at double speed (played at twofold of the speed when recorded).

In addition, also in FIG. 22A, for frames for which encoded data is recorded (recorded frame), picture types (I, P, p) and the frame number when the motion picture was recorded are shown. Moreover, the frame shown with a bold outline is the frame wherein index information for all-frames playback 101 is stored in the trak for all-frames playback used in playback.

Thus, in the ½ thinned playback mode, the motion picture recording device performs the decoding process using index information for all-frames playback 101, and thereby the recorded motion picture is played at twofold slow, normal speed, or double speed, according to the sub frame mode type that was set when recorded.

(Playback Action: Double-speed Playback)

Figure 22B:
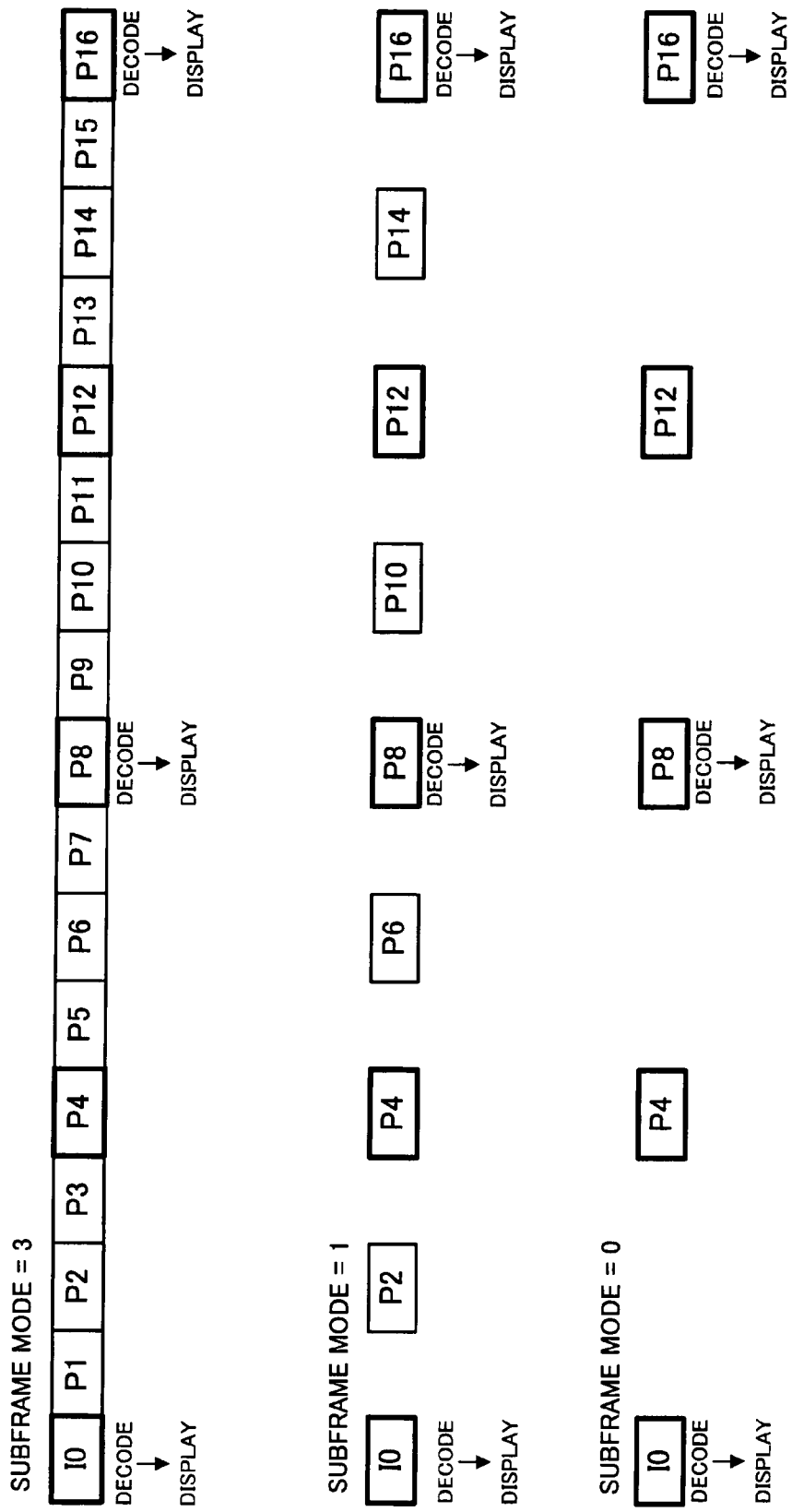
FIG. 22B is a conceptual diagram that shows the presence and absence of decoding and display of each frame during playback in double-speed playback mode by sub frame mode.

FIG. 22B is a conceptual diagram showing the presence and absence of decoding and display of each frame in double-speed playback mode by sub frame mode set when the motion picture was recorded.

In double-speed playback mode, the CPU 8 performs almost the same process as normal-speed playback mode. In other words, (not illustrated in the figures) the procedure of step SF111 shown in FIG. 20 is changed to a process to increment the playback frame number (j) twice.

Thereby, as shown in FIG. 22B, regardless of the type of sub frame mode that was set when recorded, by displaying the main frames every eight frames, including the initial frame only at 60 fps, the motion picture is played at double speed. In addition, the frame shown in FIG. 22B with a bold outline is the frame wherein index information for normal-speed playback 102 is stored in the trak for normal-speed playback used in playback.

Herein, in this embodiment described as above, both the P picture of the main frame and the P picture of the sub frame are encoded with the I picture of the P picture of the foremost main frame or 8 frames before as a reference picture when the motion picture is recorded. Therefore, when the motion picture is played, if the motion picture is played in any playback mode mentioned above, regardless of the sub frame mode in recording the motion picture, encoded data of the sub frame to be displayed can be decoded without decoding encoded date of the sub frame not to be displayed.

Thus, when the motion picture is played slow at a speed ½ of normal speed or at normal speed, according to the sub frame mode type that was set when recorded, it can be performed effectively, and the amount of data processing and power consumption can be reduced for that.

In addition, in this embodiment, by using double speed mode, the motion picture can be played at double speed, regardless of the sub frame mode type that was set when recorded. As for the motion picture that had the sub frame mode 0 when recorded, playback in the ½ thinned playback mode also causes the motion picture to be played at double speed.

Moreover, in recording the motion pictures, as for the P picture of the frame with frame number (i) that is a multiple of 8, it is designed to be encoded not with the I picture or the P picture of the foremost main frame but rather with the I picture and P picture of the main frame eight frames before as a reference picture. Therefore, also when the motion picture is played at double speed, encoded data of the main frame to be displayed can be decoded without decoding the encoded data of the main frame not to be displayed. Thus, also when the motion picture is played at double speed, it can be performed effectively and the amount of data processing and power consumption can be reduced for that case.

In addition, in this embodiment, it is designed so that the P picture of the frame with frame number (i) that is a multiple of 8 is encoded with the I picture or P picture of the main frame eight frames before as a reference picture. However, for example, the P picture of the frame with frame number (i) that is a multiple of 16 may be encoded with the I picture or the P picture of the main frame 16 frames before as a reference picture. In other words, the P picture may be encoded using the reference picture for encoding other P pictures of the frame that is closest to the relevant P picture by the P picture of n frame. In that case, the motion picture can be played at a faster speed. In other words, in the case of n=16, playback at fourfold speed is possible.

In addition, in this embodiment, while recording the motion pictures, it is possible to set the number of sub frames existing between main frames as the sub frame mode. Thereby, in recording the motion pictures, by setting the sub frame mode according to the speed change of movement of subjects—e.g., the sub frame mode is set to 0 if a subject that is captured in picture-capturing component 1 has slow movement—the encoding process for the picture of the frame that is unnecessary to play the motion picture with thinning of frames can be omitted. Thus, the amount of data processing and power consumption can be reduced. At the same time, the amount of memory consumption of the memory card 10 can be reduced.

In addition, in this embodiment, while recording the motion pictures, as index information that shows the access unit (encoded data) to be decoded, both the index information 101 for all-frames playback and index information 102 for normal-speed playback are designed to be recorded. Thereby, by using these sets of index information separately while playing the motion picture in all-frames playback and normal-speed playback that plays the motion picture slow at a speed ¼ of normal speed based on the same motion picture file can be achieved. Moreover, it is also possible in an all-purpose motion picture playback device that is capable of playing MP4 files.

In addition, in this embodiment, it is described for the case in which the CODEC 5 has a similar configuration to that of the motion picture recording device described in the first embodiment. However it's not limited to this, similar to the motion picture recording device described in the second embodiment, that the CODEC 5 may be composed of the bus control component 51 and the reference buffer 52, and the first CODEC 53 to the fourth CODEC 56 in parallel as shown in the FIG. 7. Furthermore, in that case, by encoding the picture of the predefined frame in the recording mode as shown in FIG. 18, similar effects to those of this embodiment can be obtained. Moreover, relevant points are similar also in the first embodiment.

MODIFIED EXAMPLE

Herein, in the first to third embodiments described above, it is described for the motion picture recording device that has the CODEC 5 for encoding and decoding motion pictures. However, it may also be comprised that encoding and decoding of motion pictures is performed by the CPU 8 by using a predefined software. Furthermore, in that case, in motion picture playback with thinning of frames similar to when the motion picture is played at normal speed as mentioned above, the entire amount of data processing and power consumption can be reduced, because it can be performed effectively. Thus, in that case, in parallel with the normal-speed playback of a motion picture, a greater variety of data processing can be performed by the CPU 8, without maintaining excessive processing capacity for the CPU 8.

Moreover, in the first to third embodiments, the motion picture recording device is a configuration that has the function of the motion picture decoding device, and it is described for the case in which the motion picture recorded with the motion picture recording device is played with the motion picture recording device. However, also in the case in which the recorded motion picture is played (decoded) with other devices that have the function to play (decoded) motion pictures or devices that have playback (decoding) function only, the entire amount of data processing and power consumption in playback (decoding) can be reduced.

Regarding this, with those that have a processing capacity for capturing motion pictures at 240 fps (high-speed picture-capturing) and encoding such as a motion picture recording device, it is basically possible to decode and display the motion picture recorded at 240 fps. This is because encoding includes a decoding process called local decoding to create the same predictive picture as decoding similar to the MPEG method mentioned above.

Thus, the effect of reducing the entire amount of data processing during playback as mentioned above and the effect obtained along therewith—i.e., the effect when predefined software is used for decoding motion pictures—becomes more remarkable in the following case. In other words, such as when a motion picture recorded at 240 fps is played with normal-speed playback with the application of the motion picture decoding method to a common playback device having a capacity that supports the normal display frame rate (e.g., 60 fps) as a decoding process capacity for motion picture data, the effect becomes more effective.

On the other hand, in the first to third embodiments, the frame rate while recording in the recording mode is 240 fps. However besides this, the frame rate (60 fps) in recording may be an integral multiple (n) of the display frame rate during playback. In that case, while encoding and decoding motion pictures, when every n frames is encoded and decoded as the main frame, playback speed of the motion picture can be normal speed, similar to normal-speed playback mode in each embodiment mentioned above (including normal-speed playback duration in the variable speed playback mode in the first embodiment).

In addition, while recording in the recording mode, the I picture insertion interval while encoding motion pictures is 0.5 second (every 120 frames), but the insertion interval can be any number of seconds and may be at an irregular basis. Moreover, I pictures can exist not only in the main frames displayed in normal-speed playback mode but also in the sub frames not displayed in normal-speed playback mode.

Furthermore, the playback mode is comprised so that playback modes other than normal-speed playback mode can be selected, but it may be comprised so that motion picture playback is performed only in normal-speed playback mode.

On the other hand, in the first to third embodiments, it is described for the case in which the CODEC 5 is comprised to create I pictures and P pictures only in encoding motion pictures. However, it is not limited to this, and it can be comprised to include a bi-directionally predictive circuit and may be comprised to create B pictures (bi-directionally predictive coded pictures) in encoding. In that case, while recording the motion pictures, a B picture may be inserted in the frame position corresponding to the sub frame ("p" frame in FIGS. 6A, 11A and 18). However, in that case, bi-directional picture data is required to create B pictures, and the amount of information and processing to be handled are doubled, and processing becomes complicated, because the series of inputting (picture-capturing) and outputting (displaying) orders and encoding and decoding orders is different.

In addition, in the first to third embodiments, while encoding taken motion pictures, it is described for the case in which pictures of a series of frames are encoded as I pictures and P pictures. However, in this invention, a method that uses an interframe predictive coding technique that encodes picture data of a frame as difference information when other frames are reference pictures such as P pictures (or B pictures) can be applied when motion pictures are encoded with other methods. For example, an I picture (or B picture) is encoded with the non-motion compensating interframe predictive coding technique. In other words, it may be wherein encoded data of difference information only, not including motion vector (MV) only, are generated, and each frame is converted to interim data other than the DCT coefficient, which is encoded.

Moreover, a motion picture recording device is also described that not only records taken motion pictures but also has the function to play recorded motion pictures, but this invention can be applied to a motion picture recording device that does not have a playback function.

Furthermore, this invention is not limited to motion pictures obtained by picture-taking if motion pictures are encoded. It can be employed in various devices that have a configuration for encoding motion pictures input from other devices, those transferred through broadcasts, and those already recorded in the memory, for example.

In addition, in the first and second embodiments, the reference frame in encoding the main frame using a reference picture is the foremost main frame, but the main frame before that may also be used. For example, the reference frame of the main frame with frame number (i), which is after "8", may be the main frame eight frames before. Furthermore, a plurality of main frames, particularly before and after relevant frame on time axis may be used as reference frames. In other words, main frames may be encoded as B pictures.

In addition, in the third embodiment, the reference frame when the main frame is encoded using a reference picture is the foremost double-speed frame—i.e., the frame to be displayed in double-speed playback mode (main frame)—but the double-speed frame before that may also be used. Moreover, a plurality of double-speed frames, particularly before and after relevant frame on time axis may be used as reference frames. In other words, main frames may be encoded as B pictures.

In addition, in the first embodiment, the reference frame in encoding the sub frame using a reference picture is the foremost frame, but the frame before or after that may also be used. Moreover, a plurality of frames, particularly before and after relevant frame on time axis may be used as reference frames. In other words, sub frames may be encoded as B pictures.

In addition, in the second and third embodiments, the reference frame in encoding the sub frame using a reference picture is the foremost main frame, but the frame before or after that may also be used. Moreover, a plurality of main frames, particularly before and after relevant frame on time axis may be used as reference frames. In other words, main frames may be encoded as B pictures.

In addition, in the first and second embodiments, as in the third embodiment, employing a motion picture file format in MP4 format so that index information for all-frames playback 101 and index information for normal-speed playback 102 are added to encoded data, playback action selectively using index information for all-frames playback 101 and index information for normal-speed playback 102 may be performed in playing (decoding) motion pictures.

In addition, also for the third embodiment, as in the second embodiment, while playing (decoding) motion pictures, playback action using picture parameters (slice types, nal_ref_idc, frame_num, POC and reference picture indication information) instead of index information for all-frames playback 101 and index information for normal-speed playback 102 may be performed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

In addition, this application claims priority based on Japanese Patent Application No. 2006-166778 filed on Jun. 16, 2006 and Japanese Patent Application No. 2007-108794 filed on Apr. 18, 2007 incorporating all the contents of two base applications mentioned above.

What is claimed is:

1. A motion picture encoding device comprising:
   an encoding component which acquires a motion picture comprising pictures of a series of frames captured at a predefined picture-capturing frame rate and encodes a picture of each frame via an encoding process including interframe predictive coding using pictures of other frames as a reference picture, wherein the picture-capturing frame rate has a first value indicating a number of frames to be outputted from a picture-capturing component per unit time; and
   an encoding control component which, assuming that pictures of every predefined frame interval determined by the picture-capturing frame rate and a predefined display frame rate are specified pictures, limits the reference picture to other specified pictures when the specified pictures are subjected to the interframe predictive coding by the encoding component;
   wherein the display frame rate has a second value indicating a number of frames to be output to a display component per unit time, the second value of the display frame rate being lower than the first value of the picture-capturing frame rate; and
   wherein the specified pictures will become a display target when displaying the motion picture at the predefined display frame rate.

2. The motion picture encoding device according to claim 1, wherein the predefined frame interval is an integer multiple of a value obtained by dividing the picture-capturing frame rate by the display frame rate.

3. The motion picture encoding device according to claim 1, wherein the encoding control component limits the reference picture to other adjacent specified pictures when the specified pictures are subjected to the interframe predictive coding by the encoding component.

4. The motion picture encoding device according to claim 1, wherein the encoding control component divides the specified pictures into a set of first specified pictures and a set of second specified pictures, limits the reference picture to other adjacent specified pictures when the first specified pictures are subjected to the interframe predictive coding by the encoding component, and limits the reference picture to other specified pictures separated by one picture when the second specified pictures are subjected to the interframe predictive coding by the encoding component.

5. The motion picture encoding device according to claim 1, wherein the encoding component uses only pictures of a frame on a preceding side as the reference picture in the event of the interframe predictive coding.

6. The motion picture encoding device according to claim 1, wherein the encoding component uses pictures of a frame on a preceding side or pictures of both the preceding and following frames as a reference picture in the event of the interframe predictive coding.

7. The motion picture encoding device according to claim 1, further comprising:
   a decoding component which acquires motion picture data comprising a series of encoded pictures which have been encoded by the encoding component and decodes a picture of each frame via a decoding process including interframe predictive decoding using pictures of other frames as a reference picture, and
   a decoding control component which limits a decoding target of the motion picture data by the decoding component only to the specified pictures, and causes the decoding component to decode using other specified pictures different from the decoding target as a reference picture in the event of the interframe predictive decoding.

8. The motion picture encoding device according to claim 1, wherein the encoding control component controls the presence/absence of the interframe predictive coding by the encoding component targeting unspecified pictures other than the specified pictures depending on a type of operation mode set at a time of encoding the motion picture.

9. The motion picture encoding device according to claim 1, further comprising a reference information-adding component which adds reference picture-indicating information indicating other specified pictures as a reference picture at a time of decoding the specified pictures to motion picture data comprising a series of encoded pictures that have been encoded by the encoding component.

10. The motion picture encoding device according to claim 1, further comprising a decoding target information-adding component which adds decoding target information indicating only the specified pictures as decoding target pictures to motion picture data comprising a series of encoded pictures that have been encoded by the encoding component.

11. The motion picture encoding device according to claim 10, wherein the decoding target information-adding component adds index information indicating a series of pictures comprising only of a part of specified pictures among the specified pictures as the decoding target information.

12. The motion picture encoding device according to claim 1, further comprising an index information-adding component which adds, to motion picture data comprising a series of pictures that have been encoded by the encoding component, (i) first index information indicating pictures of all frames that have been encoded by the encoding component, and (ii) second index information indicating a series of pictures constituted only of the specified pictures, as index information indicating a series of pictures that are to be the decoding target.

13. The motion picture encoding device according to claim 1, wherein the encoding component comprises:

a reference picture storing component which temporarily stores the reference picture; and a number of individual encoding components corresponding to a number of the predefined frame interval, wherein pictures of a plurality of consecutive frames are individually encoded via a synchronized encoding process using a same reference picture temporarily stored in the reference picture storing component.

14. A motion picture encoding device comprising:

an encoding component which encodes pictures of a series of frames to be respectively input in a motion picture captured at a predefined picture-capturing frame rate via an encoding process including interframe predictive coding using pictures of other frames as a reference picture, wherein the picture-capturing frame rate has a first value indicating a number of frames to be output from a picture-capturing component per unit time; and an encoding control component which, regarding pictures with every predefined frame interval as specified pictures, limits the reference picture to other specified pictures when the specified pictures are subjected to interframe predictive coding by the encoding component;

wherein the specified pictures are to be a display target when display is made by matching a playback time and a picture-capturing time at a predefined display frame rate;

wherein the display frame rate has a second value indicating a number of frames to be output to a display component per unit time; and wherein the second value of the display frame rate under which the motion picture after the encoding is output to the display component is lower than the first value of the picture-capturing frame rate at the time of picture-capturing.

15. A motion picture encoding method of a motion picture encoding device comprising a picture-capturing component and a display component, the method comprising:

encoding a picture of each frame of a motion picture comprising pictures of a series of frames captured at a predefined picture-capturing frame rate via an encoding process including interframe predictive coding using pictures of other frames as a reference picture, wherein the picture-capturing frame rate has a first value indicating a number of frames to be output from the picture-capturing component per unit time; and assuming that the pictures of every predefined frame interval determined by the picture-capturing frame rate and a predefined display frame rate are specified pictures, using other specified pictures as a reference picture in the event of the interframe predictive coding of the specified pictures;

wherein the display frame rate has a second value indicating a number of frames to be output to a display component per unit time, the second value of the display frame rate being lower than the first value of the picture-capturing frame rate; and wherein the specified pictures will become a display target when displaying, by the display component, the motion picture at the predefined display frame rate.

16. A non-transitory computer-readable recording medium having a program stored thereon for causing a computer contained in a motion picture encoding device to function as:

an encoding component which encodes a motion picture comprising pictures of a series of frames captured at a predefined picture-capturing frame rate via an encoding process including interframe predictive coding using pictures of other frames as a reference picture, wherein the picture-capturing frame rate has a first value indicating a number of frames to be output from a picture-capturing component per unit time; and an encoding control component which, assuming that the pictures of every predefined frame interval determined by the picture-capturing frame rate and a predefined display frame rate are specified pictures, limits the reference picture to other specified pictures when the specified pictures are subjected to interframe predictive coding by the encoding component;

wherein the display frame rate has a second value indicating a number of frames to be output to a display component per unit time, the second value of the display frame rate being lower than the first value of the picture-capturing frame rate; and wherein the specified pictures will become a display target when displaying the motion picture at the predefined display frame rate.

17. A motion picture recording device for recording a motion picture that has been captured, the device comprising:

a picture-capturing component which captures a motion picture;

an encoding component which acquires a motion picture comprising pictures of a series of frames captured by the picture-capturing component at a predefined picture-capturing frame rate and encoding a picture of each frame via an encoding process including interframe predictive coding using pictures of other frames as a reference picture, wherein the picture-capturing frame rate has a first value indicating a number of frames to be output from the picture-capturing component per unit time;

a recording component which records motion picture data comprising the motion picture that has been encoded by the encoding component; and an encoding control component which, assuming that the pictures of every predefined frame interval determined by the picture-capturing frame rate and a predefined display frame rate are specified pictures, limits the reference picture to other specified pictures when the specified pictures are subjected to interframe predictive coding by the encoding component;

wherein the display frame rate has a second value indicating a number of frames to be output to a display component per unit time, the second value of the display frame rate being lower than the first value of the picture-capturing frame rate; and wherein the specified pictures will become a display target when displaying the motion picture based on the motion picture data recorded in the recording component at the predefined display frame rate.

18. The motion picture recording device according to claim 17, further comprising a recording control component which controls the presence/absence of the recording of encoded pictures of unspecified pictures other than the specified pictures with respect to the recording component depending on a type of recording mode set at a time of recording the motion picture.

19. The motion picture recording device according to claim 17, further comprising:

an extracting component which extracts encoded pictures of the specified pictures from a series of encoded pictures constituting the motion picture data recorded in the recording component, and a motion picture-editing component which records the encoded pictures extracted by the extracting component in the recording component as new motion picture data while maintaining a mutual preceding and following relation.

20. A motion picture decoding device for decoding motion picture data in which a motion picture comprising pictures of a series of frames captured at a predefined picture-capturing frame rate has been encoded, the picture-capturing frame rate having a first value indicating a number of frames to be output from a picture-capturing component per unit time, and the device comprising:
  a decoding component which acquires and decodes the encoded motion picture via a decoding process including interframe predictive decoding using pictures of other frames as a reference picture, and
  a decoding control component which limits a decoding target of the motion picture data by the decoding component only to specified pictures with every predefined frame interval determined by the picture-capturing frame rate and a predefined display frame rate, which specified pictures are to become a display target when displaying the motion picture at the predefined display frame rate, and causes the decoding component to use other specified pictures different from the decoding target as a reference picture in the event of the interframe predictive decoding,
  wherein the display frame rate has a second value indicating a number of frames to be output to a display component per unit time, the second value of the display frame rate being lower than the first value of the picture-capturing frame rate.

21. The motion picture decoding device according to claim 20, wherein the decoding control component causes the decoding component to use other specified pictures different from the decoding target indicated in reference picture indication information that has been added to the motion picture data as a reference picture in the event of the interframe predictive decoding of the specified pictures.

22. The motion picture decoding device according to claim 21, wherein the reference picture indication information that has been added to the motion picture data comprises information indicating other adjacent specified pictures as a reference picture at a time of decoding the specified pictures.

23. The motion picture decoding device according to claim 20, wherein the decoding control component limits the target of the interframe predictive decoding by the decoding component only to (i) a set of first specified pictures where other adjacent specified pictures thereof comprise the reference pictures, and (ii) a set of second specified pictures where other specified pictures separated by one picture thereof comprise the reference pictures when an operation mode set at a time of decoding the motion picture data is a first operation mode, and limits the target of the interframe predictive decoding by the decoding component only to the second specified pictures where the other specified pictures separated by one picture thereof comprise the reference pictures when the operation mode set at the time of decoding the motion picture data is a second operation mode.

24. The motion picture decoding device according to claim 20, wherein the decoding control component limits the decoding target of the motion picture data by the decoding component only to the specified pictures indicated in decoding target information that has been added to the motion picture data.

25. The motion picture decoding device according to claim 24, wherein the decoding control component limits the decoding target of the motion picture data by the decoding component only to the specified pictures indicated in the decoding target information that has been added to the motion picture data among the specified pictures.

26. The motion picture decoding device according to claim 20, wherein the decoding control component causes the decoding component to execute a decoding process targeting all frames when an operation mode is a first playback mode, and causes the decoding component to execute a decoding process targeting only specified pictures when the operation mode is a second playback mode, by selectively using one of first index information and second index information preliminarily added to the motion picture data and each indicating different pictures, as the decoding target, from pictures indicated by the other of the first and second index information, in the event of a decoding process by the decoding component.

27. A motion picture decoding device for decoding motion picture data in which a motion picture captured at a predefined picture-capturing frame rate has been encoded, the picture-capturing frame rate having a first value indicating a number of frames to be output from a picture-capturing component per unit time, and the device comprising:
  a decoding component which decodes the motion picture data via a decoding process including interframe predictive decoding using pictures of other frames as a reference picture, and
  a decoding control component which limits a decoding target of the motion picture data by the decoding component only to specified pictures with every predefined frame interval, wherein the specified pictures are to become a display target when displaying the motion picture after encoding at a predefined display frame rate while matching a playback time to a picture-capturing time, and causes the decoding component to use other specified pictures different from the decoding target as a reference picture in the event of the interframe predictive decoding,
  wherein the display frame rate has a second value indicating a number of frames to be output to a display component per unit time, the second value of the display frame rate being lower than the first value of the picture-capturing frame rate at a time of capturing pictures.

28. A motion picture decoding method for a motion picture decoding device comprising a display component, the motion picture decoding device decoding motion picture data in which a motion picture comprising pictures of a series of frames captured at a predefined picture-capturing frame rate has been encoded, the picture-capturing frame rate having a first value indicating a number of frames to be output from a picture-capturing component per unit time, and the method comprising:
  decoding a picture of each frame of the encoded motion picture comprised in the motion picture data via a decoding process including interframe predictive decoding using pictures of other frames as a reference picture, and
  limiting a decoding target subjected to the decoding process only to specified pictures with every predefined frame interval determined by the picture-capturing frame rate and a predefined display frame rate, which specified pictures are to become a display target when displaying, on the display component, the motion picture at the predefined display frame rate, and using other specified pictures different from the decoding target as a reference picture in the event of the interframe predictive decoding of the specified pictures,
  wherein the display frame rate has a second value indicating a number of frames to be output to a display component per unit time, the second value of the display frame rate being lower than the first value of the picture-capturing frame rate.

29. A non-transitory computer-readable storage medium having a program stored thereon for causing a computer contained in a motion picture decoding device which decodes motion picture data in which a motion picture comprising a picture of a series of frames captured at a predefined picture-capturing frame rate has been encoded to function as:

a decoding component which acquires the motion picture data and decodes a picture of each frame via a decoding process including interframe predictive decoding using pictures of other frames as a reference picture, and a decoding control component which limits a decoding target by the decoding component only to specified pictures with every predefined frame interval determined by the picture-capturing frame rate and a predefined display frame rate, which specified pictures are to become a display target when displaying the motion picture at the predefined display frame rate, and causes the decoding component to use other specified pictures different from the decoding target as a reference picture in the event of the interframe predictive decoding, wherein the picture-capturing frame rate has a first value indicating a number of frames to be output from a picture-capturing component per unit time, and wherein the display frame rate has a second value indicating a number of frames to be output to a display component per unit time, the second value of the display frame rate being lower than the first value of the picture-capturing frame rate.

* * * * *

UNITED STATES PATENT AND TRADEMARK OFFICE
CERTIFICATE OF CORRECTION

| | | |
|---|---|---|
| PATENT NO. | : 8,699,569 B2 | Page 1 of 1 |
| APPLICATION NO. | : 11/820155 | |
| DATED | : April 15, 2014 | |
| INVENTOR(S) | : Muraki et al. | |

It is certified that error appears in the above-identified patent and that said Letters Patent is hereby corrected as shown below:

On the Title Page, Under Item (73) Assignee:

add "Renesas Technology Corp."

Signed and Sealed this
Thirtieth Day of September, 2014

Michelle K. Lee
*Deputy Director of the United States Patent and Trademark Office*